United States Patent [19]

DeLand et al.

[11] Patent Number: 5,140,316

[45] Date of Patent: Aug. 18, 1992

[54] CONTROL APPARATUS FOR POWERED VEHICLE DOOR SYSTEMS

[75] Inventors: Daniel L. DeLand, Davison; Paul Heimnick, Owosso; Curtis T. Moy, Grand Blanc, all of Mich.; Lawrence H. Zuckerman, Easton; David G. Grossman, Green Lane; Kurt P. Schuler, Allentown, all of Pa.

[73] Assignee: Masco Industries, Inc., Taylor, Mich.

[21] Appl. No.: 497,603

[22] Filed: Mar. 22, 1990

[51] Int. Cl.⁵ .................. B60J 5/00; B60K 28/00; E05F 15/00; G08C 19/00

[52] U.S. Cl. .................. 340/825.69; 340/825.72; 49/280; 364/424.05; 296/155; 180/271

[58] Field of Search ............ 340/825.69, 825.72, 340/825.54; 49/280; 364/424.05; 296/146, 155; 180/271; 105/280, 282.1

[56] References Cited

U.S. PATENT DOCUMENTS

| | | |
|---|---|---|
| 2,628,091 | 2/1953 | Rappl . |
| 3,069,151 | 12/1962 | Cook et al. . |
| 3,124,344 | 3/1964 | Mano . |
| 3,141,662 | 7/1964 | Wise . |
| 3,202,414 | 8/1965 | Simmons et al. . |
| 3,337,992 | 8/1967 | Tolson . |
| 3,344,554 | 10/1967 | Misaka et al. . |
| 3,398,484 | 8/1968 | Katsumura et al. . |
| 3,479,767 | 11/1969 | Gardner et al. . |
| 3,653,154 | 4/1972 | Hayday . |
| 3,893,260 | 7/1975 | Cadiou . |
| 4,121,382 | 10/1978 | Dietrich et al. . |
| 4,183,177 | 1/1980 | Kurdziel . |
| 4,314,692 | 2/1982 | Brauer et al. . |
| 4,422,521 | 12/1983 | Mochida . |
| 4,462,185 | 7/1984 | Shibuki et al. . |
| 4,489,640 | 12/1984 | Olson . |
| 4,530,185 | 7/1985 | Moriya et al. . |
| 4,546,845 | 10/1985 | Meyer et al. . |
| 4,549,369 | 10/1985 | Foley, Jr. . |
| 4,612,729 | 9/1986 | Sato . |
| 4,616,224 | 10/1986 | Reighard ............ 340/825.69 |
| 4,617,757 | 10/1986 | Kagiyama et al. . |
| 4,640,050 | 2/1987 | Yamagishi et al. . |
| 4,644,692 | 2/1987 | Schindehutte . |
| 4,644,693 | 2/1987 | Wang . |
| 4,775,178 | 10/1988 | Boyko . |
| 4,811,013 | 3/1989 | Aktusu ............ 340/825.69 |
| 4,842,313 | 6/1989 | Boyko et al. . |
| 4,862,640 | 9/1989 | Boyko et al. . |
| 4,872,082 | 10/1989 | Martel . |
| 4,887,390 | 12/1989 | Boyko et al. . |
| 4,935,736 | 6/1990 | Meierdierck ............ 340/825.69 |
| 4,983,963 | 1/1991 | Hodgetts et al. ............ 340/825.54 |

FOREIGN PATENT DOCUMENTS

| | | |
|---|---|---|
| 0017515 | 10/1980 | European Pat. Off. . |
| 3523261 | 1/1986 | Fed. Rep. of Germany . |
| 2578078 | 8/1986 | France . |
| 620336 | 3/1949 | United Kingdom . |

Primary Examiner—Donald J. Yusko
Assistant Examiner—Peter S. Weissman
Attorney, Agent, or Firm—Harness, Dickey & Pierce

[57] ABSTRACT

Control systems including control circuitry and optional communications systems for operating a sliding power-operated member of an automotive vehicle. A powered sliding door in an automotive vehicle, such as a van, moves along a predetermined path of travel between a closed position and a fully open position relative to the body of the vehicle. Such a sliding door may be provided with one or more electrically-operated actuators for performing functions associated with the door, such as power opening and closing the door, power unlatching the door, power locking and unlocking the door, and power clamping, and unclamping the door in a soft or low-momentum manner. The invention is directed toward improved control systems and circuitry for operating such power-sliding door systems. One such control system employs a wireless communications link between the door and body, which is preferably implemented using radio frequency communication signals containing digitally encoded control signals. Control circuitry is preferably provided in the body and the door of the vehicle for supervising and carrying out the foregoing functions in an orderly manner in response to requests generated locally at the door or remotely by the driver from the console of the vehicle. A second, simpler, control system provides electrically-actuated mechanisms for unlatching the door and operating the door lock without the use of either a wireless communication system or a retractable electrical cable interconnecting the sliding door to the vehicle body.

19 Claims, 30 Drawing Sheets

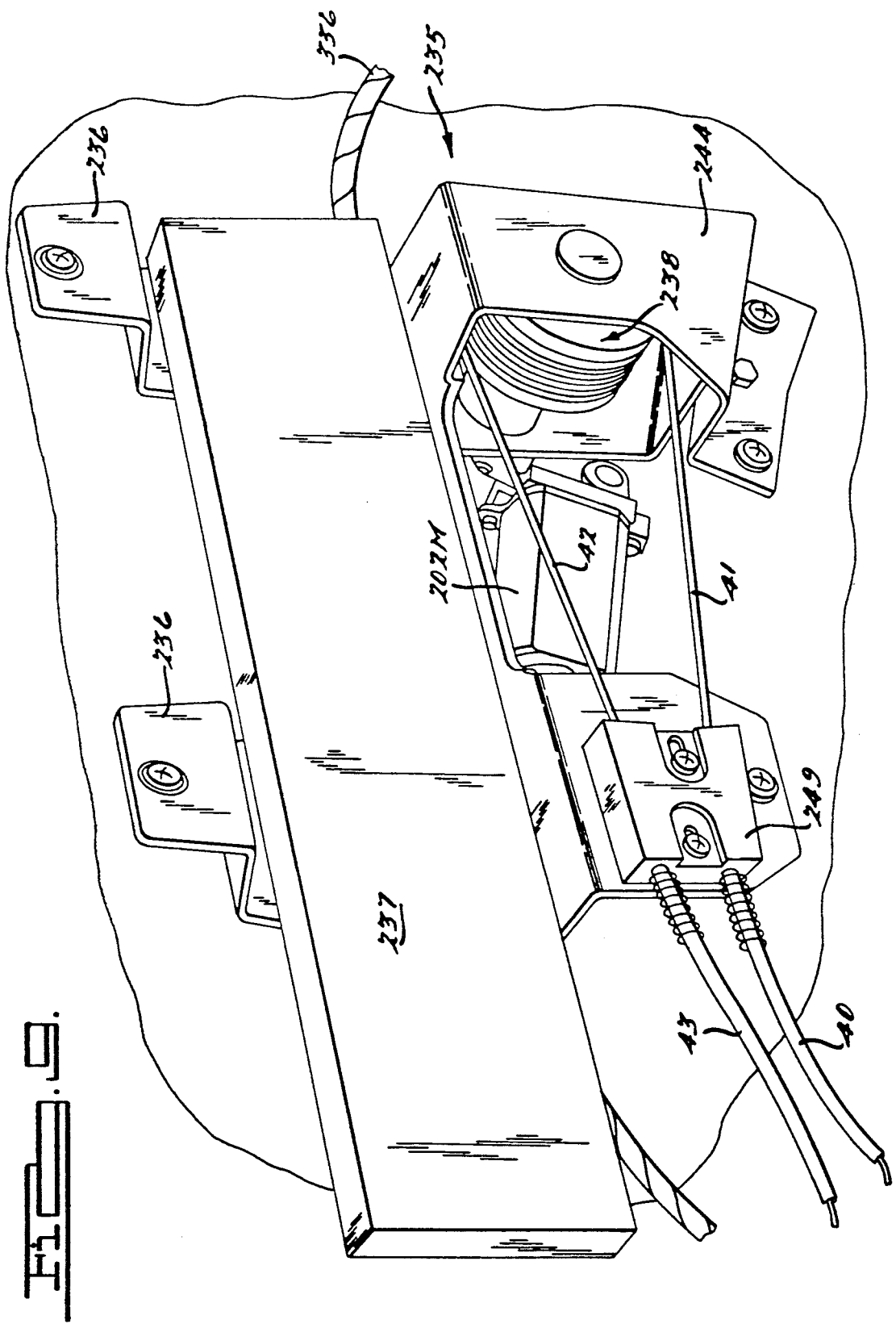

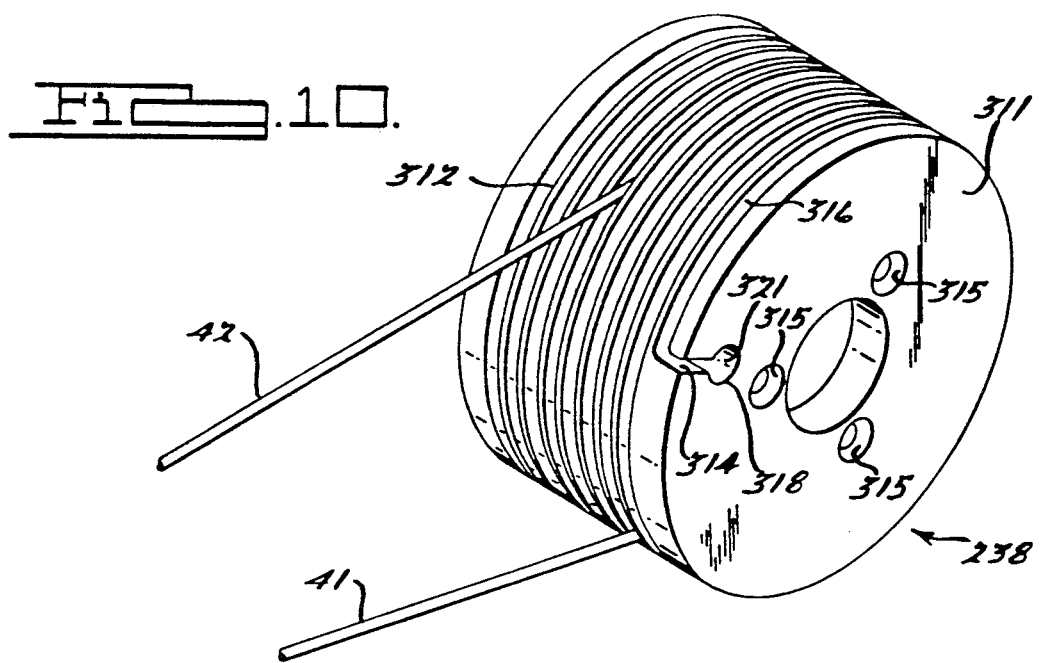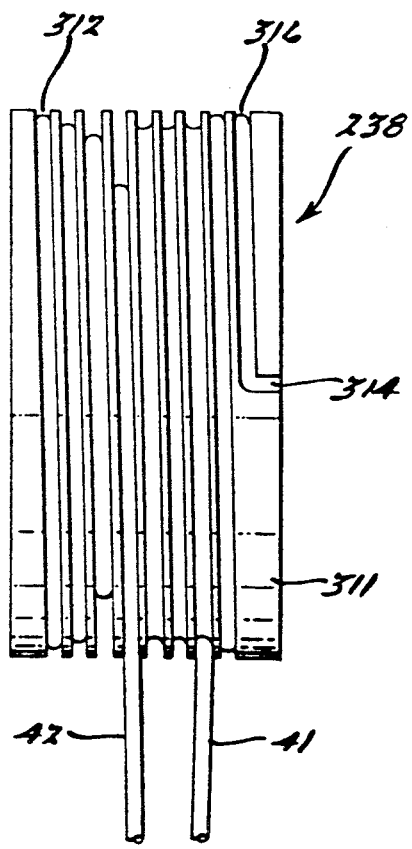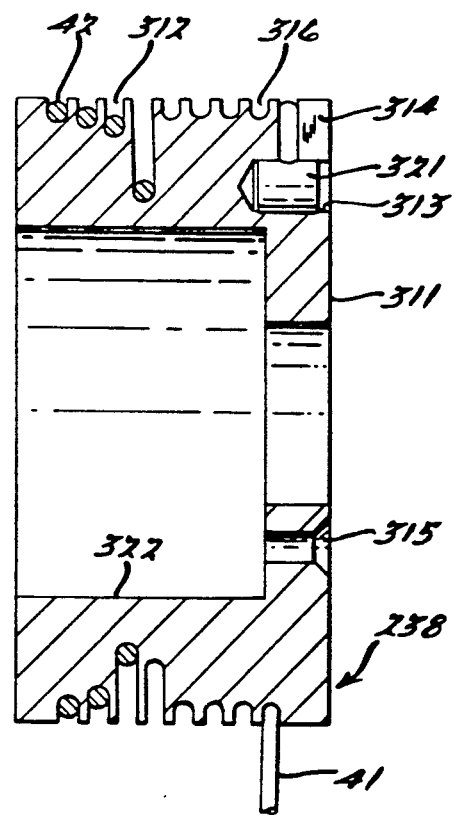

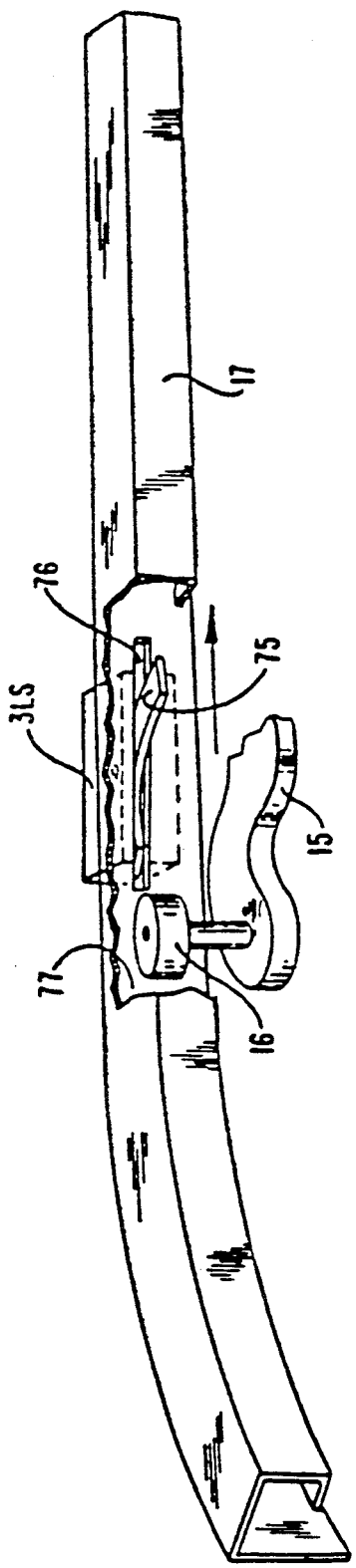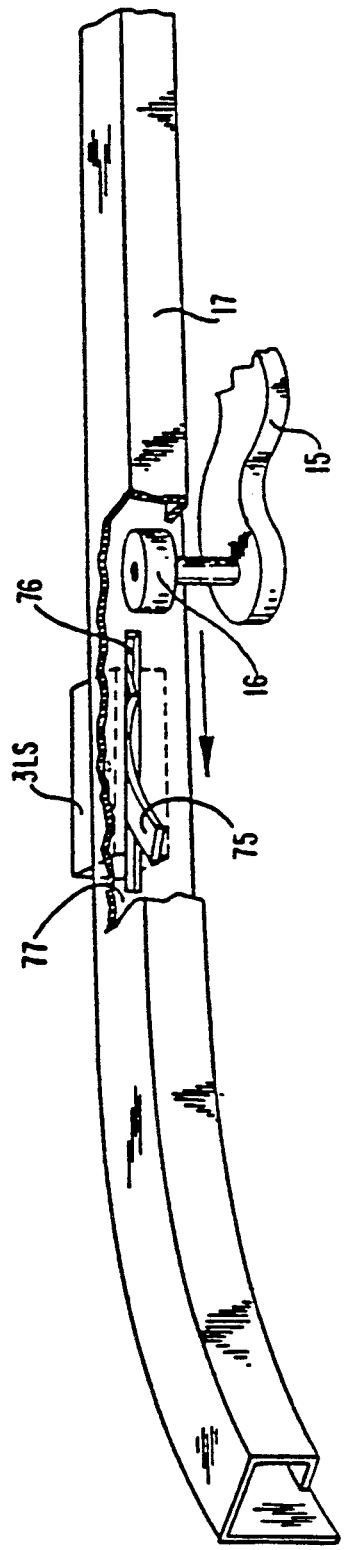
FIG. 15A
FIG. 15B

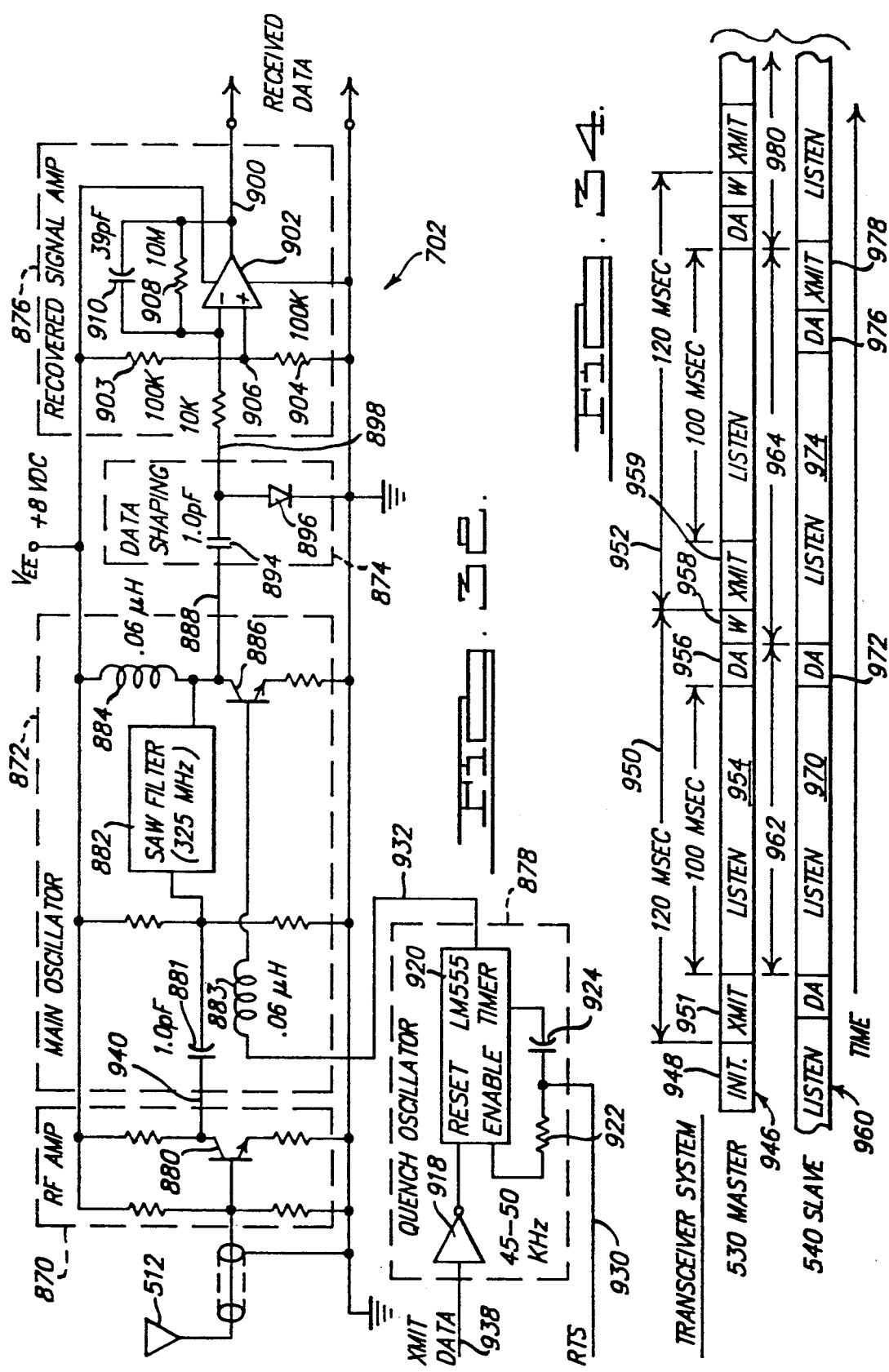

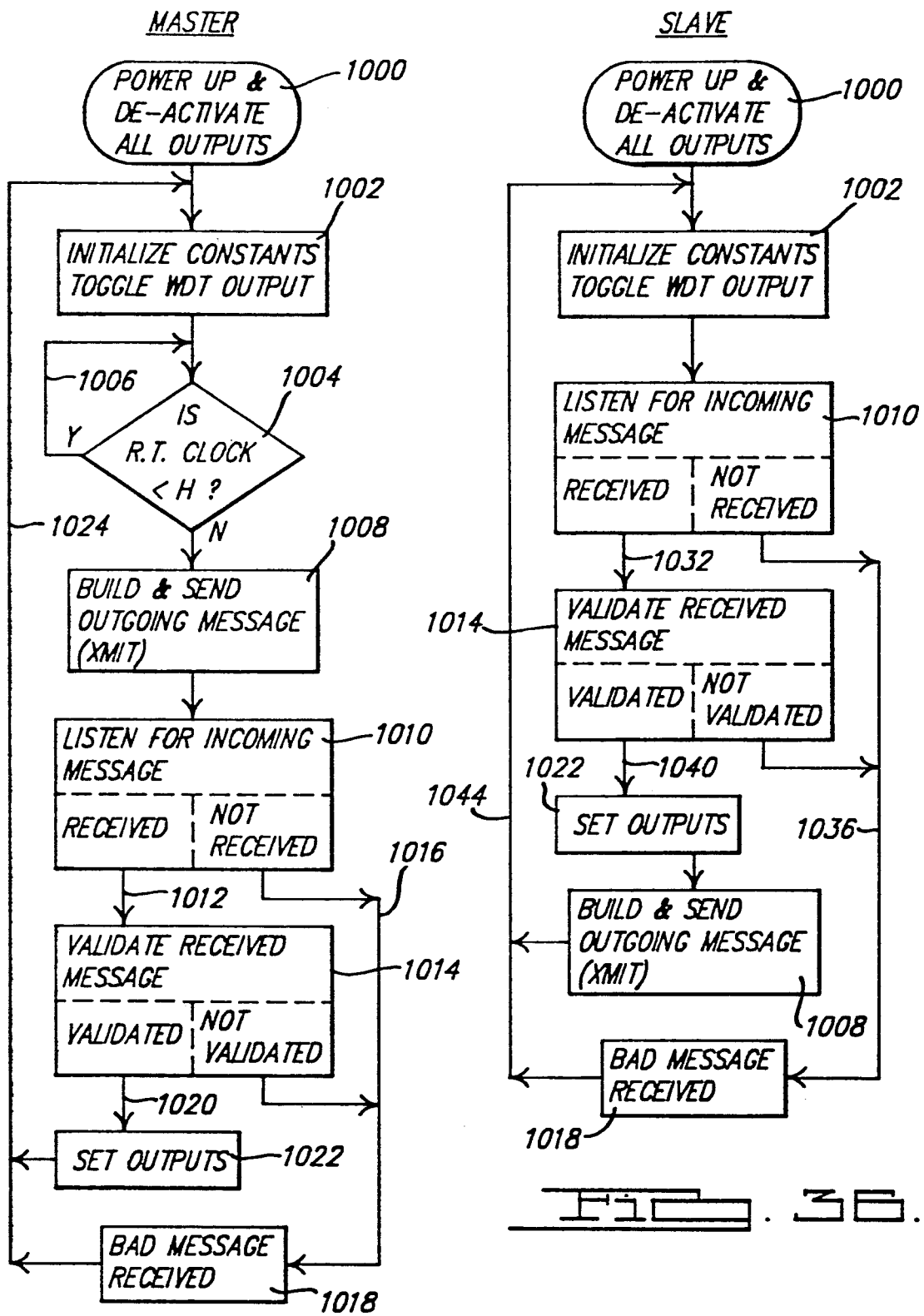

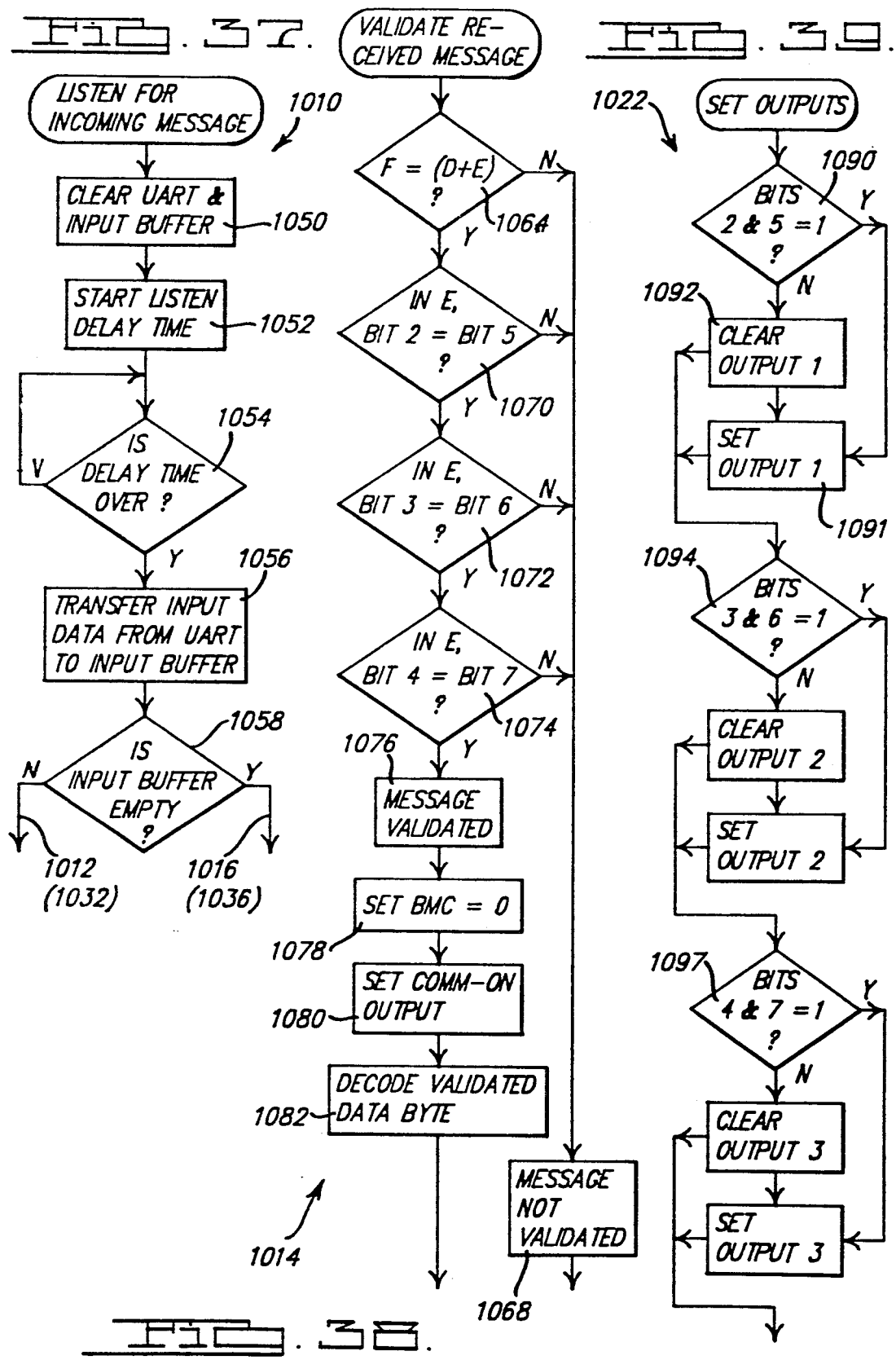

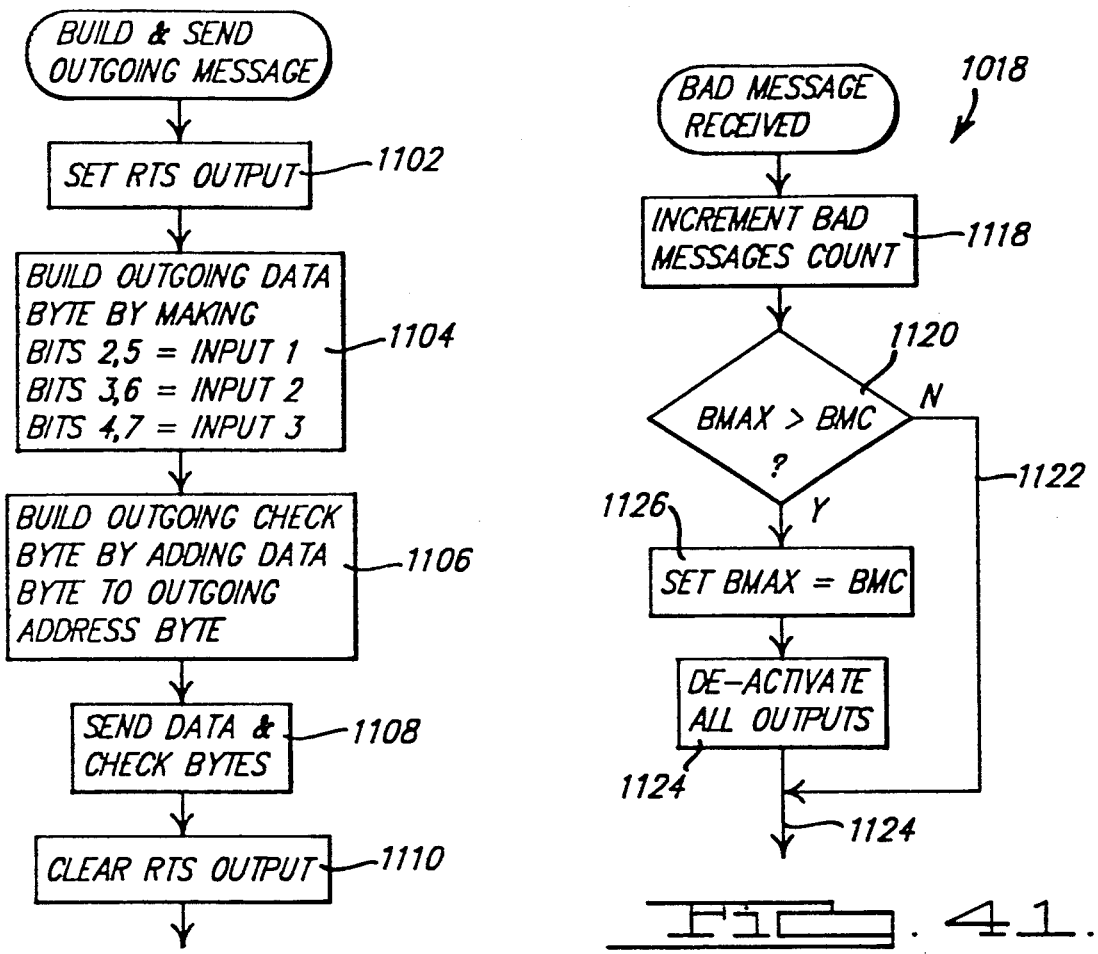
FIG. 40.
FIG. 41.
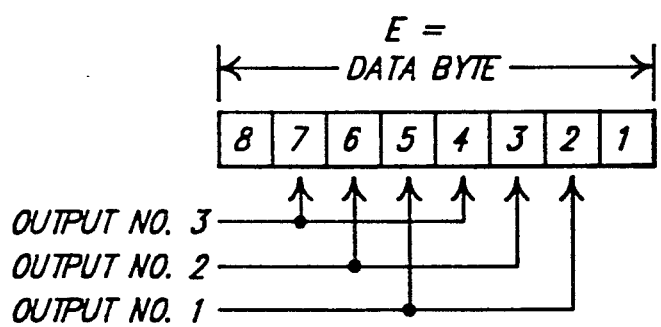
FIG. 33.

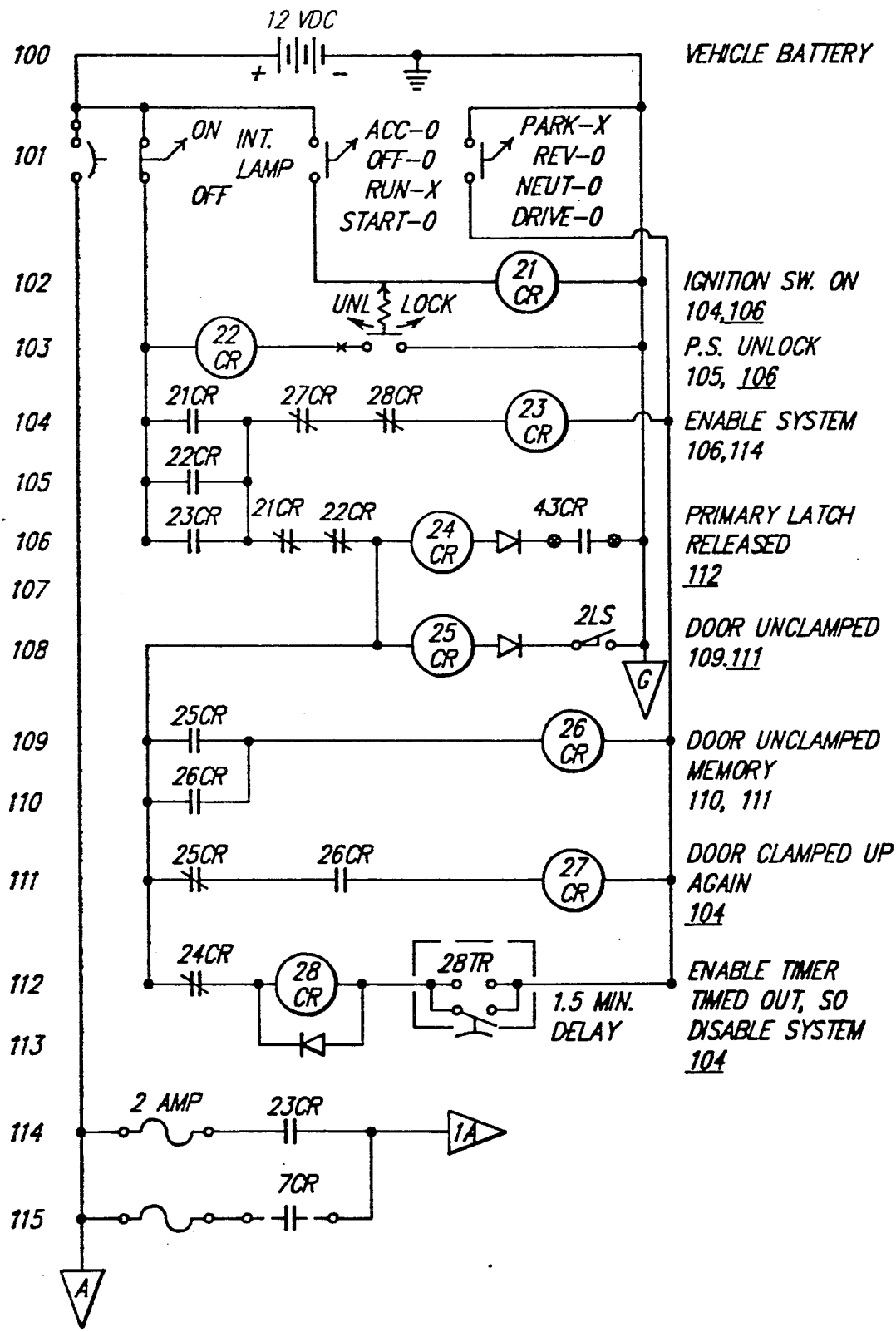

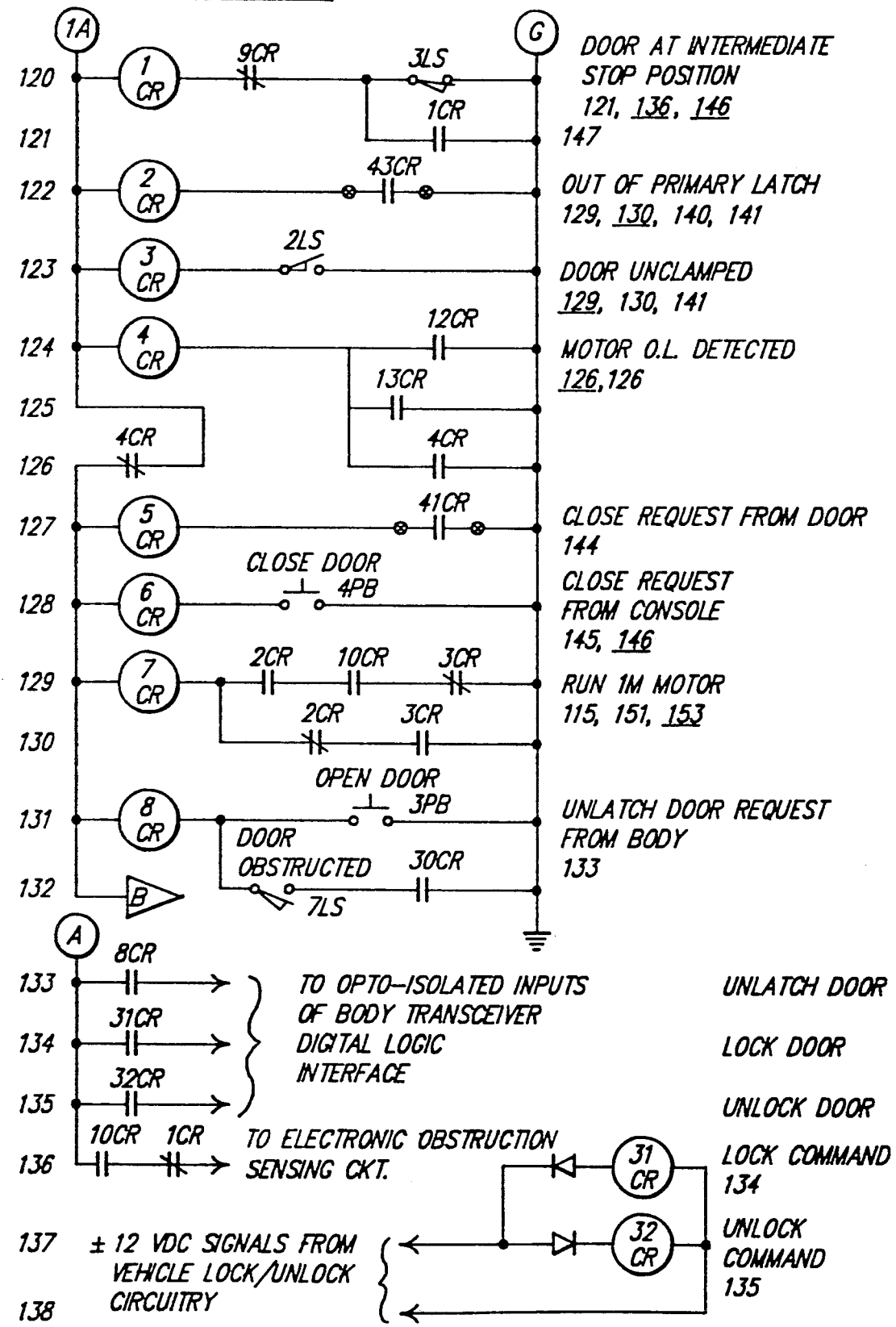

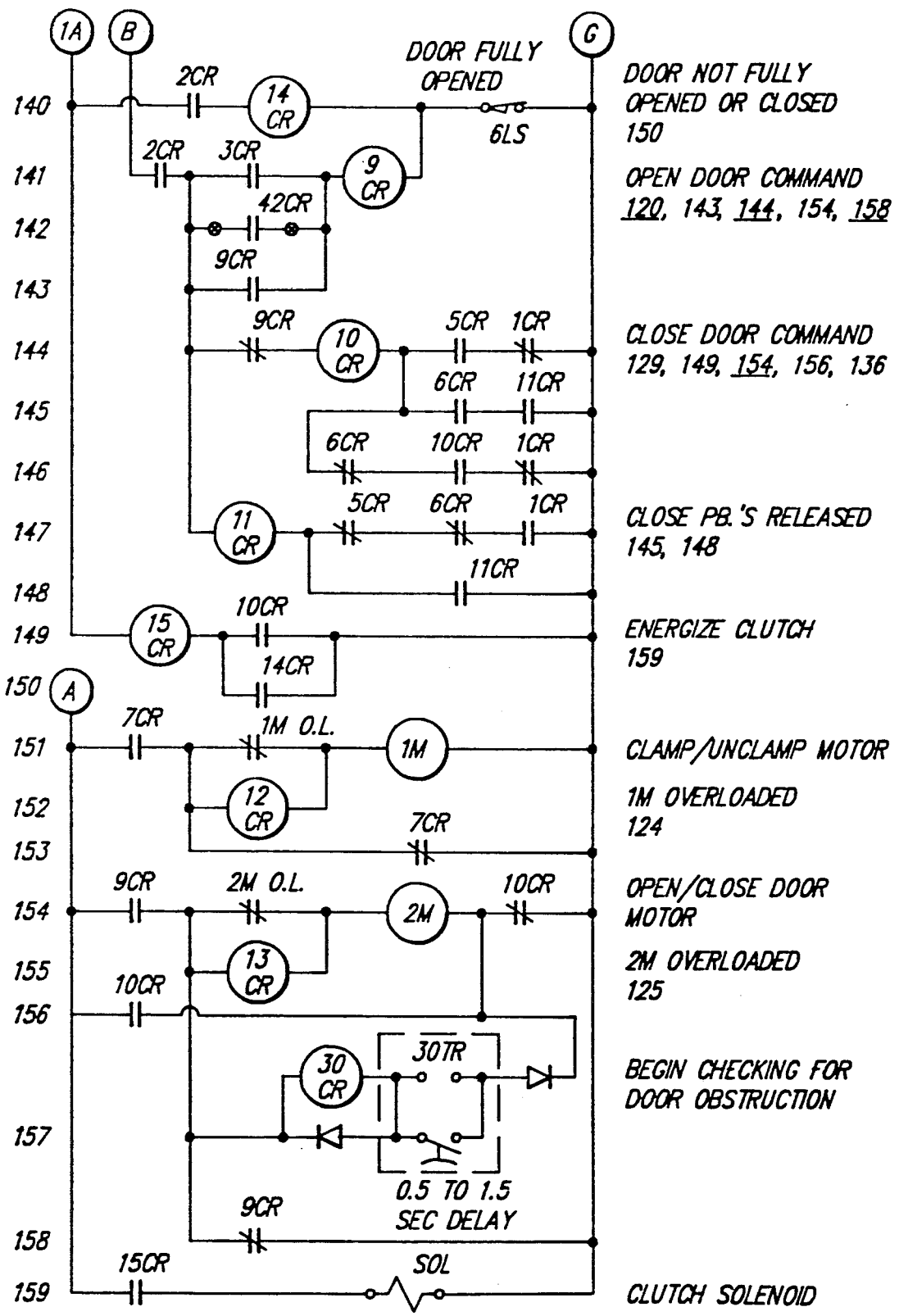

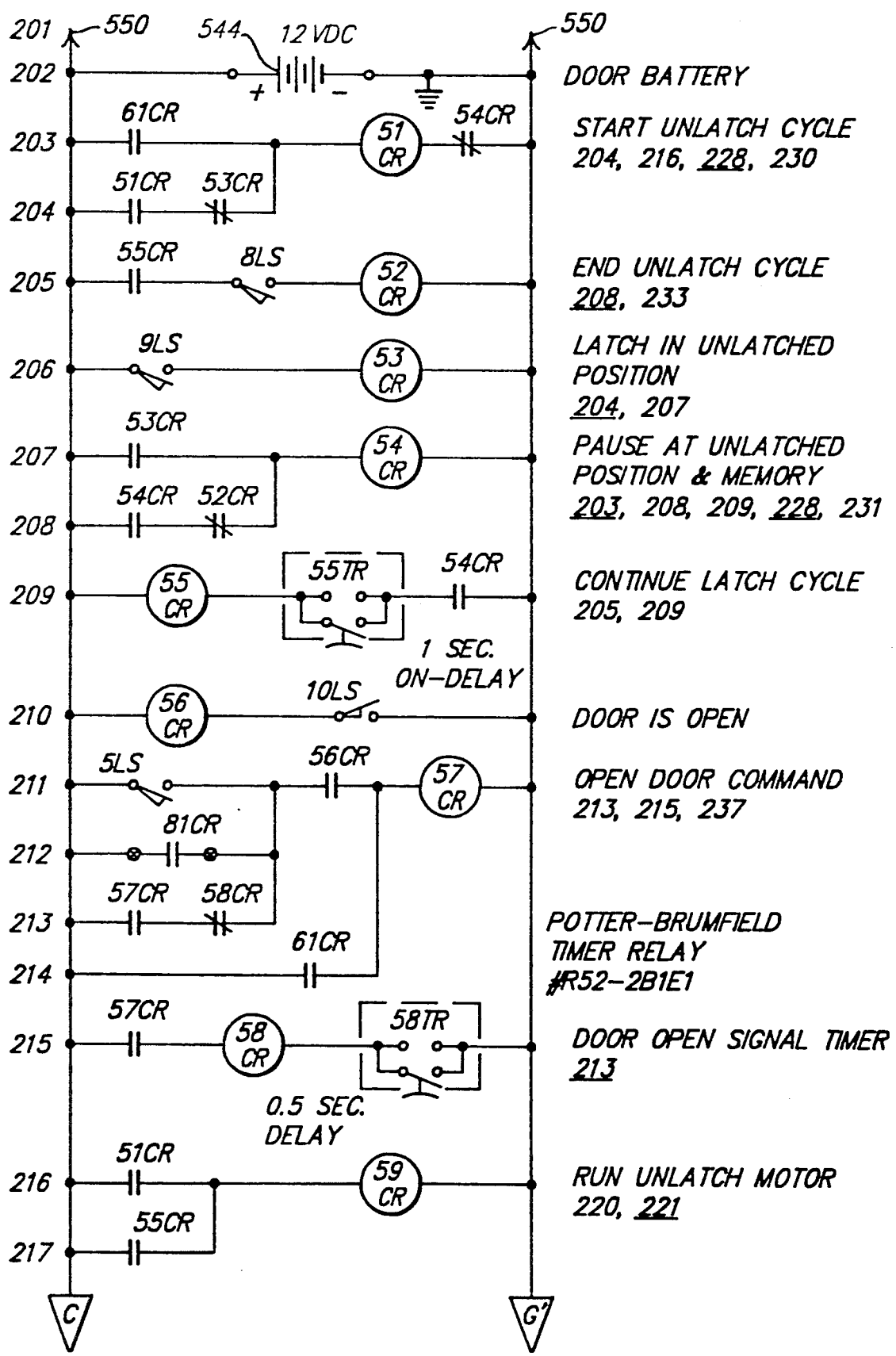

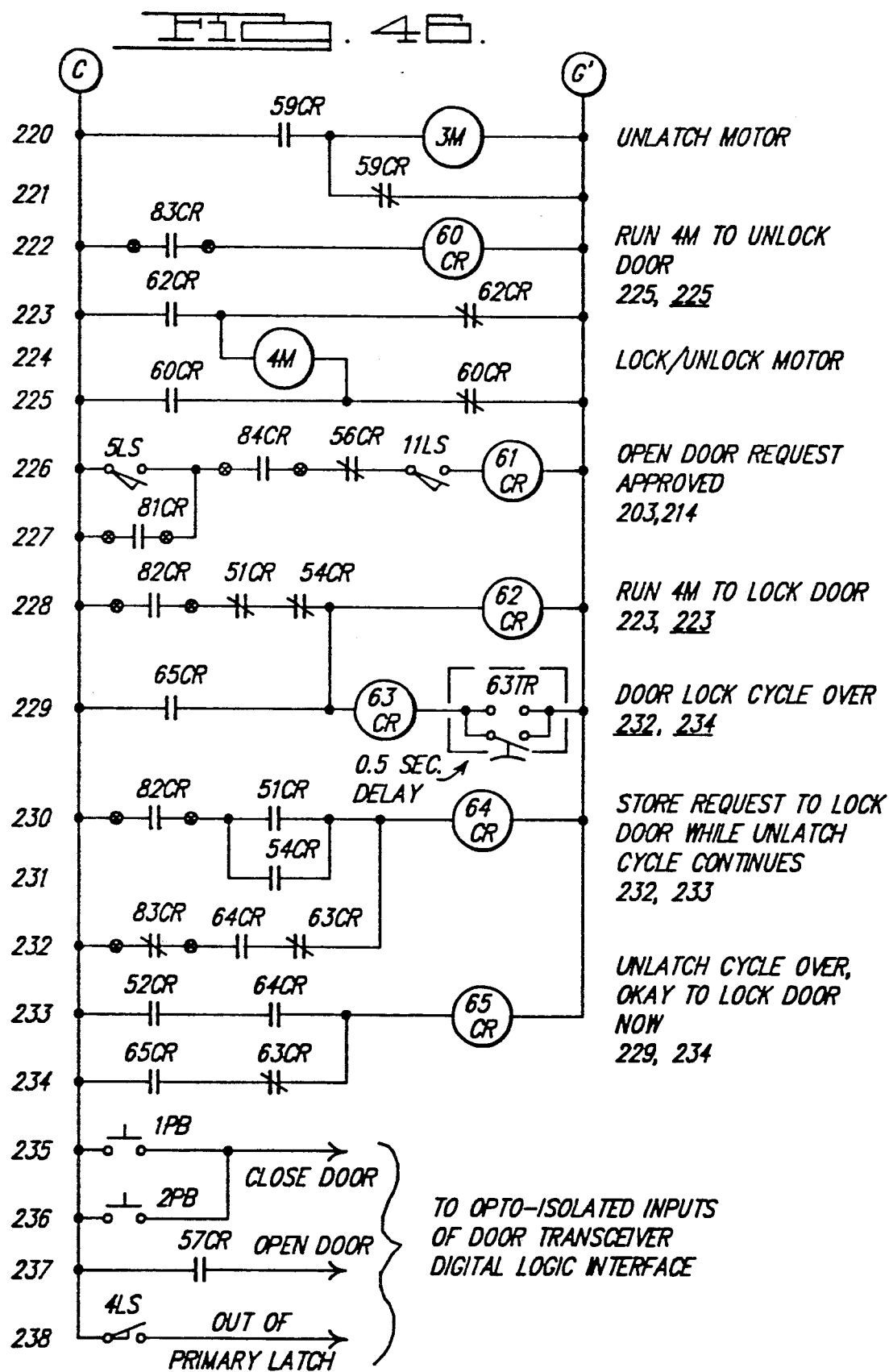

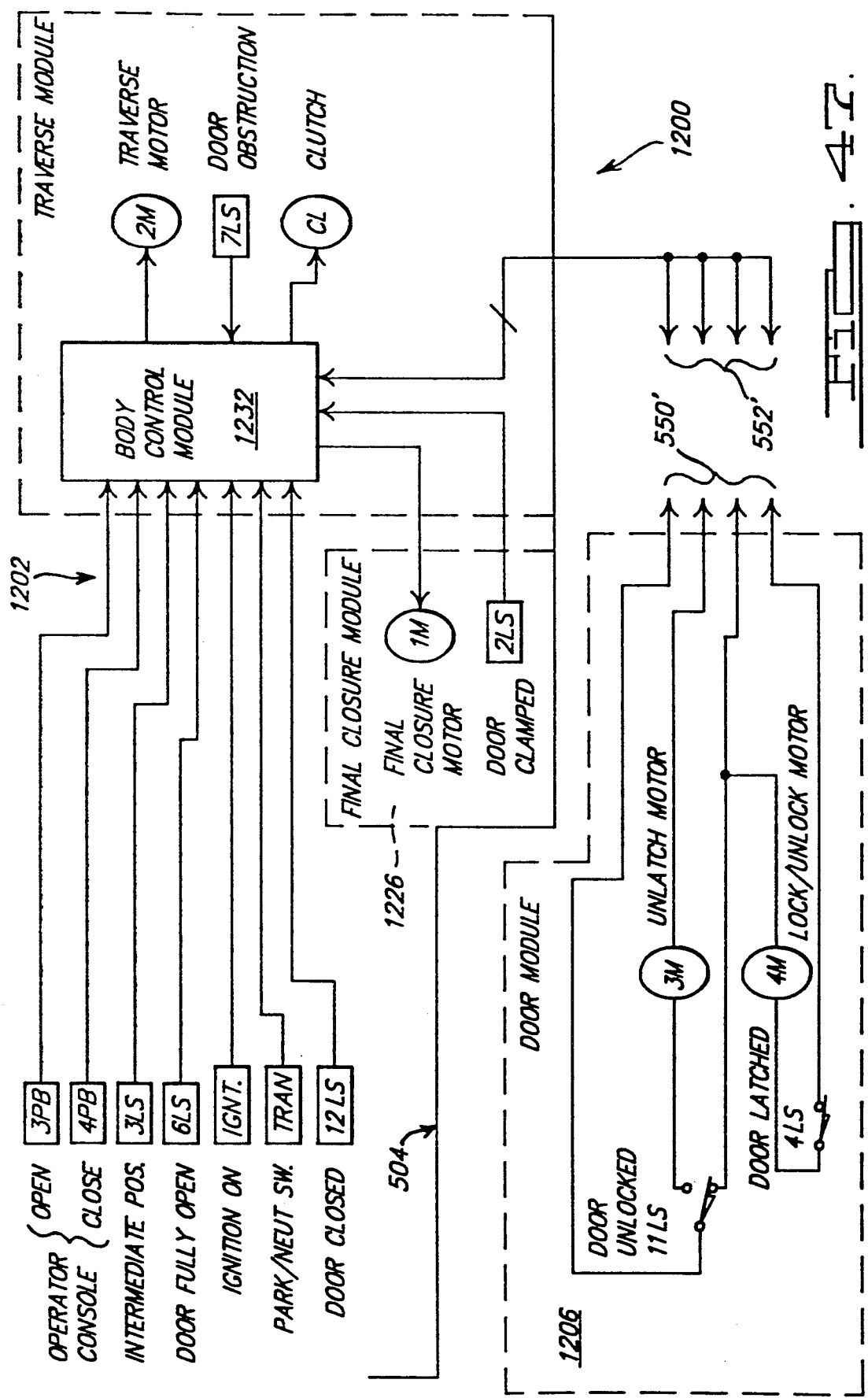

CONTROL APPARATUS FOR POWERED VEHICLE DOOR SYSTEMS

CROSS REFERENCE TO RELATED PATENTS AND APPLICATIONS

This invention is related to the inventions disclosed and claimed in U.S. Pat. Nos. 4,887,390, 4,862,640, 4,842,313, and 4,775,178, all of which are assigned to the same assignee as the present invention, and the disclosures which are hereby incorporated by reference herein. This invention is also related to the inventions disclosed and described in related copending applications for United States Patents, entitled "VARYING RADIUS HELICAL CABLE SPOOL FOR POWERED VEHICLE DOOR SYSTEMS", U.S. Pat. No. 5,025,591, "REVERSING APPARATUS FOR POWERED VEHICLE DOOR SYSTEMS", Ser. No. 497,546, filed Mar. 22, 1990, and "POWERED CLOSING ASSIST MECHANISM FOR VEHICLE DOORS OR LID MEMBERS", now U.S. Pat. No. 4,984,385 issued Jan. 15, 1991, all of which are filed on the same date as this application and are assigned to the same assignee as the present invention and the disclosures of which are hereby incorporated by reference herein

BACKGROUND AND SUMMARY OF THE INVENTION

This invention relates to control apparatus for controlling powered sliding members on automotive vehicles and, more particularly, to powered sliding door systems for van type vehicles having a door opening in a side wall thereof.

In van applications of the invention, a sliding door is moved generally parallel to the side wall of the van during its initial closing movement and for a major portion of its full closing movement, as well as during a major portion of its full opening movement, including its final opening movement. Typically, the sliding door moves generally toward and generally away from the plane of the door opening during a portion of its respective final closing and initial opening movements, so as to be flush with the side wall when fully closed, and so as to be alongside of, and parallel to, the side wall, generally rear of the door opening, when fully opened.

In sliding door systems of the type mentioned above, upper and lower forward guide rails are attached to the top and bottom portions, respectively, of the door opening, and a rear guide rail is attached to the exterior of the side wall, at an elevation approximately midway between the elevation of the upper and lower forward guide rails. The respective forward end portions of the various guide rails are curved inwardly of the body of the van, and bracket and roller assemblies are fastened to the respective upper and lower forward ends of the sliding door, as well as to an intermediate position at the rear end of the sliding door. Such bracket and roller assemblies are slidingly supported in the guide rails to guide the door through its opening and closing movements.

Various portions of the opening and closing movements of van sliding doors have different power requirements. Thus, the initial door closing movement and a major portion of the subsequent door closing movement are high displacement/low force translational movements, during which little force is required to achieve large door movements since only frictional resistance and grade-caused gravity resistances must be overcome. Similarly, the final opening movement and a major portion of the preceding opening movement are also high displacement/low force translational movements for the same reasons. In contrast, however, a portion of the final closing movement of the door is a low displacement/high force movement. This is because during final closing, an elastomeric weather seal surrounding the door opening must be compressed, and an unlatched latch bolt on the door must engage and be rotated to a latched position by a striker pin at the rear of the van body door opening. During manual operation, sliding van doors are typically moved with great momentum through their entire closing movements in order to assure full weather strip compression and latch bolt operation at the end of such movement.

Various powered van door systems have been developed in the past, including those described in the above-mentioned related United States Patents. Another such system is illustrated in U.S. Pat. No. 4,612,729, issued to Sato. In the Sato patent, a motor driven pinion carried by the lower front bracket and roller assembly of the door cooperates with a rack gear carried by the lower front guide rail in the door opening to move the door between its fully open and fully closed positions. In this arrangement, as in the case of the manual door operation discussed above, a high momentum is still required during the entire closing movement.

Similarly, U.S. Pat. No. 4,617,757, issued to Kagiyama et al, and U.S. Pat. No. 4,640,050, issued to Yamagishi et al, also represents additional examples of powered van door systems. The systems employ cable drives coupled to the lower front bracket and roller assemblies of the doors for opening and closing movements. However, these systems also rely on high momentum during the entire closing movement.

U.S. Pat. No. 4,462,185, issued to Shibuki et al, describes still another powered van door system. In this system, a friction wheel engages the bottom portion of the door and drives the door through the major portions of its opening and closing movements parallel to the side wall of the van. Turntable arms are pivotably connected end-to-end between the friction wheel and the floor of the door opening and draw the rear of the door inwardly to compress the weather strip. While this prior art design appears to operate with lower momentum forces during closing movement than those discussed above, it requires a complicated, costly mechanism that is difficult to install and difficult to repair in the event of a breakdown. Moreover, retrofitting this mechanism to a vehicle not originally equipped with a powered door system would be inordinately difficult.

In addition to the foregoing prior art systems, final closing devices or clamping mechanisms for powering the final, low-displacement/high-force movement of sliding van doors have been developed by the assignee of the present invention and are described in the above-mentioned U.S. Pat. Nos. 4,775,178 and 4,842,313, the disclosures of which are incorporated by reference herein. In each of these systems, the door includes a latch bolt member moveable between latched and unlatched positions, as well as a handle or a lock member movable between open and closed positions. The final closing device or clamping mechanisms each includes a striker support plate mounted on the vehicle body at the rear of the door opening for rotational movement about a perpendicular axis, a striker pin projecting from the striker support plate at a position offset from the axis, and means carried by the vehicle body for rotating the striker support plate. The striker pin is movable between extended and retracted positions so that when the striker pin is engaged by the latch member bolt, the striker support plate is rotated, and the sliding door is moved between a partially open position away from the door opening and a fully closed position. In addition to disclosing the foregoing structure, U.S. Pat. No. 4,842,313 also discloses a crashworthiness feature that adds a pawl and ratchet mechanism to prevent the striker support plate from being reversely rotated in response to high door opening forces from the inside of the vehicle.

Although U.S. Pat. Nos. 4,775,178 and 4,842,313 illustrate excellent final closing systems for sliding van doors, they do not include provisions for powering van doors through the major portions of opening and closing movements, nor do they include provisions for powering van doors during late closing movements to the point where the latch bolt mechanisms engage with, and close about, the striker pins of the clamping mechanisms.

Improved powered sliding door operator systems for van type vehicles are disclosed in the above-mentioned U.S. Pat. No. 4,862,640, with the disclosed systems having provisions (i) for powering sliding van doors through the major portions of opening and closing movements, (ii) for powering sliding van doors during late closing movements to engage the latch bolt mechanisms with the striker pins, and (iii) for finally clamping sliding van doors to a fully closed position. In such patent, the disclosure of which is hereby incorporated by reference, the door is supported adjacent its forward end by forward brackets slidable in upper and lower forward guide members carried by the vehicle body, and is supported adjacent its rear end by a rear bracket slidable in a middlemen rear guide member carried on the outside of the vehicle side panel. Motor driven cable members are attached to the rear bracket and supported adjacent opposite ends of the rear guide member and are employed to move the door through its opening movement, through its initial closing movement, and through an initial portion of its final closing movement. The final portion of its closing movement is accomplished using a final clamping mechanism of the type disclosed in the above-mentioned U.S. Pat. No. 4,842,313.

In the three related applications filed on the same even date with the present application, there are disclosed various aspects of an improved power sliding door operator system for van type vehicles in which the sliding door moved with low momentum between its fully open position and nearly closed position, and which completely closed the sliding door in a controlled manner.

It is a primary object of the present invention to provide control systems and control circuitry for operating the power door sliding systems of the type disclosed in the copending patent applications, which are generally described in pertinent part herein.

Another object of this invention is to provide a control system for a powered sliding door which employs a wireless communications link between the sliding door and the body portion of the vehicle, thus eliminating the need to provide a retractable electrical cable extending between the sliding door and body.

Another object of the present invention is to provide a reliable, low-power wireless communications system for sending control signals between control circuitry resident in the sliding door and a control circuitry resident in the bodied portion of the vehicle.

Still another object of the present invention is to provide improved control strategies and methods for handling a variety of situations encountered in operating a power sliding door system, including establishing hierarchies of functions to be carried out by the power equipment employed in such sliding door operating systems.

In accordance with a first aspect of a first exemplary embodiment of the invention, a control system is provided for a sliding power-operated member, such as a side door, mounted to a body portion of a self-propelled motor vehicle, such as a van. The control system comprises: first wireless communication means, mounted on the body portion of the vehicle, for transmitting through space to the sliding member a first communications signal containing information relating to at least a first control signal for controlling a first function associated with the sliding member; and second wireless communication means, mounted on the sliding member, for receiving from space the first communications signal and obtaining therefrom the control signal. The control system further comprises means, mounted on the sliding member, for performing a predetermined function associated with a first power operation of the sliding member in response to the obtained first control signal. The first control signal may be an unlock request and the power operation may be an unlocking of a lock associated with the sliding member. Alternatively, the first control signal maybe an unlatch request and the power operation may be an unlatching of a mechanical latch associated with the sliding member. In addition to the first and second wireless communications means, third and fourth wireless communications means may be provided to establish bidirectional communications between the portion of the control system on the sliding member and the portion of the control system on the body portion of the vehicle. The wireless communications means preferably employ radio frequency signals having a frequency in the hundreds of Megahertz. One suitable implementation for the communications means includes a pair of super-regenerative amplifiers, with one such amplifier being located on the sliding member and the other being located on the body portion of the vehicle.

According to a second aspect of the first embodiment of the invention there is a provided a control system for a power-operated movable member slidably mounted to a body portion of a self-propelled vehicle. This control system comprises first and second bidirectional wireless communications means, respectively mounted on the body portion of the vehicle and the movable member, for transmitting and receiving through space communication signals containing information related to a plurality of control signals for controlling a plurality of functions associated with the movable member. In this control system, two-way communications are established, and the control system includes at least first and second electrically-powered actuator means, respectively mounted on the body portion and the sliding member, for respectively performing at least first and second ones of the plurality of functions associated with the power operation of the sliding member in response to information obtained in the communication signals In accordance with a third aspect of the first embodiment of the present invention, there is provided, in a control system for operating a sliding power-operated door movable along a predetermined path of travel between a closed position and a fully open position, control circuitry within the sliding door for operating electrically-powered equipment within the door. This control circuitry comprises: control logic means for locally controlling the operation of the electrically-powered equipment within the sliding door; and battery means for storing electrical power required to run the control logic means and the electrically-powered equipment within the sliding door when the door is not in its closed position. By using such a battery means, this control circuitry remains active when the door is in a position between its closed position and its fully open position, without the use of electrical cables extending between the door and the body. The battery used for storing electrical power may be recharged when the door is in its fully closed position through two sets of electrical contacts, one set on the door and the other set on the body, which are in physical contact and provide a direct electrical connection when the door is in its closed position. The electrically controlled equipment within the door may include a first power device, such as an electric motor or solenoid, for locking and unlocking the sliding door, and a second power device, such as an electric motor or solenoid, for moving the mechanism within the door which unlatches the sliding door. The control logic means within the control circuitry preferably includes means for starting the electric motors and for monitoring the status of the mechanisms being controlled by the electric motors. The control logic means acts on a local basis to determine whether to and when to respond to requests received from the body section over the wireless communication system.

A second embodiment of the present invention provides a simpler power sliding door control system which utilizes neither a wireless communication system nor a retractable electric cable extending between the sliding door and the body. Nevertheless, this control system does enable the sliding door to be closed from a remote location, such as the driver's console under power provided by the automatic door operating equipment. Further, the control system can be provided with an obstruction detection capability which will cause the door to reverse and move to its full open position in the event that the door meets an obstruction during the closing cycle. This control system also allows power operation of the door locks and unlatch function when the door is in its closed position. This control system for operating the sliding power door comprises first and second electric actuation means mounted to the body portion of the vehicle, and third and fourth electric actuation means located within the door. The first actuation means includes electric motor and is for driving the door so that it traverses along its predetermined path of travel in either direction. The second means is for operating a low momentum door clamping mechanism for clamping the door firmly against the body portion and for releasing the door from this clamped position. The third electric actuation means is for unlatching a latch mechanism which helps hold the door in place relative to the body. The fourth means is for power locking and unlocking of the door lock. In this control system, electrical connections may be provided by first and second sets of electrical contacts which make electrical and physical contact with one another when the door is in its closed position.

Additional aspects, objects, advantages, and features of the present invention will become apparent from the following description and appended claims, taken in conjunction with the accompanying drawings.

BRIEF DESCRIPTION OF THE DRAWINGS

FIG. 9 is an enlarged perspective view, illustrating one preferred embodiment of a cable spool assembly according to one of the related inventions.

FIG. 10 is a perspective view of the cable spool, and portions of associated cables, of FIG. 9.

FIG. 11 is a top view of the cable spool, and portions of associated cables, of FIGS. 9 and 10.

FIG. 12 is a radially-cut, cross-sectional view of the cable spool of FIGS. 9 through 11.

FIGS. 15A and 15B are fragmentary perspective views of a limit switch arrangement in the upper forward guide of the sliding door, which is actuated and deactuated when the door reaches a predetermined intermediate point during its movement between its fully opened and closed positions.

FIG. 32 is a schematic electrical diagram of a preferred radio frequency ("RF") transmitter/receiver circuit used in the wireless control system of FIG. 26.

FIG. 33 is a pictorial representation of the data byte of the two-byte serial data stream sent and received by the transceiver of FIG. 26.

FIG. 34 is a simplified timing diagram illustrating the master/slave half-duplex communications protocol used by the body side and door side transceivers of FIG. 26.

FIGS. 35 and 36 are simplified flowcharts showing the overall sequence of operation of the programmed microcontroller of FIG. 29 required to carry out the master/slave half-duplex communications protocol of FIG. 34.

FIGS. 37 through 41 depict various routines carried out under software control by the microcontroller of FIG. 29, with FIG. 37 being a "listen for incoming message" routine, FIG. 38 being a "validate received message" routine, FIG. 39 being the "set output" routine, FIG. 40 being a "build and send outgoing message" routine, and FIG. 41 being a "bad message received" routine.

FIGS. 42, 43 and 44 constitute a schematic relay ladder diagram of a preferred body side control logic circuit for the FIG. 27 system.

FIGS. 45 and 46 constitute a relay ladder diagram of a preferred door control logic circuit for the FIG. 28 system.

FIG. 47 is a simplified block diagram of another embodiment of the control system of the present invention for a power sliding door system for a van which employs neither a wireless communications system nor a retractable electrical cable.

DETAILED DESCRIPTION OF THE PREFERRED EMBODIMENTS

Figure 1:
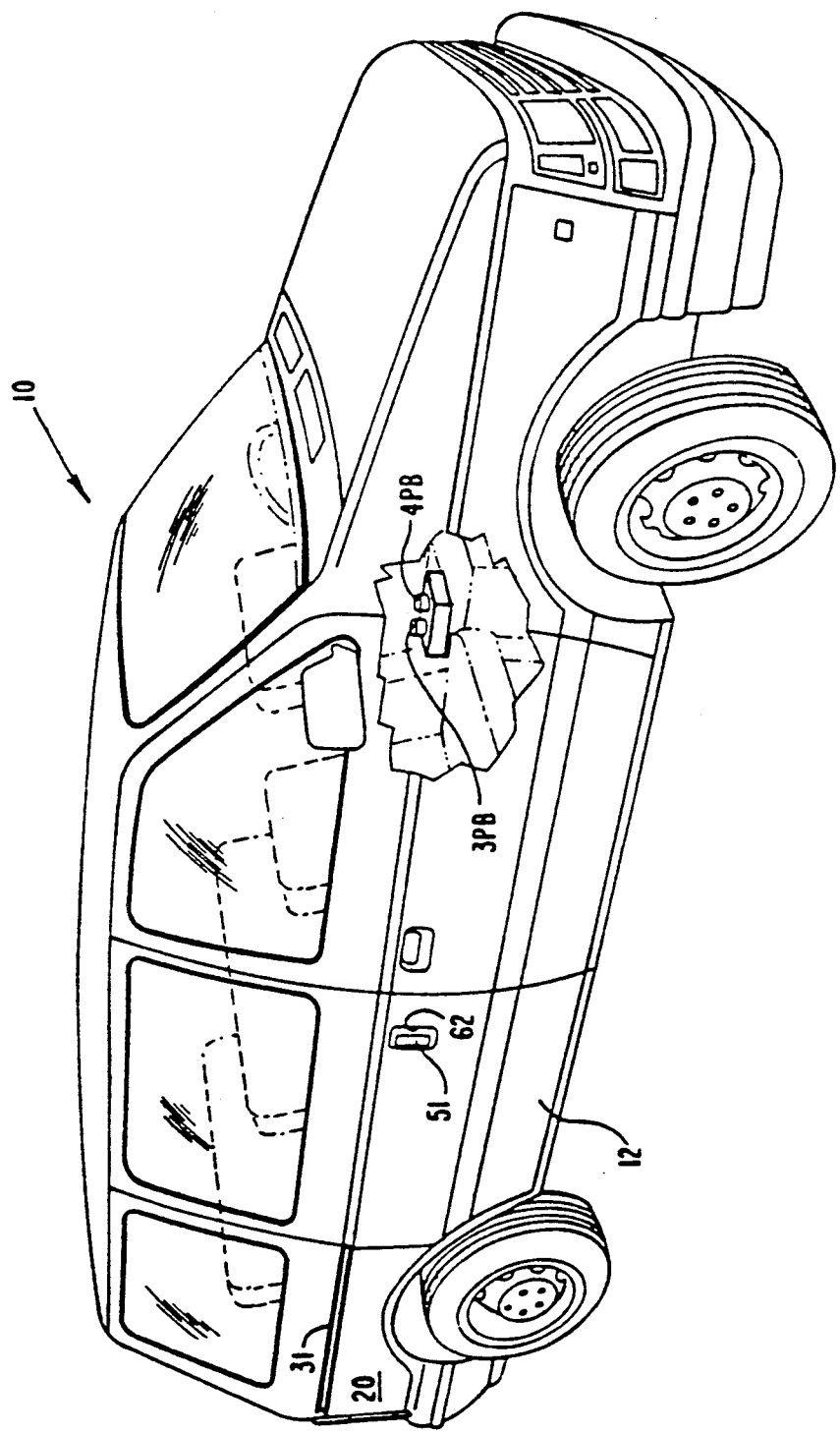
FIG. 1 is a perspective view, with parts broken away for clarity, of a van-type vehicle having a powered sliding door system in accordance with the present invention.

FIGS. 1 through 49 show preferred embodiments of the present invention, as applied to a powered door operating system for a vehicle sliding door, for purposes of illustration only. One skilled in the art will readily recognize from the following discussion that the principles of the present invention are equally applicable to other powered member operating systems used in self-propelled vehicles. FIG. 1 through 25 focus upon the mechanical aspects of the sliding door operating systems (including placement of electrical switches and other electrically-powered components), and FIGS. 26 through 49 focus upon the electrical control systems, wireless communications systems and control circuitry of the present invention used to control such power sliding door operating systems.

In FIGS. 1 through 8, a van type of vehicle 10 is illustrated, and a powered door operator and door operating system is used to open and close a sliding door 12. The sliding door 12 is supported on the body of the van 10 at three points. The first point of support includes a forward upper bracket and roller assembly, shown generally at reference numeral 14 (FIGS. 2 and 8), which in turn includes an arm 15, one end of which is fastened to the upper forward end of door 12, and the other end of which carries one or more rollers 16 on its upper surface. A number of rollers 16 engage and ride in a curved upper forward guide rail or guide member 17 which is fixedly carried on the lower surface of a vehicle body member 18, which surrounds a door opening 19 formed in a side wall 20 of the van 10.

The second point of attachment comprises a forward lower bracket and roller assembly, shown generally at reference numeral 21, which includes an arm 22 having one end fixedly attached to the lower forward end of the door 12 and one or more rollers 23 carried at the other end. The rollers 23 engage and ride in a curved lower forward guide rail or guide member 24 attached to a vehicle body member 25, which surrounds the lower portion of the door opening 19.

The third point of attachment includes a rear, mid-level, bracket and roller assembly, shown generally at reference numeral 26, which includes an arm 27 (FIG. 7), with one end of the arm 27 being fixedly attached to the rear end of the door 12 and pivotally attached at the other end 28 to one end of a link 29. The other end of the link 29 carries a plurality of rollers 30. The rollers 30 engage and ride in a curved rear guide rail or member 31 that is carried on the outside of the side wall 20, at an intermediate level, approximately midway between the levels of the upper and lower guide rails 17 and 24, respectively. The guide members 17, 24, and 31 curve adjacent their forward ends toward the inside of the van 10.

Figure 3:
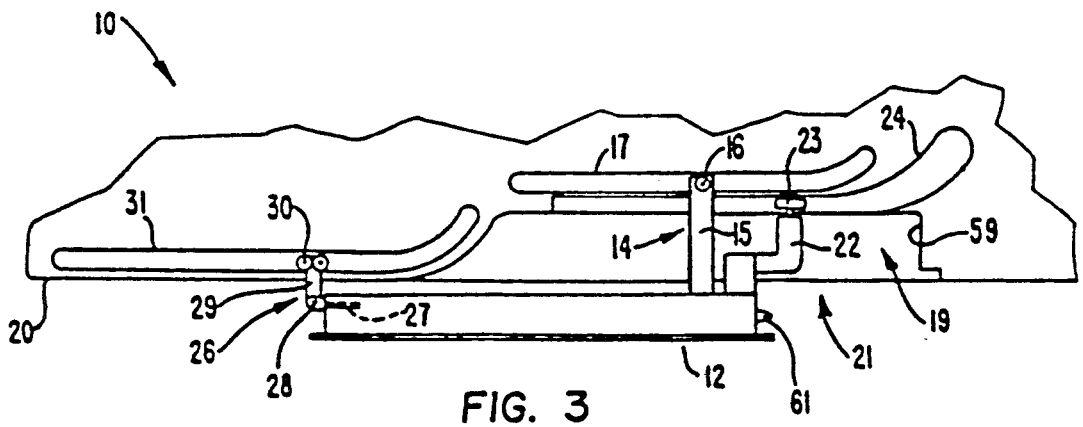
FIGS. 3, 4, and 5 are each diagrammatic views, illustrating the path of movement followed by the sliding door relative to its supporting guide rails during closing of the door.
Figure 4:
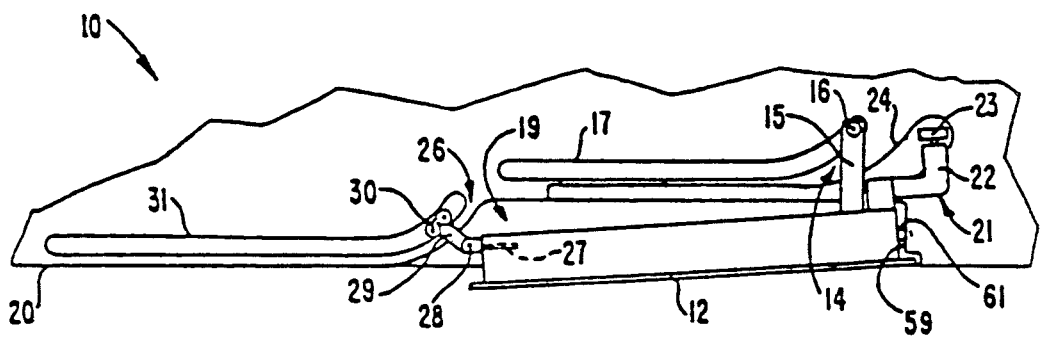
Figure 5:
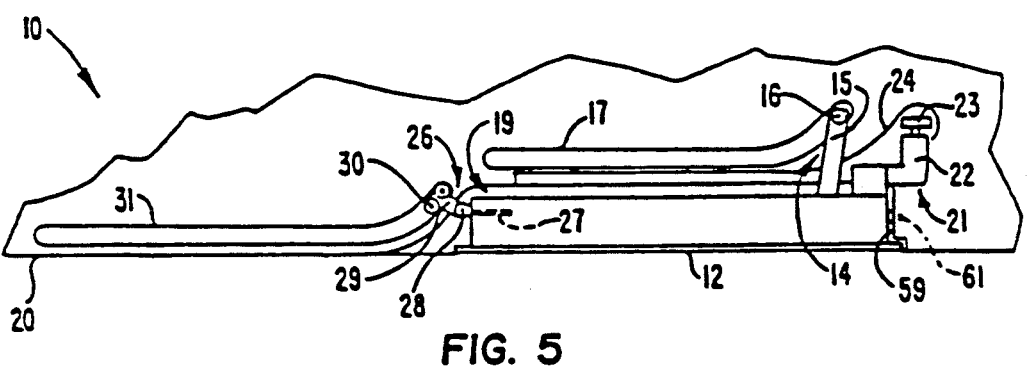

The above-discussed three points of support allow the side door 12 to be slidably moved forwardly and rearwardly along the guide members 17, 24, and 31, with the door 12 being guided by the guide members 17, 24, and 31, through initial closing and final opening movements that are generally parallel to the side wall 20 of the van 10, as shown in FIG. 3, and through final closing and initial opening movements that are generally toward and generally away, respectively, from the plane of the door opening 14, as shown in FIGS. 4 and 5.

Referring to FIG. 3, when the door 12 is opened fully to the left, or rear, relative to the guide members 17, 24, and 31, the rollers 16, 23, and 30 are at the rear ends of their respective guide members 17, 24, and 31. When the door 12 is then moved to the right, or forward, its initial closing movement relative to the side wall 20 is essentially parallel to the side wall 20 for most of its traversing movement towards the door opening 19. As the door approaches the right hand ends of the various guide members 17, 24, and 31, the curved portions of the guide members 17 and 24 are initially encountered by the corresponding rollers 16 and 23 so that the forward end of the door 12 moves inwardly toward the door opening 19 before the rear end of the door 12 starts moving inwardly. Thus, the forward end of the door 12 engages the weather strip in the door frame before the rear end of the door 12, causing a pivoting action, as may be seen by comparing FIG. 4 with FIG. 5. As the rollers 30 of the rear bracket and roller assembly 26 move through the inwardly-curved, forward end portion of the guide member 31, the final closing movement of the door 12 is accompanied by movement of the rear portion of the door into the door opening 19, as shown in FIG. 5.

In FIGS. 6 through 13, a powered door operator or drive assembly 235 is shown and moves the sliding door 12 through its initial and final opening and closing movements. The door operator 235 includes a cable spool drive motor 202M interconnected with a mounting bracket 244, which is attached to the inside of the side wall 20 by way of one or more mounting tabs 236. When selectively energized, the motor 202M rotates a drive pulley or cable spool 238, through a clutch mechanism (not shown) coupled to the motor's gearing and output shaft (not shown). When the clutch mechanism is de. energized, or in an electrical system failure, the motor 202M and its associated gearing are disengaged from the cable spool 238, thus allowing manual operation of the door 12. Optionally, an unclutched, high efficiency, back-driveable spur gear drive mechanism (not shown) may be employed with the motor 202M to rotate the cable spool 238, while still allowing for manual operation of the door.

A lower flexible sheath or conduit 40 extends from a clamp 249 adjacent the cable spool 238 to a clamp member 149 attached to the lower portion of the inside wall 45 of the van 10, generally adjacent the forward end of the wheel well, and securely retains the forward end of the flexible sheath 40. The sheath 40 protects and guides a lower cable member 41 extending around the wheel well between the cable spool 238 and an idler pulley 152. One end of the cable member 41 is anchored on the cable spool 238, as shown in FIGS. 10 through 12, preferably by way of an enlarged cable retainer member 321, which is received and anchored in an opening 313 formed in a flange 311 of the cable spool 238. The opening 313 communicates with a series of helical grooves 316 and 312, by way of a slot 314, which allows the cable 41 to be wound onto a groove portion 312. The other end of cable member 41 passes around an idler pulley 152, and then proceeds through the lower guide member 24, over a wear strip 46 in the guide member 24, to an anchor point (not shown) on the forward lower bracket or arm 22 of the door 12, generally adjacent to roller 23.

An upper flexible sheath or conduit 43 extends from the clamp 249 adjacent the cable spool 238 to a clamp 148 attached to a mid-level location on the inside wall 45 of the van 10, generally adjacent the rear edge of door 12, at a vertical height generally corresponding to the height of the rear guide member 31. The clamp 148 securely holds the forward end of flexible sheath 43 to the wall 45 and protects and guides an upper cable member 42 as the cable member extends along the inside wall of the van 10, between the cable spool 238 and an idler pulley 48 about which it extends. One end (not shown) of the cable member 42 is anchored on the cable spool 238 in the same manner as described above in connection with the cable member 41. The cable member 42 then passes through the sheath 43, around the idler pulley 48, over a wear strip 47 at the forward end of the rear guide member 31, and along the rear guide member 31 (FIG. 7), through a grommeted opening 49 in the link 29 of the rear bracket and roller assembly 26, with its other end anchored on the link 29 by a number of screw clamps 7, 8, and 9, for example.

As shown primarily in FIGS. 10 through 12, the cable spool 238 has an open, generally channel-shaped opening or groove, indicated by reference numerals 312 and 316, formed along a generally helical path on its outer circumferential edge. In contrast to the circular, or non-helical, groove configuration found on conventional drive pulleys, such as that shown in the above-mentioned U.S. Pat. No. 4,862,460, the helical groove configuration of the cable spool 238 avoids the "wrap-up" or "stacking" of the cables 41 and 42 within such a non-helical pulley slot, which undesirably results in an effective wrap radius that varies with rotation of the drive pulley in a manner that causes one of the cables 41 or 42 to be taken up, or paid out, at a rate that is inconsistent with the pay-out or take-up rate of the other cable at many, if not all, stages of powered door operation. These effects thus necessitated the inclusion of a spring-loaded drive pulley tensioning mechanism in the system of such above-mentioned patent in order to take up cable slack so as to maintain the required cable tension and compensate for differences in the travel or movement of the cables 41 and 42.

Thus, in order to avoid the above effects, the cable spool 238 includes the helical groove configuration discussed above and illustrated primarily in FIGS. 10 through 12. In addition, these effects are avoided in the illustrated exemplary embodiment by the provision of a varying radial groove depth (resulting in a varying groove radius) along at least a portion of the helical groove path. In this exemplary embodiment, the radial depth of the groove portion 312 increases from left to right, as viewed in FIGS. 10 through 12, in order to vary the take-up rate, or the pay-out rate, of at least a portion of at least one of the cables 41 and 42, with respect to the rotation of the cable spool 238, as the cable spool 238 is rotated in respective opposite directions. The groove portion 316, however, has a generally constant radial depth, with the pay-out rate, or the take-up rate of the cables 41 and 42 correspondingly remaining generally constant with respect to rotation of the cable spool 238.

Figure 13:
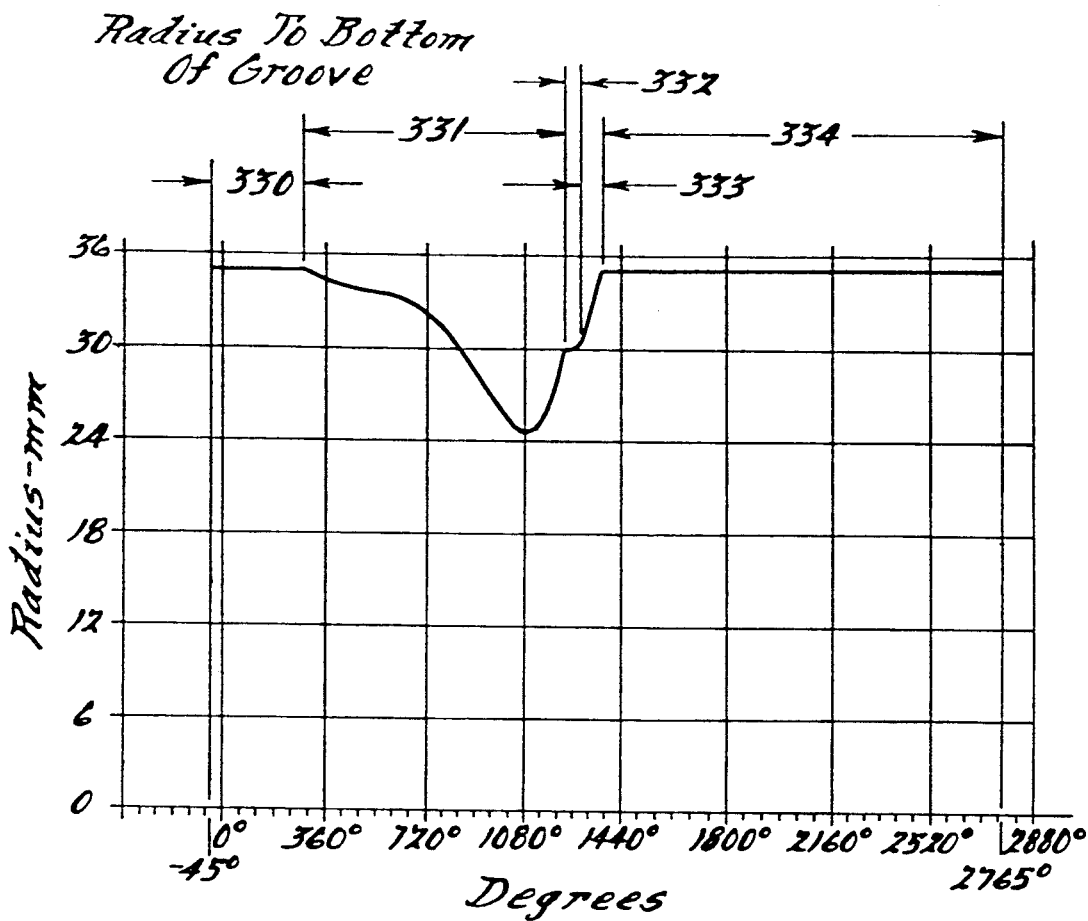
FIG. 13 is a plot of effective groove radius versus angular position of one preferred, exemplary cable spool of FIGS. 9 through 12.

Thus, in the exemplary embodiment illustrated in the drawings, the required compensation for differences in speed or travel rates between the cables 41 and 42 at various stages of powered door operation is accomplished by way of the varying radial depth of the groove portion 312 and the generally constant radial depth of the groove portion 316. The relationship caused by such a configuration is illustrated in FIG. 13, wherein the groove radius for the cable spool 238 is plotted against angular rotational position. The portion 330 of the plot in FIG. 13 represents a constant radius part of the groove portion 316 for the lower cable 41, and corresponds to the open position of the door 12. The portion 331 of the curve represents a variable radius part of the groove portion 312 for the upper cable 42, and corresponds to a portion of the closing movement of the door 12, with the portion 332 of the curve corresponding to a constant radius portion of the groove for the upper cable 42 at the fully closed position of the door 12. The portion 233 of the curve corresponds to a generally linear transition between the portion of the helical groove for the upper cable 42 and the portion for the lower cable 41, and the portion 334 represents a constant radius portion of the groove for the lower cable 41.

The relationship of FIG. 13, showing the cable travel in the exemplary embodiment depicted in the drawings was derived empirically by measuring the position of the door 12 and each of the drive cables 41 and 42 at various stages of the door operation, moving the door in very small increments for each measurement. The empirical data was then fitted to a sixth-order polynomial equation, and appropriate derivatives were taken to determine cable travel speed and acceleration equations in order to determine the proper parameters to be used in programming numerically-controlled machining equipment. As a result, the relationships depicted in FIG. 13 are only exemplary, and are shown for purposes of illustration only. One skilled in the art will now readily recognize that other similarly ascertainable relationships will be required for other powered door applications, or for other cable-actuated devices. It will be appreciated, though, that the principles of the present invention are also applicable to cable spools having one or more drive cables, to those having a variable radius (variable radial depth) helical groove along all, or a part of, the helical path, to those having variable-depth and constant-depth groove portions that are either continuous or discontinuous with one another, or to those that either extend in the same or opposite directions, and/or to those driven at either constant or variable speeds. One skilled in the art will also readily recognize that the cables 41 and 42 can be separate and distinct, each with its own cable retention arrangement on the cable spool 238, as described above, or that the cables 41 and 42 can optionally be continuous with one another, with a portion of the continuous cable being anchored to the cable spool in any of a number of ways known or readily ascertainable in the art.

Finally, the exemplary cable spool 238 in the drive arrangement or assembly 235 also includes a number of mounting holes 315, for securing the cable spool 238 to a drive hub or other such drive member (not shown) on the above-described motor-and-clutch mechanism, which is received within the drive member mounting opening 322 shown in FIG. 12. Also, the assembly 235 includes a power supply cable 236 and, preferably, a damage protection member or structure 237, as shown in FIG. 9, which tends to prevent damage that could render the door inoperable, even manually, in the event of an impact.

Figure 6:
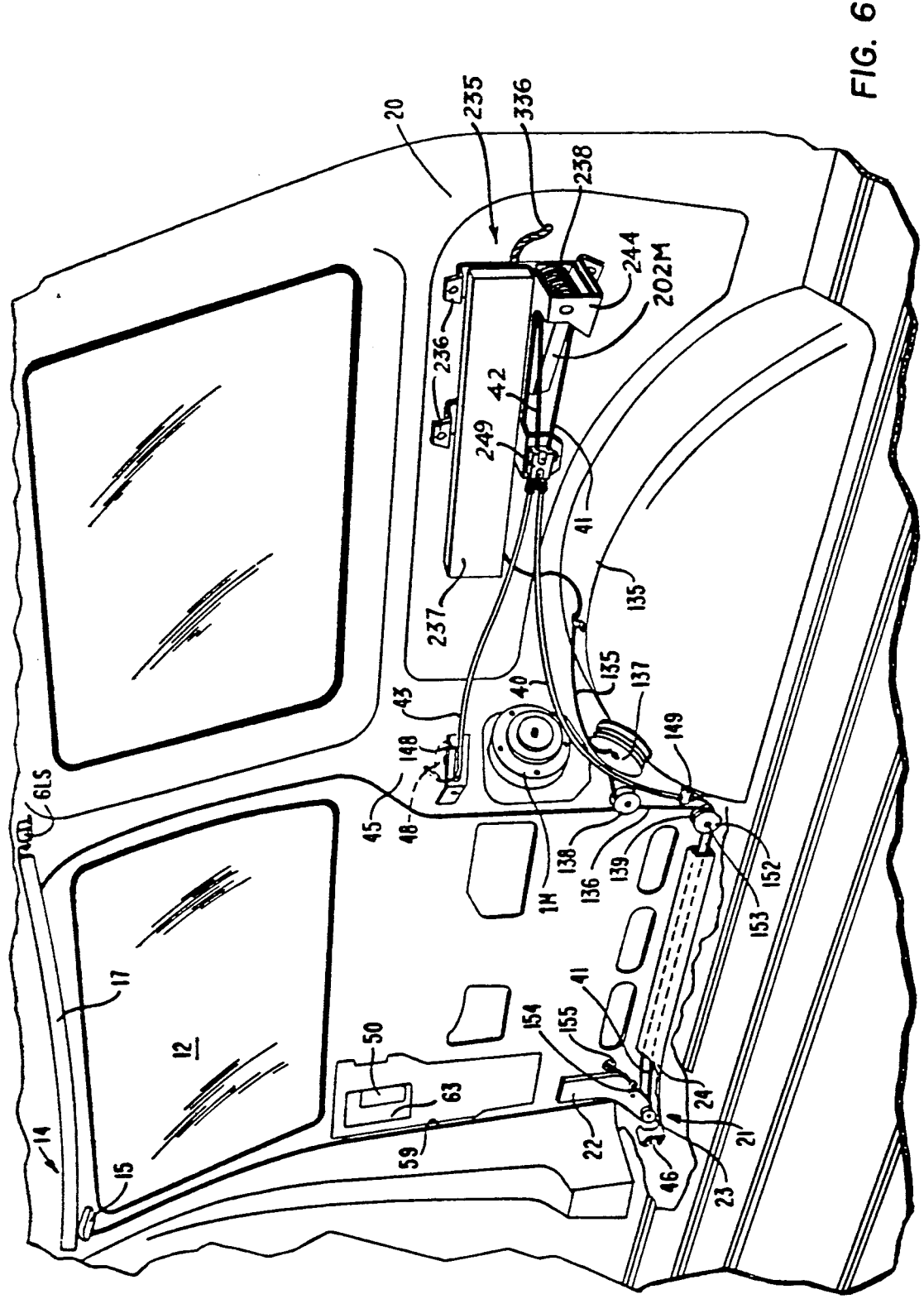
FIG. 6 is a perspective view of a portion of the interior of the van shown in FIGS. 1 and 2, with parts broken away for clarity, illustrating a cable or cables which are coupled to the forward end of the sliding door and to the rear end of the sliding door, and are actuated by an improved cable spool assembly according to one of the related inventions.
Figure 7:
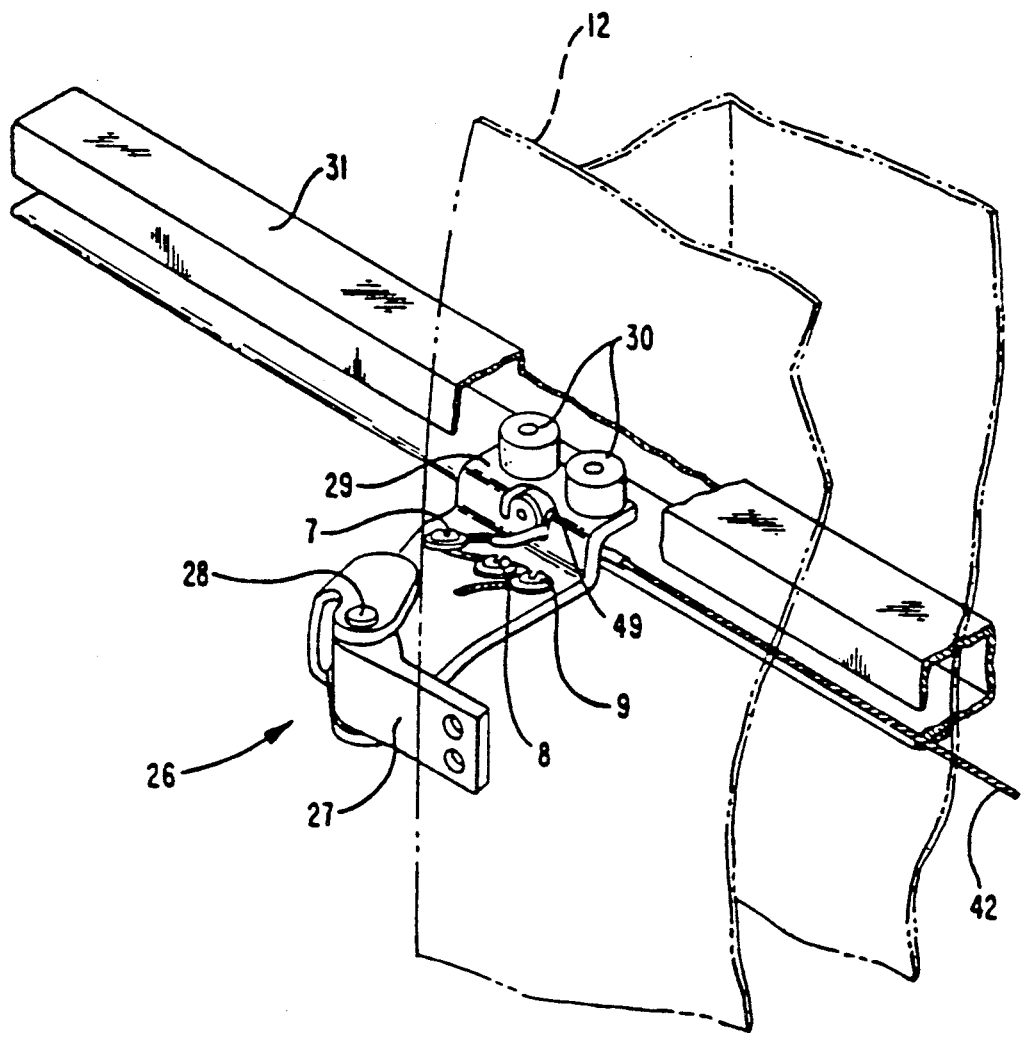
FIG. 7 is an enlarged detailed perspective view of a portion of the system illustrated in FIG. 6, showing the preferred manner in which a cable is fastened to a rear bracket and roller assembly carried at the rear end of the door.

As best seen in FIG. 6, the idler pulley 152 is fastened to the lower portion of the inside wall 45 of the van 10, generally adjacent the rear of lower guide member 24 (at the inner rocker panel) by a bolt 153. The bolt 153 also acts as the rotational axis and attachment point for an idler pulley 139, about which an electrical cord or cable 136 extends from a spring reel 137 and an idler roll 138 to the interior of the door 12. The electrical cable 136 passes through the lower guide member 24 to a clamp 154 on bracket 22 and then into the interior of the door 12 by way of an aperture 155. The electrical cable 136, whose function is described in more detail below, winds and unwinds from the reel 137 concurrently with the opening and closing movements of the door 12.

As the door 12 moves generally parallel to the vehicle body during closing, a guide pin 61 (FIG. 2) at the forward end of the door 12 moves into a conical recess (not shown) in a body member 59, which forms a forward end of the door opening 19. Referring to FIGS. 4 and 5, as the pin 61 engages the conical recess in the door frame 59, the rear of the door 12 begins a generally inward movement, and the motion of the door 12 becomes complex so that the lower cable member 41 does not pay out from the cable spool 238 at the same rate as does the upper cable member 42 being wound onto the cable spool 238 which accommodates or compensates for the different cable travels during final closing movement of the door, as is discussed above.

Referring to FIG. 6, with the door 12 in the closed position, the arm 22 of forward lower bracket and roller assembly 21 is positioned at its most forward and inward position on the lower guide member 24. The lower cable member 41 thus contacts the guide member 24 and, as the motor 202M and the cable spool 238 begin to open the door, the cable member 41 pulls the arm 22 rearwardly, and the lower cable member 41 rubs against the lower guide member 24. Accordingly, the outer face or contact area of the guide member 24 is covered with a friction-reducing wear strip 46 composed of a low-friction, highly wear-resistant material to prevent wear of both the cable member 41 and the guide member 24. Once the door is approximately one-quarter of the way open, however, the cable 41 moves freely within, but out of contact with, the lower guide member 24, from the arm 22 of the lower bracket and roller assembly 21 to the idler pulley 152. The cable is then smoothly guided by the flexible lower sheath or conduit 40 to the cable spool 238, where it is actively wound or unwound by the motor 202M. Friction wear of the lower cable member 41 is less during door closing than during door opening, because the cable member 41 is rather passively unwound from the drive pulley 38 as the door is moved forward (toward its closed position) by the upper cable member 42.

Figure 8:
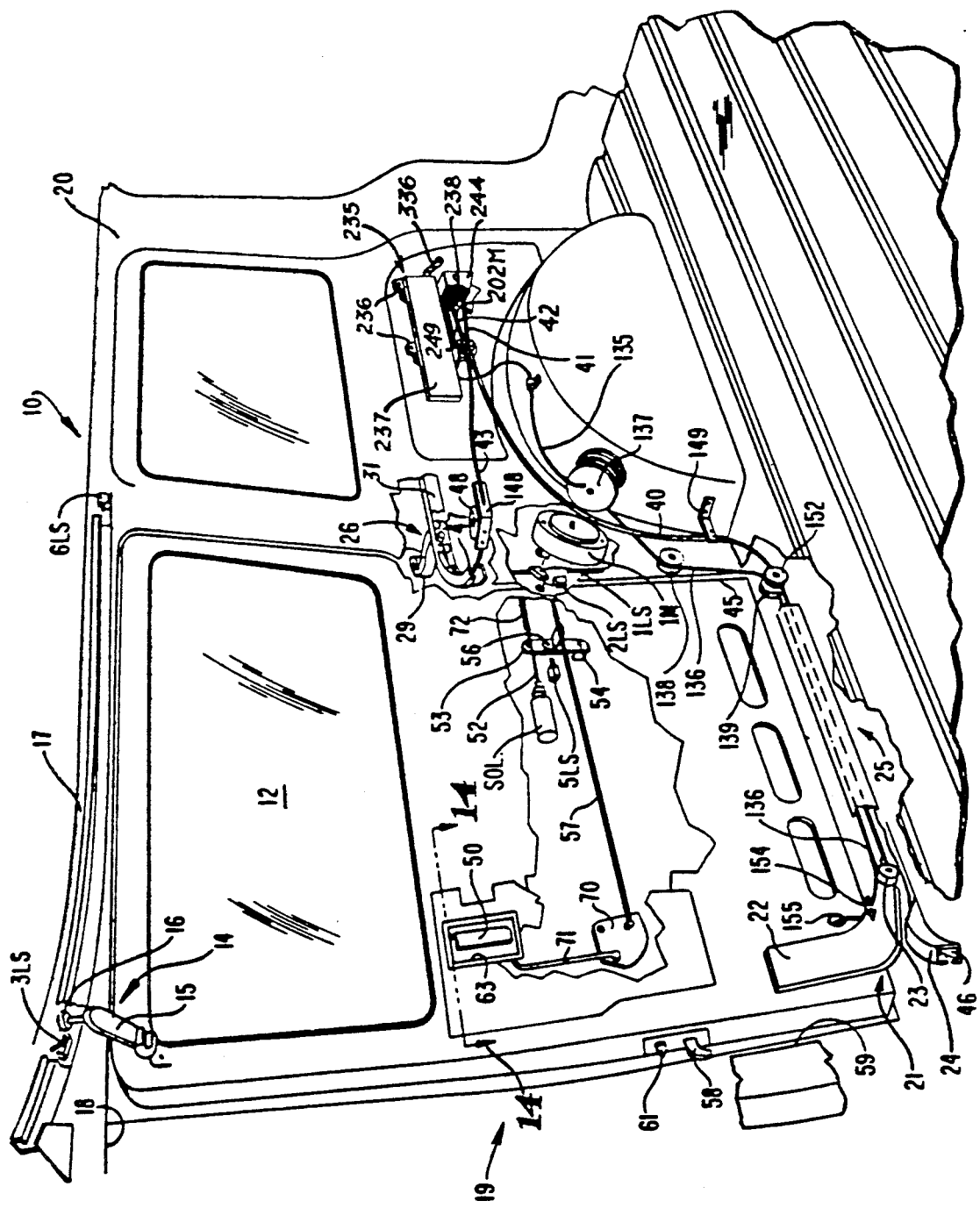
FIG. 8 is a perspective view of the interior of the van, similar to that of FIG. 6, but viewed from a different point inside the vehicle and showing the door in a partially open position.

As best seen in FIG. 8, and in contrast with the lower cable member 41, the upper cable member 42 contacts the forward portion of the guide member 31 during the full range of opening and closing movement of door 12. During door closing, the upper cable member 42 is actively wound onto the cable spool 238 by the motor 202M, and conversely, during door opening, the cable member 42 is rather passively unwound from the cable spool 238. However, because of the above-mentioned contact with the guide member 31 during both opening and closing, a friction-reducing wear strip 47, similar to the wear strip 46, is provided on the outer face of the rear guide member 31.

It should be noted the upper cable member 42 moves around the guide member 31, toward the pulley 48, located generally inward of the door opening 19, and carries the bracket and roller assembly 26 and the rear end of door 12 along with it. Consequently, during the final closing movement of door 12, the upper cable member 42 imparts a generally inwardly-directed, low momentum closing force to the door 12. The inward movement of the rear end of the door 12, in turn, is accompanied by an engagement and latching of the latch bolt member 60 on the door 12 (FIGS. 2 and 20), with the striker pin 105 on the vehicle body member 45. Such latching engagement occurs just prior to final closing or clamping of the door 12 against the weather strip on the door frame, and is further described below. It should also be noted that when motor 202M is de-energized, and when the latch bolt member 60 and the striker pin 105 are not in latched engagement, the door 12 may be freely moved manually between its nearly closed position and its fully open position. This is because the motor 202M and the cable members 41 and 42 add little frictional resistance opposing such manual movement, and because no provision is made to lock the cable spool 238 when the motor is de-energized.

Figure 2:
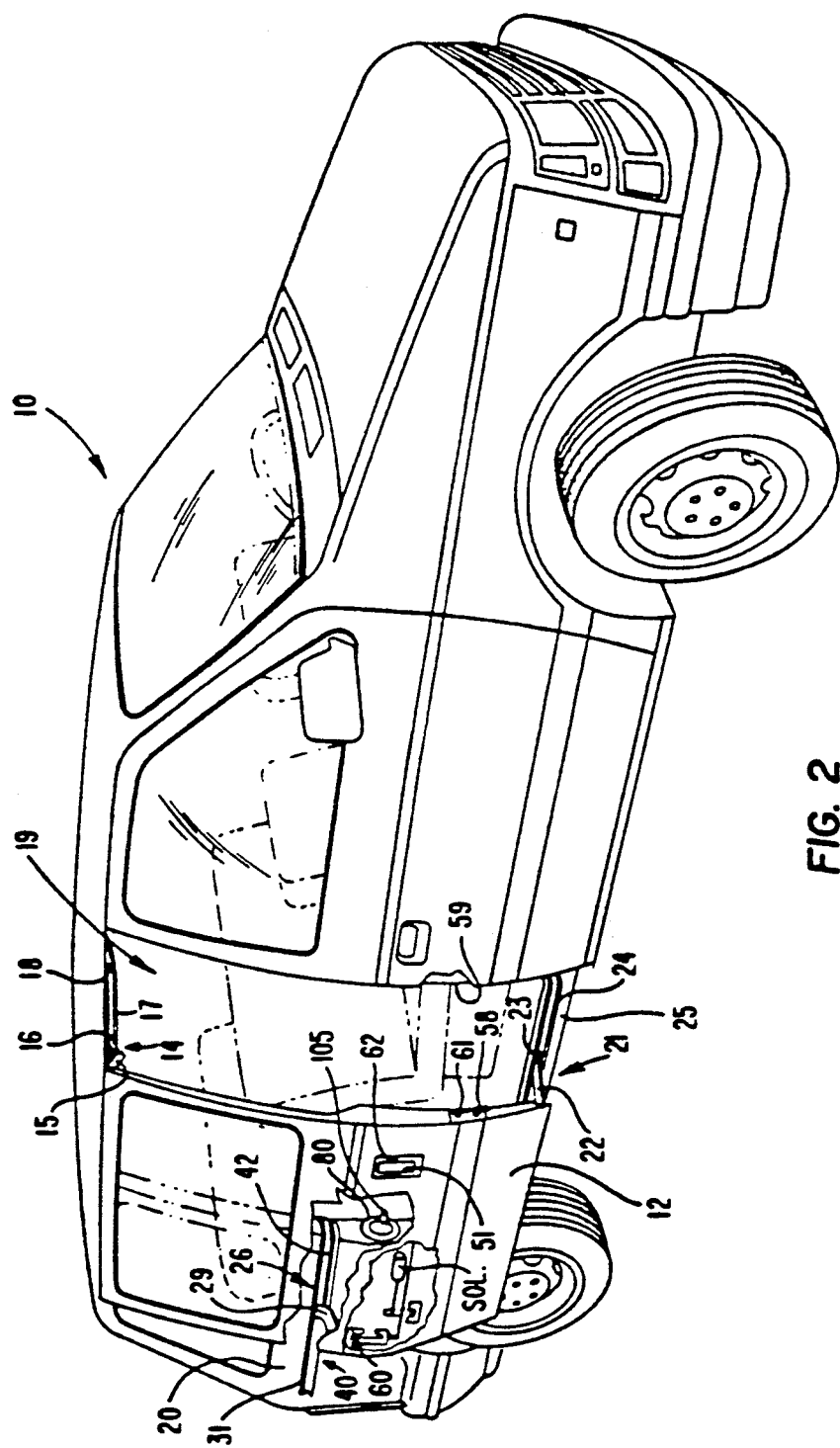
FIG. 2 is a view similar to FIG. 1, with parts broken away for clarity, showing the sliding door of the van in a partially open position.
Figure 14:
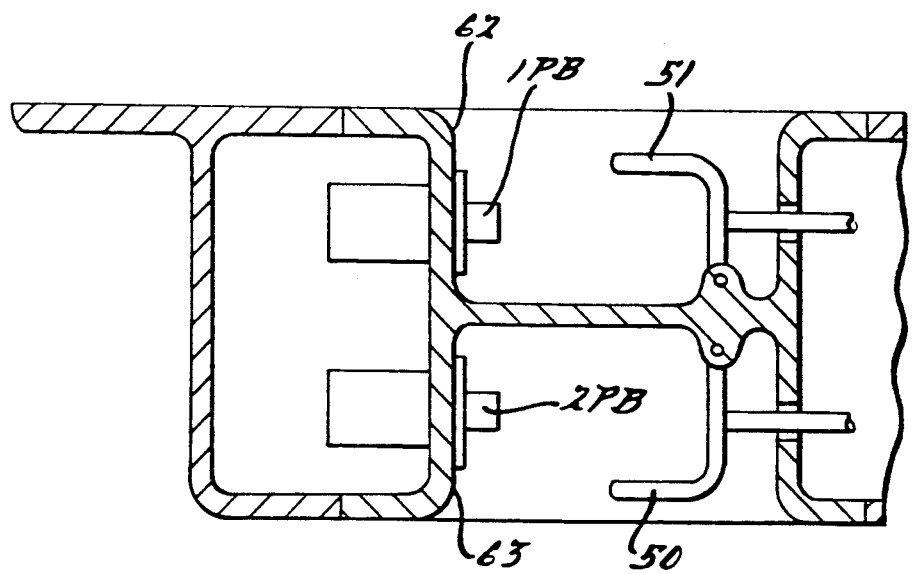
FIG. 14 is a sectional view, taken along the line 14—14 of FIG. 8, showing the locations of push button switches used in controlling the operation of the sliding door in one form of the powered door system.
Figure 16:
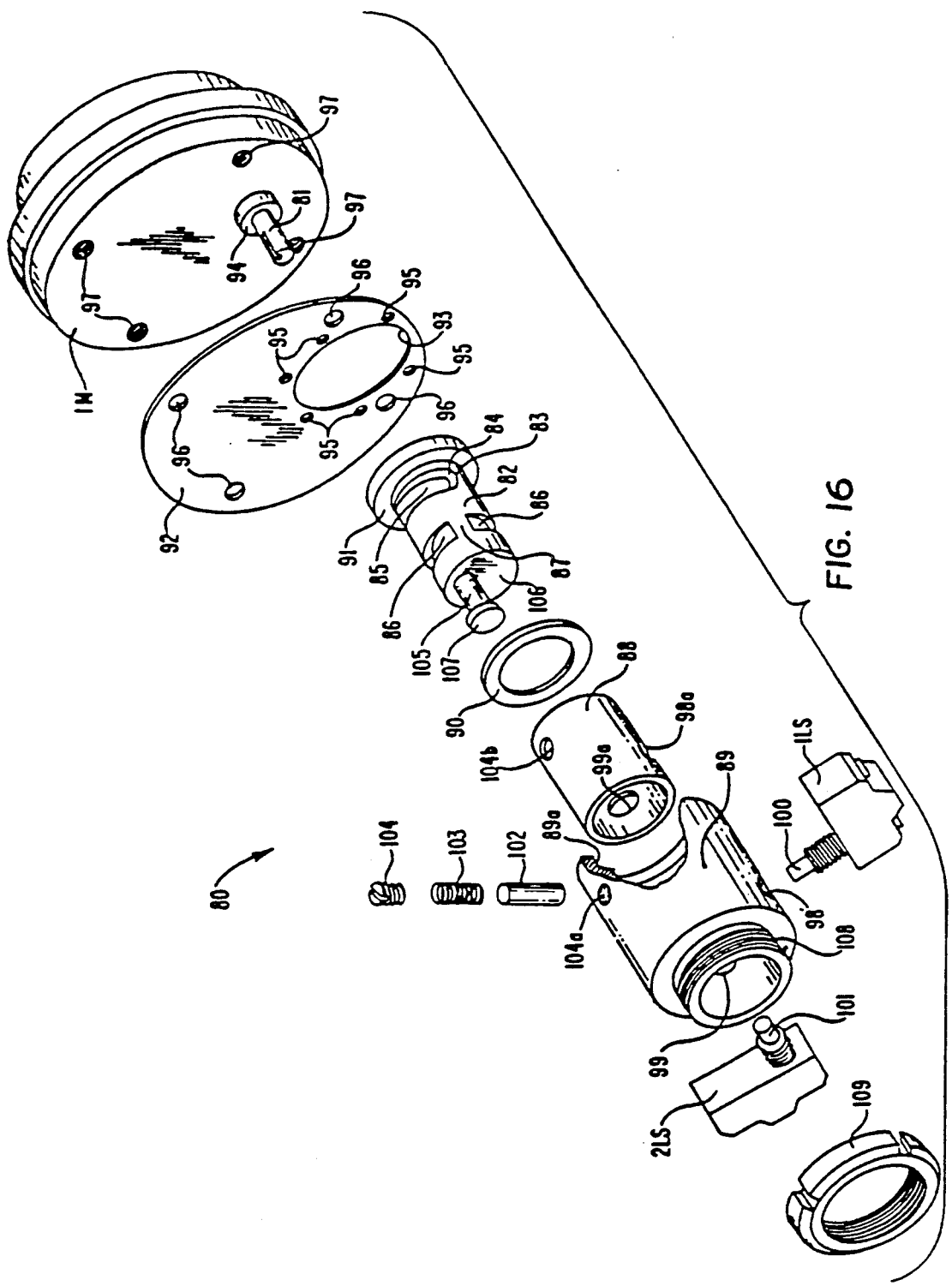
FIG. 16 is an exploded perspective view of one form of a final closure or clamping mechanism employed to move the nearly closed sliding door to its fully closed position.

As is perhaps most clearly shown in FIGS. 2, 8, and 14, the door 12 is provided with respective inner and outer handles 50 and 51, which are located in respective recesses 62 and 63 in the door 12. When the handles 50 and 51 are pulled to the rear (to the right as viewed in FIG. 8), they move a pull rod 71 upwardly, a pivot plate 70 in a clockwise direction, and a pull rod 57 forwardly. The forward movement of the pull rod 57 can also be initiated by an electrical solenoid SOL, the armature of which is connected to the forward end of a pull rod 52. A link 53, which is pivoted to the door 12 at 54, and to the rod 57 at pivot 56, is rotated about its pivot 54 when the pull rod 52 moves forward upon actuation of the solenoid SOL. The forward movement of the pull rod 52 causes the pull rod 57 to also move forwardly, due to the pivot connection 56 between the pull rod 57 and the link 53. The pull rod 57, in turn, is connected to the latch bolt mechanism of the door 12, as is shown generally at reference numeral 60 in FIG. 2. Accordingly, when either of the handles 50 and 51 is pulled to the rear, or when the solenoid SOL is energized, the pull rod 57 is moved to the left as viewed in FIG. 8, causing the latch bolt mechanism 60 to become unlatched, as is explained in greater detail below, and allowing the door to be either manually or automatically opened.

The movement of the pull rod 57 to its forward or unlatching position is sensed by a limit switch 5LS, which is actuated by contact with the link 53, and the limit switch 5LS in turn provides a signal to the electrical circuits indicating that the door handles 50 or 51 have been manually or electrically opened. The opening movement of the door handles 50 or 51 also opens a forward latch member 58, which engages a suitable latch receiving member (not shown) in the vehicle body member 59, generally at the forward end of the door opening 19.

As will be discussed in greater detail below, the push buttons 1PB, 2PB, 3PB, and 4PB (FIGS. 1 and 14) are employed in initiating movement of the door 12 from its various positions. The push buttons 1PB and 2PB (FIG. 14) are positioned in the door recesses 62 and 63, respectively, and are employed in signalling the electrical circuits, from the location of door 12, to move the door from its open position to its nearly closed position. The push buttons 3PB and 4PB (FIG. 1) are positioned adjacent to the vehicle driver's seat to open and close, respectively, the door 12. Alternatively, the push buttons 3PB and 4PB may be located on an overhead console within reach of the driver, or in any other desirable location on the van. The buttons 3PB and 4PB ma also be replaced by a three-position, spring-returned-to-center rocker switch if a combined device is desired.

Various positions of door 12 relative to the door opening 19 are sensed by limit switches that are mechanically carried on upper forward guide member 17 and are electrically connected into the electrical control circuits of the door operating system. Thus, referring to FIG. 8, a limit switch 6LS is carried at the rear end of guide member 17 and is actuated when the door is at its fully open position, and a limit switch 3LS is carried at an intermediate position, near the forward end of the guide member 17, and is actuated when the door 12 reaches an intermediate position, about two inches from its nearly closed position. The arrival of the door at its nearly closed position is sensed by a limit switch 4LS (FIGS. 20 and 21), which is actuated when the latch bolt member 60 latches onto the striker pin 105. Referring to FIGS. 15A and 15B, the limit switch 3LS is mounted outboard of the guide member 17 and is preferably provided with a curved, rockable or pivotable actuator arm 75 that extends through a slot 76 in an outer wall 77 to the interior of the guide member 17. The actuator arm 75 is contacted and actuated by the roller 16 of the upper forward bracket 15 of the door 12 when the roller 16 passes over the arm 75. Thus any outwardly-directed forces exerted by the roller 16 as it passes by limit switch 3LS are taken up by the portion of the outer wall 77 surrounding the slot 76 in the guide member, while actuator arm 75 moves within the slot 76 and actuates and deactuates the limit switch 3LS as the roller 16 passes by during the opening and closing movements of the door 12.

Referring now to FIGS. 2, 8, and 16 through 22, one version of a final closing device or clamping mechanism, shown generally at reference numeral 80, is provided for moving the door 12 from its nearly closed position, at which the latch bolt member 60 latches onto the striker pin 105, to a fully closed position, at which the weather strip of the door 12 is compressed, and the door is fully closed, flush with the side wall 20. The final closing device 80 includes a motor 1M having an output shaft 81, on which an enlarged shaft extension or striker shaft 82 is mounted and keyed for rotation therewith. The striker shaft 82 is machined adjacent one end of its outer surface to provide a ratchet tooth 83 having a radially extending face 84. The radially inner and outer ends of the face 84 are connected by a smooth spiral cam surface 85.

The forward end of the outer surface of the striker shaft 82 also has a groove 86 machined therein so that a protruding cam surface 87 is provided relative to groove 86 at the outer surface of the striker shaft 82. The striker shaft 82 rotates within a bushing 88 that is press fit into an outer housing 89, and a thrust washer 90 seats against the rear end (right-hand end as viewed in FIG. 16) of the bushing 88 in a stepped recess 89a of the housing 89. The washer 90 separates the end of the bushing from a collar or shoulder 91 formed at the rear end (right-hand end as viewed in FIG. 13) of the striker shaft 82.

A bracket plate 92 joins the motor 1M to the housing 89 and includes an opening 93, through which the collar 91 freely passes so that the striker shaft 82 abuts against a shoulder 94 on the motor shaft 81. The bracket 92 includes a plurality of small bolt holes 95, which align with corresponding threaded holes (not shown) on the back surface of the housing 89 to allow the bracket 92 to be rigidly fastened to the rear end of the housing 89 by bolts (not shown). Similarly, the bracket 92 is provided with a plurality of large bolt holes 96, which are in alignment with corresponding threaded bolt holes 97 at the forward end of the motor 1M. Bolts or other suitable fasteners (not shown) are employed to fasten the motor 1M to the opposite side of the bracket 92 from the housing 89 so that the various parts of the final closing device 80 are firmly interconnected.

A pair of limit switches 1LS and 2LS threadedly engage corresponding threaded openings 98 and 99 in the housing 89. The openings 98 and 99 are aligned with corresponding openings 98a and 99a in the bushing 88 so that the actuators 100 and 101 of the respective limit switches 1LS and 2LS ride in the groove 86 of the striker shaft 82 and are actuated by the protruding cam surface 87 during rotation of the striker shaft 82, as will be explained in greater detail below.

A pawl 102, a spring 103 and a lockbolt 104 are carried in an aperture 104a in the housing 89. The aperture 104a is aligned with an aperture 104b in the bushing 88 so that the pawl 102 is spring loaded downwardly into engagement with the spiral cam surface 85 on the outer surface of the striker shaft 82. During clockwise rotation of striker shaft 82 (as viewed in FIG. 16), the pawl 102 rides up the spiral cam surface 85 until it reaches the top of the tooth 83 and then drops down into engagement with the radial face 84 of the tooth 83. This engagement represents the fully closed or clamping position of the final closing device 80, which is shown in FIG. 18, and coincides with the actuation of the limit switch 2LS by cam 87. The unclamped or open position of the final closing device 80 is illustrated in FIG. 17 and coincides with the actuation of the limit switch 1LS by the cam 87.

The final closing device 80 is provided with a striker pin 105, which projects axially outwardly from an end surface 106 of the striker shaft 82. The end surface 106 constitutes a striker plate on which the striker pin 105 is eccentrically supported relative to the rotary axis of the shaft extension 82. The end of the striker pin 105 remote from the surface 106 is provided with a flange or enlarged head portion 107 for crashworthiness purposes. Preferably, the flange 107 is capable of preventing the latch bolt mechanism 60 on the door 12 from axially pulling free of the striker pin 105 during high impact axial loads.

The end of the housing 89 remote from the motor 1M is provided with a reduced diameter threaded end portion 108, which is threadedly engaged by mounting nut 109. The end portion 108 is passed through one side of a corresponding opening in the rear body member 45 of the door opening and is bolted thereto by tightly threading the mounting nut 109 onto the end portion 108 from the other side of the body member. A key and slot arrangement (not shown) may optionally be provided to insure that the clamping mechanism housing 89 does not rotate relative to the frame member 45.

Figure 17:
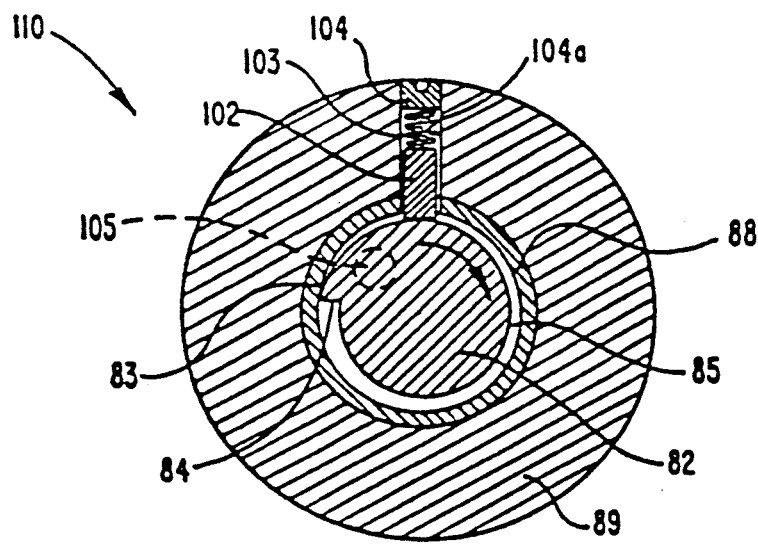
FIGS. 17, 18, and 19 are enlarged sectional views, taken through a mechanism in FIG. 16 for precluding reverse rotation of the striker plate, and showing the relationship of a pawl to a single tooth ratchet wheel thereof when the striker pin is in its extended position, in its retracted position, and between its retracted and extended positions, respectively.
Figure 18:
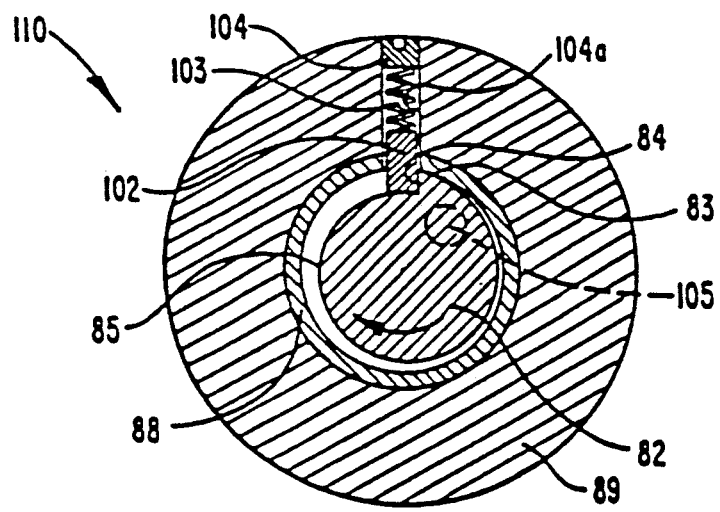
Figure 19:
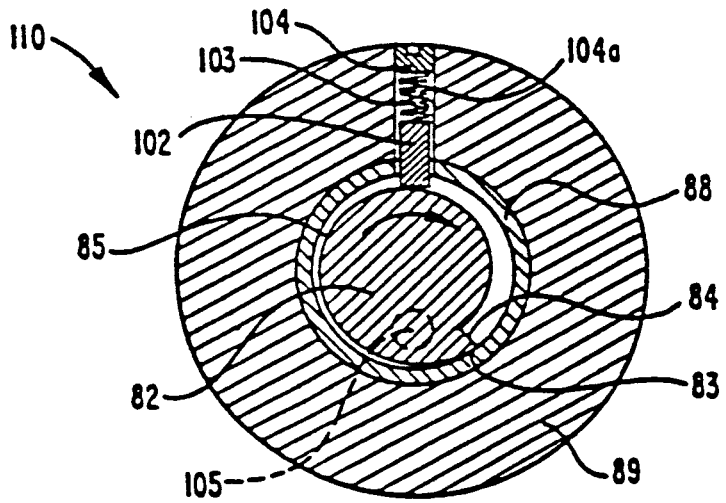
Figure 20:
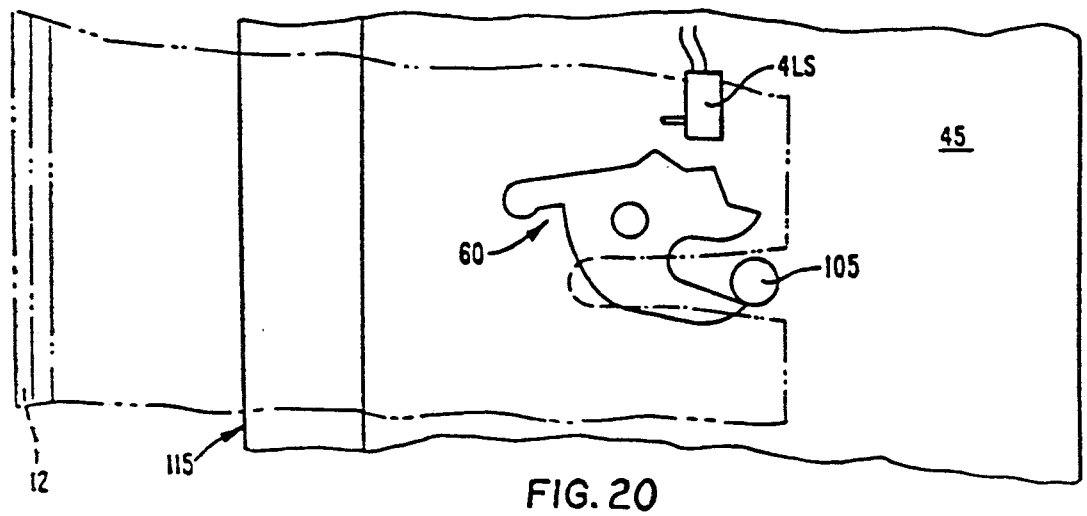
FIGS. 20, 21, and 22 are diagrammatic elevation views, taken through a latch bolt mechanism of the door and the final closing mechanism on the door frame, showing the relationship of the latch bolt member and striker pin to the weather strip on the vehicle body during various respective stages of door closing.
Figure 21:
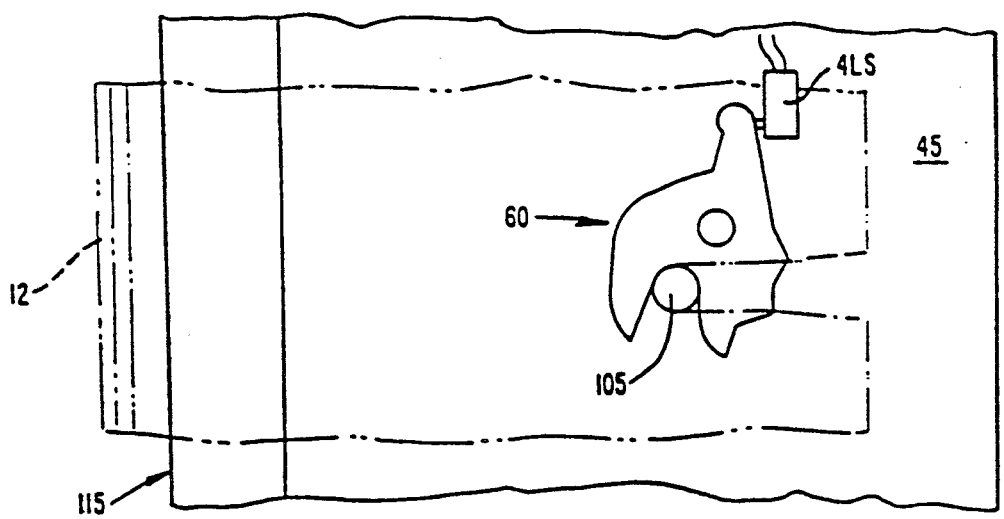
Figure 22:
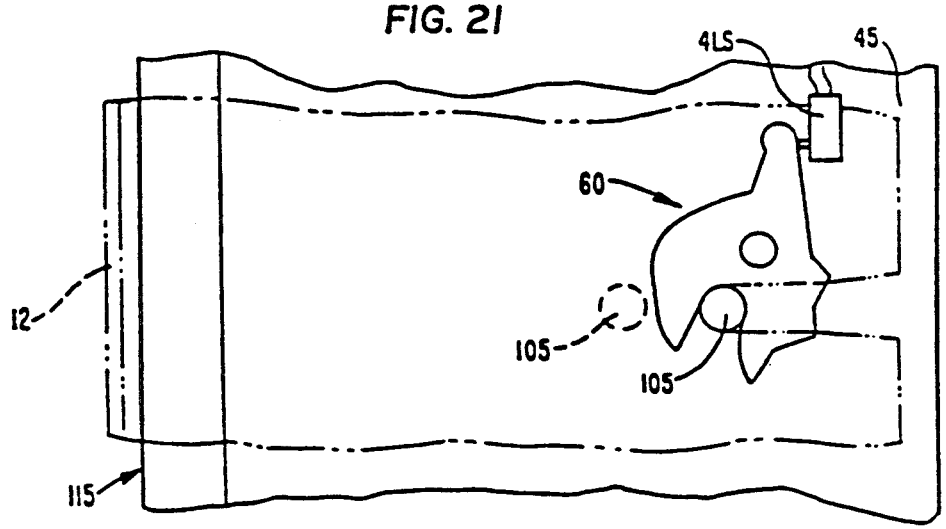

Referring to FIGS. 17 through 19, the various components 82 through 85, and 102 through 104, cooperate to form a unidirectional lock, shown generally at reference numeral 110. The unidirectional lock 110 serves to prevent reverse rotation or back-driving of the striker pin 105 in the event that the fully closed door is impacted from the inside under high loads. As shown in FIG. 17, the striker pin 105 is extended to its fully open or unclamped position, awaiting both the arrival of the latch bolt mechanism 60 (FIG. 8) and the movement of the latch bolt mechanism 60 to its latched condition, prior to undergoing rotary motion, which retracts the striker pin 105 and moves the door to its fully closed, clamped position. This extended condition of striker pin 105 is also represented in FIGS. 20 and 21, with the latch bolt mechanism 60 shown in its unlatched condition prior to engagement with the striker pin 105 in FIG. 20, and with the latch bolt mechanism 60 shown in its latched condition in full engagement with the striker pin 105 in FIG. 21. When the latch bolt mechanism 60 fully engages and latches onto the striker pin 105, it actuates a limit switch 4LS, which signals the electrical control system that the latch bolt mechanism 60 is fully latched. In turn, the electrical circuits then cause the motor 1M to drive the striker pin 105 from its extended position (shown in dashed lines in FIG. 22), to its retracted position (shown in solid lines in FIG. 22). This movement is occasioned by movement of the door 12 to its fully closed position, in which the door compresses the weather strip 115 against the vehicle body members constituting the frame of the door opening 19. Such movement is also occasioned by clockwise rotation of the striker shaft 82 from the position shown in FIG. 17 to the position shown in FIG. 18, at which the pawl 102 has dropped into place behind the ratchet tooth 83 and is abutted by the face 84 of the ratchet tooth 83.

If the fully closed door 12 is impacted from the inside under a high load, such as during a vehicle crash, the unidirectional lock 110 will resist reverse rotation or back driving of the striker pin 105 to prevent accidental, unintended opening of the door. This occurs as a result of the pawl 102 being in a face-to-face confronting engagement with the face 84 of ratchet wheel tooth 83.

As shown in FIG. 19, the striker pin 105 is moved from its retracted position to its extended position by clockwise rotation of the shaft 82. This rotation is initiated by the electrical circuits of the powered door operating system after a door opening cycle has been initiated by the operator and the latch bolt mechanism 60 has cleared the striker pin 105, as will be discussed in greater detail below.

Referring to FIGS. 6 and 8, and as indicated earlier herein, a multi-wire cable 136 may be employed if desired to interconnect the electrical components inside the door 12 (e.g., the limit switches 4LS and 5LS, the push buttons 1PB and 2PB, and the solenoid SOL) with the remaining electrical components of the control system described hereinafter. The cable 136 exits from the forward lower portion of the door 12, by way of an aperture 155, and is supported on the underside of the arm 22, adjacent to the roller 23 by a clamp 154. From the end of the arm 22, the cable 136 proceeds rearwardly along the lower forward guide member 24, parallel to the lower cable member 40, and around the idlers 139 and 138, to a spring driven take-up reel 137, on which it winds during opening movement of the door and from which it unwinds during closing movement of the door 12. An end portion 135 of the cable 136 exits from the upper surface of the take-up reel 137 in order to connect the various wires of the cable 136 to their corresponding lines of the electrical control system of FIG. 23. The various control relays of the electrical control system, located on the body side of the vehicle, are preferably housed in an electrical cabinet 237 suspended from mounting tabs 236. The reel 137 is so dimensioned that approximately 3 turns of the reel 137 is sufficient to completely wind and unwind the cable 136 during full opening and closing movements of the door 12. Thus the end portion 135 of the cable 136 is initially installed in an untwisted condition with the door 12 midway between its fully open and fully closed positions so that it only twists approximately 1½ turns in each direction during opening and closing of the door 12.

Figure 26:
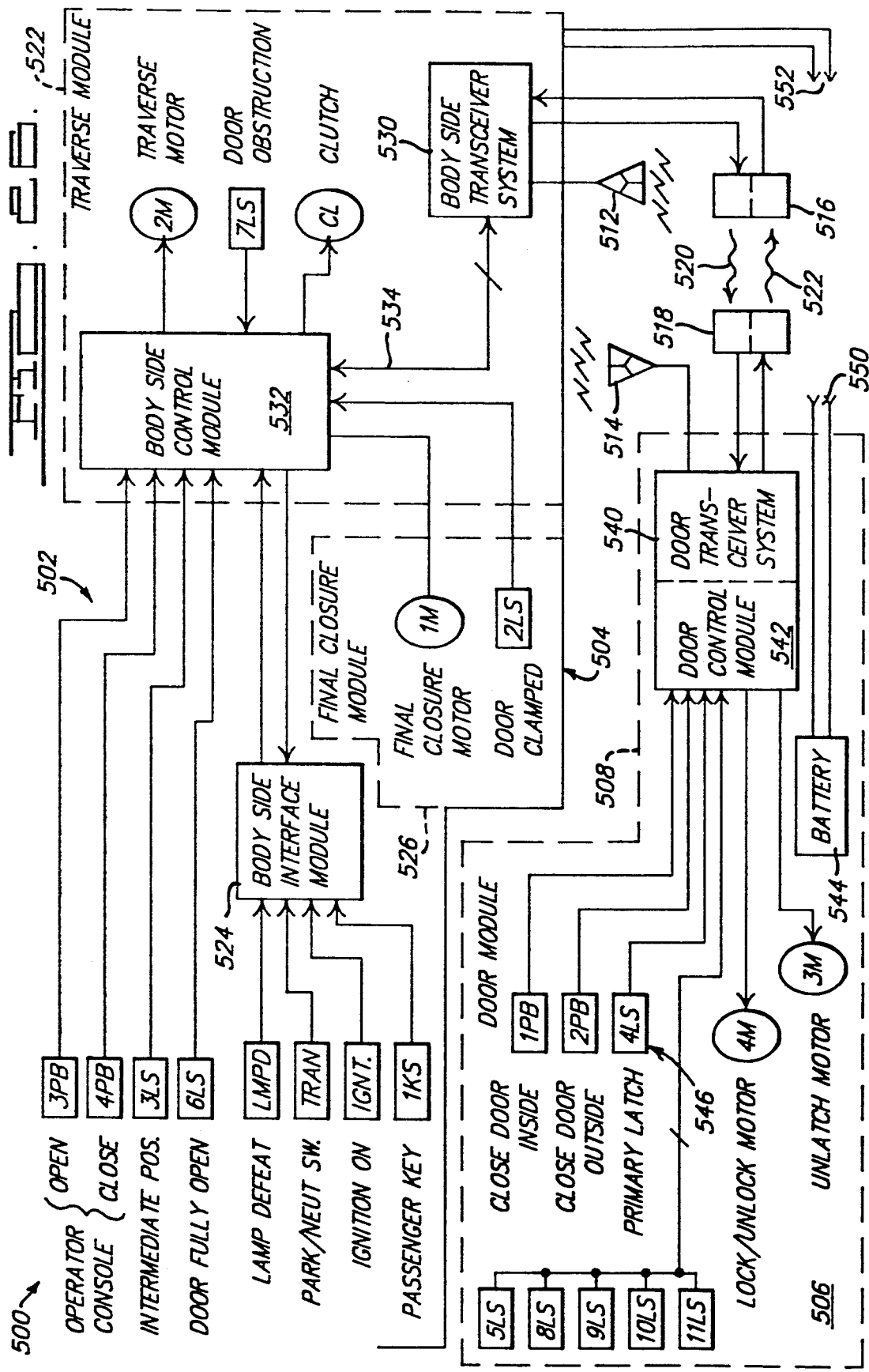
FIG. 26 is a simplified block diagram of the overall electrical control system of the present invention which employs a wireless communications link between the sliding door and the body of an automotive vehicle.

FIG. 26 shows a general block diagram of a preferred control system 500 of the present invention which employs wireless communications between the body portion of the vehicle and the door 12. The system 500 includes a control system 502 associated with the body portion of the vehicle, which includes all components located above solid line 504 in FIG. 26, and a control system 506 associated with the door 12 of the vehicle, which includes all components shown within dotted line 508. The wireless communications between the body side control system 502 and the door side control system 506 may be carried out using either radio frequency signals transmitted over suitable body side and door side antennas 512 and 514, or other non-contact transceiver mechanisms, represented by body side block 516 and door side block 518. The blocks 516 and 518 are each shown connected by suitable communication paths to the remainder of the respective control systems, and such paths may be of any appropriate length. The non-contact transceivers 516 and 518 may, for example, include optical signalling and detection devices, such as infrared transmitters and receivers, or may include ultrasonic transmitters and receivers. In either case, the wavy lines 520 and 522 respectively represent the wireless communication signals passing in both directions between the transceiver blocks 516 and 518. Optical communication systems and ultrasonic communication systems typically require direct line-of-sight paths for communication signals 520 and 522 for reliable communications. Such paths may be provided in locations suitably protected from interference by persons or objects passing into and out of the van. For example, a line-of-sight path may be provided near the very top or the very bottom of the door and door opening, with transceiver components 516 and 518 in either case being suitably mounted on or near the pillar of the door opening and on or near the leading side surface of the door 12, respectively.

In the preferred embodiments of the control system 500, a radio frequency ("RF") communications system including the antennas 512 and 514 is employed. Signals broadcast using the RF communications technique described herein have the advantage of generally not being obstructed by persons or objects entering or exiting the van through any of the doors provided in a van.

FIG. 26 shows that the body side control system 502 includes a traverse module 522, a body side interface module 524 and a final closure module 526. Each of these modules 522-526 is preferably comprised of those pieces of electrical equipment and/or control components that are located in relatively close proximity to one another, and which can be gathered together in or near a common enclosure to help reduce construction, assembly and/or wiring costs. For example, the body side interface module 524 is used to gather together a number of electrical signals obtained from electrical switches located on or near the operator's console of the motor vehicle. This results in a reduced number of connectors which need to be run to the rearward side wall of the vehicle where the traverse module is located.

The traverse module 522 includes the body side transceiver system 530 and body side control module or circuit 532. The transceiver 530 and circuit 532 communicate with each other along multiple conductor communications path 534. The body side control module operates the traverse motor 2M (which has also been referred to earlier as the motor 202M), a door obstruction limit switch 7LS and the clutch CL, which may be a conventional bidirectional spring-wrapped clutch.

The door side control system 506 includes a transceiver system 540, a door control module or circuit 542, a rechargeable battery 544, and a group 546 of buttons and switches that provide input signals used by the control module 542. The battery 548 is preferably a conventional, suitably sized, sealed lead-acid battery of the type which can be connected directly to a 12 volt D.C. automobile electrical system. The battery 548 is recharged through a set 550 of electrical contacts which are in direct physical and electrical contact with a set 552 of complementary electrical contacts from the body side control system 502 when the door 12 is in its fully closed position. These electrical contacts 550 and 552 may take the form of conventional contacts routinely used by the van manufacturers to provide electrical connections to a conventional power-lock/unlock motor used in sliding van doors. The door side control system 506 operates the unlatch motor 3M and lock/unlock motor 4M which are located within the door 12.

Figure 23:
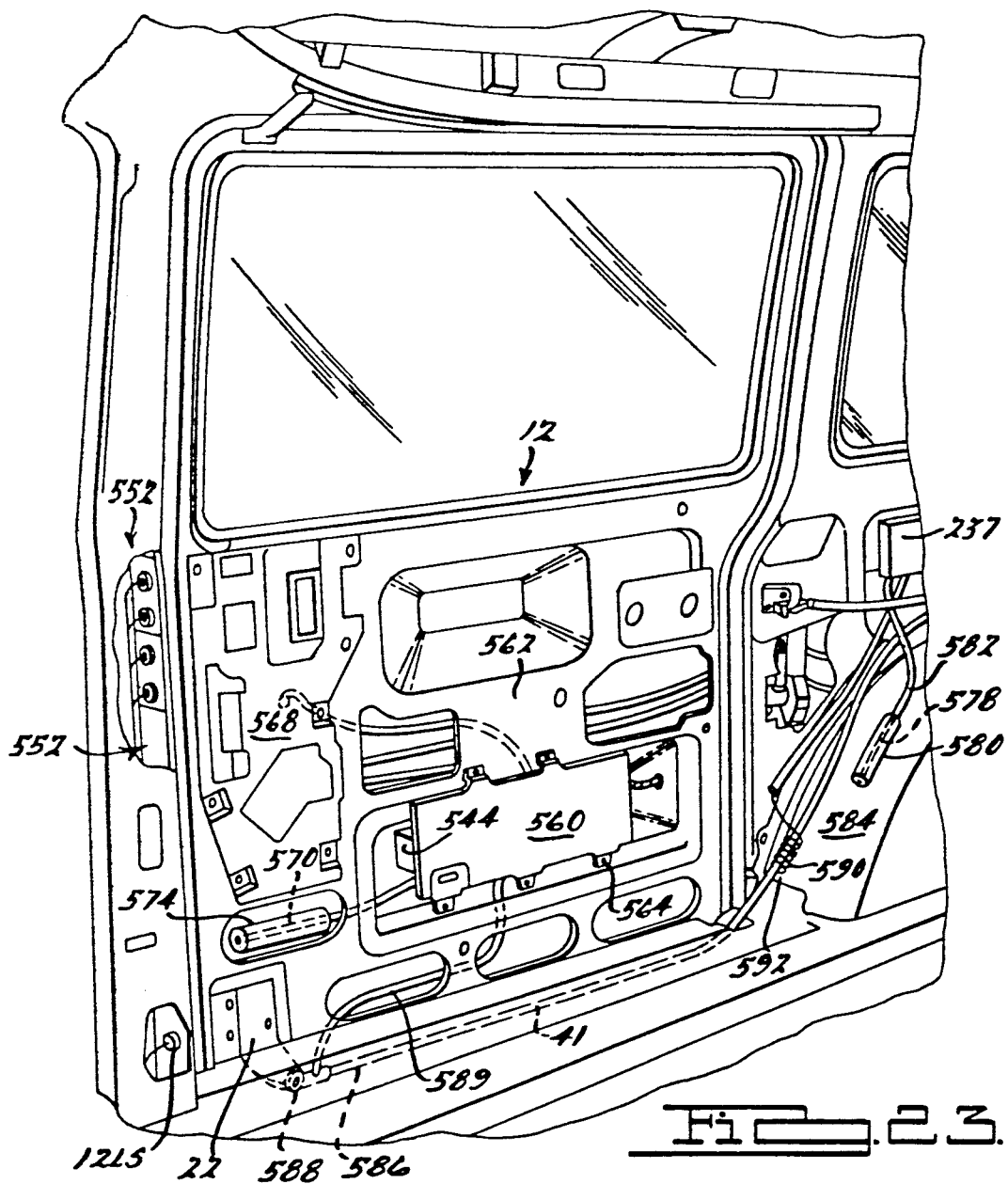
FIG. 23 is a fragmentary perspective view of the power sliding door of the present invention showing the location of electrical control housings, antenna cables and door/body electrical connectors.
Figure 24:
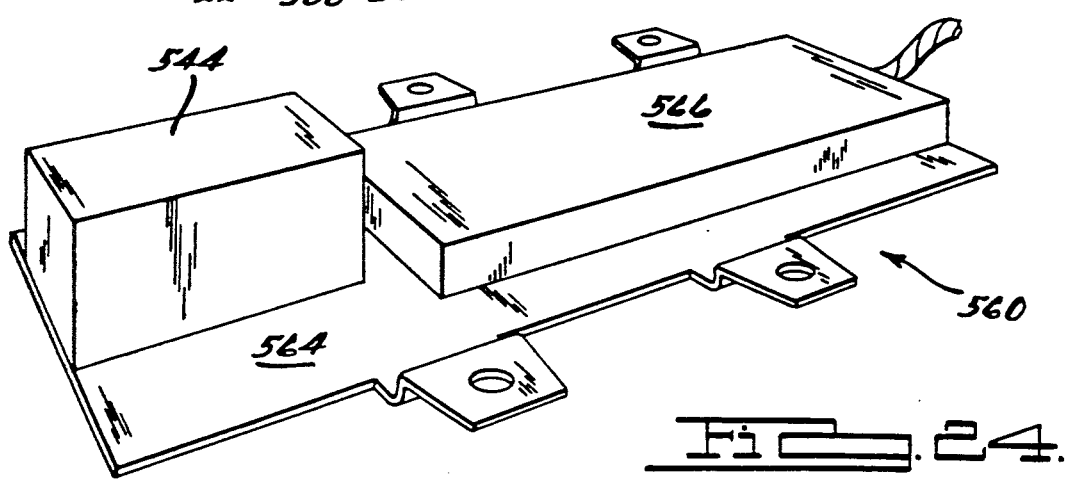
FIG. 24 is a perspective view of the housing for the door control system and rechargeable battery shown in FIG. 23.

FIG. 23 is a fragmentary perspective view of the door 12 with its conventional inner decorative surface treatment removed to reveal components of the present invention located therein. The body side transceiver system 530 and control circuitry 532 are preferably located within electrical cabinet 237 previously discussed with respect to FIGS. 6 and 8. The door side transceiver system 540 and control circuitry 532 are preferably located in cabinet assembly 560 mounted to the sheet metal frame 562 of the door 12 by suitable fasteners 564 at several locations as shown. The battery 544 can be seen attached to the side of the cabinet assembly 560. The outer side of cabinet assembly 560 is shown in FIG. 24, which also shows an electrical enclosure 566 located on the same surface 564 and alongside of the battery 544. Within the enclosure 566 are mounted the electrical control devices, such as relays (or solid-state control devices) which make up the logic elements of door control circuitry 542. Any suitable type of conventional, vibration-resistant control components, such as miniaturized 12 volt D.C. electromechanical or solid-state relays, transistors, integrated circuit chips, solid-state amplifiers and the like may be mounted as required on printed circuit boards within the enclosure 562.

FIG. 23 also shows a number of possible choices and locations for the antennas 514 and 516, as shown in FIG. 26. Any suitable antenna design may be employed for transceiver systems 530 and 540. In the body and door side transceiver systems 530 and 540 of the present invention, a very low power amplitude modulated ("AM") signal in the range of 100 to 500 Megahertz ("MH$_z$"), or more preferably 250 MH, to 400 MH$_z$, may be utilized for the communication signals broadcast by antennas 512 and 514. Work with prototypes of the present invention have shown that at least the following items may be used as antennas: (1) insulated sheet-metal stampings, such as electrically-insulating stamping 568; (2) an electrically-insulated single conductor wire approximately a few inches to about a foot in length, such as wire 570; and (3) the metal cable 41 used to open and close the door 12.

Relative to the first antenna option, we have found that sheet metal parts generally having a dimension of about one foot by two feet in size form an effective radiating antenna surface at least for signals in the microwatt power levels and frequency range around 300 Megahertz. Relative to the second option, a single-wire antenna 570 may be placed directly behind oblong opening 572 in the sheet metal frame 562 so that the electromagnetic signals propagating along antenna wire 568 are not blocked prior to entering the main compartment of the vehicle. An insulated tube, preferably approximately two inches in diameter made of electrically nonconductive lightweight material such as plastic, or foam rubber, is provided around the wire conductor 568 to prevent the conductor from accidentally being placed too closely to a grounded metal surface, such as the substantially continuous exterior sheet metal of door 12, which will act as a ground plane. As the conductor 568 moves closer than about one inch to this or any other ground plane, the transmitted signal strength is attenuated. Use of a suitably sized insulating structure or sheath, such as foam tubing 574, avoids this problem. A similar wire 578 and insulated tube structure 580 is shown connected by conductor 582 to the electrical cabinet 237 for the body side transceiver system 530. The insulating tube 580 keeps the antenna wire 578, which may be used as antenna 512, away from the grounded sheet metal wheel well 584. In both the first and second antenna options, it is desirable to keep the antenna used for the door transceiver near the front edge 590 of the door 12. This helps prevent attenuation problems that could otherwise occur if the antenna were located near the rear of the door, at such times when the door is mostly or fully open.

The third antenna option, like the first two options, may be employed for improving the signal-to-noise ratio of the transmitted communication signals received by the listening antenna. The third option employs the metal cable 41 as a guide for the transmitted signals. This is accomplished by ohmically connecting the output intended for antenna 514 directly to the end portion 586 of metal cable 41. The metal cable 41 itself may be provided with an electrically insulated coating such as flexible tough plastic to keep it from being grounded. Similarly, the end 586 of metal cable 41 may be electrically insulated from grounded metal parts by an appropriate insulating layer on the fastener 588 used to connect the cable 41 to the metal support member 22. Thus, the metal cable 41 is able to act as the antenna 514 for the door communications signals that are applied to it via coaxial cable 589. In order to receive efficiently this transmitted signal, a length of wire 590 that is placed adjacent to and insulated from the metal cable 41 and from nearby grounded parts is used for antenna 512. A helix 592 of wire near the door opening may be employed for antenna 512. Since the wire 592 and the cable 41 are in such close proximity, there is good electromagnetic coupling at the frequency range of interest in both directions between antennas 512 and 514.

Figure 25:
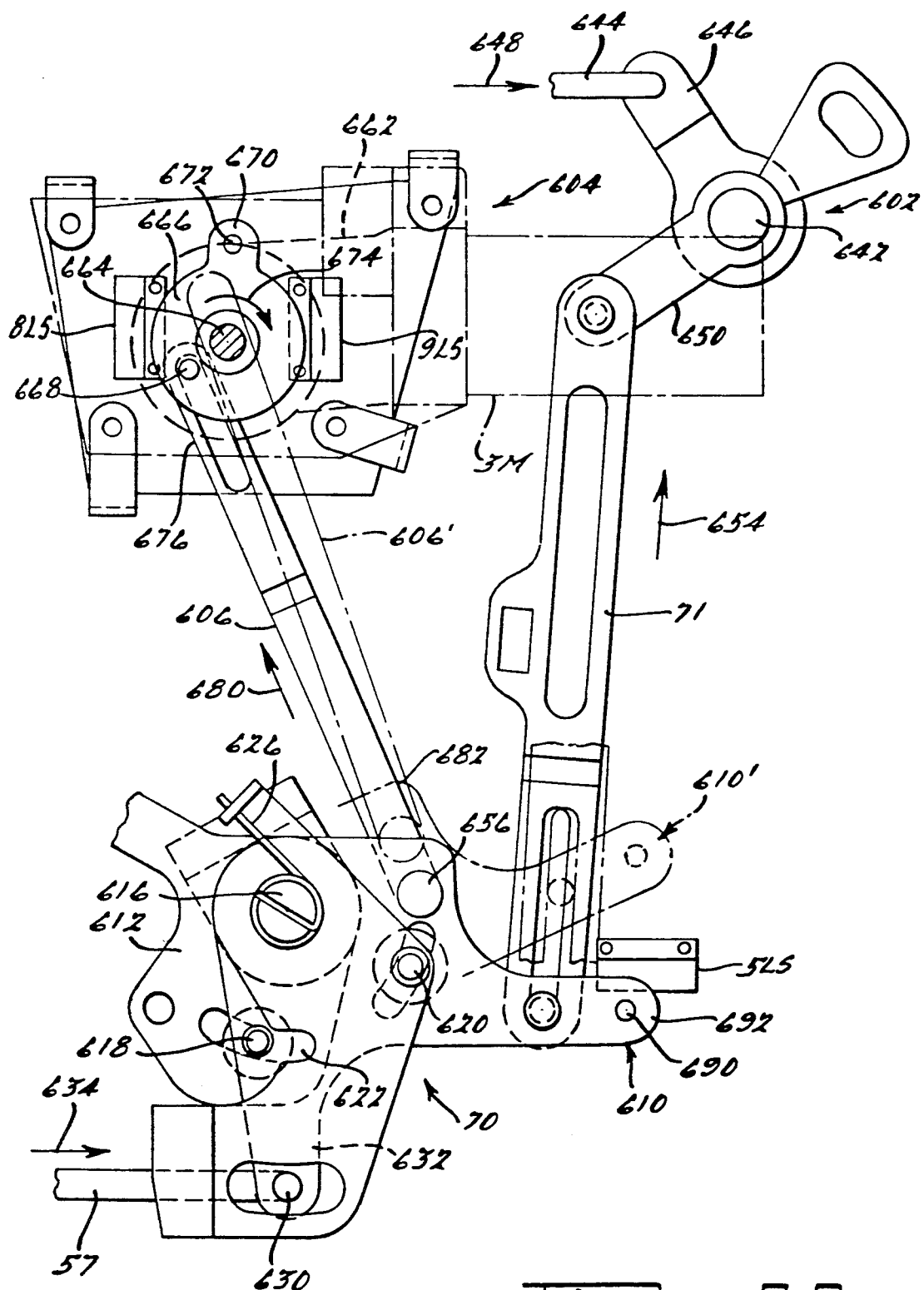
FIG. 25 is a simplified fragmentary view of a sliding door linkage mechanism for releasing the door latch, which shows the placement of electrical switches and the unlatch motor assembly.

FIG. 25 shows a simplified side fragmentary view of the door latch linkage mechanism 600 used in the power sliding door system of the present invention. This linkage assembly 600 includes a pivot plate assembly 70, a first pull rod 71, a second pivot plate assembly 602, an unlatch motor assembly 604, and second pull rod 606 extending between the assembly 604 and the pivot plate assembly 70. The pivot plate assembly 70 includes plates 610 and 612 mounted for pivotal movement about shaft 616. Plates 610 and 612 are coupled to one another via another bolt and nut assemblies 618 and 620, and can move slightly relative to one another on account of slots 622 and 624 as the plates pivot about shaft 616. The normal position of a plate 610 is shown in a solid line, while the unlatched position of plate 610 is shown in phantom lines indicated by 610' in FIG. 25. The coil spring wrapped around shaft 616 is used to return plate 610 to its normal position after it has been placed in its extended position by either pull rod 71 or pull rod 606. The rod 57 is connected at hole 630 to the lower arm 632 of plate 610, and moves in the direction indicated by arrow 634 in order to unlatch the door.

Pivot plate assembly 602 is pivoted about its shaft 642 in response to the actuation of either door handle 50 or 51, each of which pushes a connecting rod such as rod 644 attached to arm 646 in the direction of arrow 648, which causes a pivoting motion of interlocked arms 646 and 650. This motion in turn pulls pull rod 77 upwardly as indicated by arrow 654, which moves plate 610 to its "unlatch position" indicated by phantom line 610', in order to unlatch the door. The construction of pivot plate assemblies 70 and 602 are conventional for sliding van doors, with one difference, namely that an additional pull rod 606 is coupled to the plate 610 at connecting hole 656 so that the plate 610 may also be moved between its at-rest position and its unlatched position by action of unlatch motor assembly 604, which will now be explained.

The assembly 604 includes an electric motor 3M indicated in phantom and a right-angle gear reducer assembly 662, that are connected together in order to drive shaft 664 at a suitably slow rate of rotation with sufficient torque to operate the pivot plate assembly 70. The motor 3M and right-angle gear reducer 662 may be of the type employed for operating power windows in automotive vehicles. The output shaft 664 of gear reducer 662 is shown in cross section and is connected to a generally cylindrical non-ferromagnetic disk 666. The disk 666 includes an eccentrically located drive pin 668 and an outboard lobe 670 having a small permanent magnet 672 attached thereto. The output shaft 664 rotates in the direction indicated by arrow 674. The slotted end 676 of pull rod 606 encircles the pin 668, so that when the output shaft 664 rotates, the rod 606 will move in the direction generally indicated by arrow 680 to the position shown by phantom line 606'. Since the opposite slotted end 682 of rod 606 is connected by a similar pin 656, this movement of rod 606 causes pull rod 57 to unlatch the door 12. To complete the cycle, as the output shaft 664 rotates in a complete circle, it eventually will return to the location shown in solid lines in FIG. 25.

The position of a pivot plate 610 is monitored by a conventional small electrical switch 5LS, which may be any suitable type of limit switch, and is preferably a normally-open magnetic proximity switch that senses a magnet 690 located as shown in the arm 692 of pivot plate 610. The relative position of the eccentric pin 668 is monitored by two conventional electrical switches, denominated 8LS and 9LS, which also may be any suitable limit switch, but preferably are each a normally-open magnetic proximity switch actuated by the magnet 672 passing directly over thereover. When switch 8LS is actuated, the unlatch motor assembly 604 is in its "end-of-cycle" position and pivot plate 610 is in its at-rest position. When switch 9LS is actuated, the unlatch motor assembly is in a position which unlatches the door, i.e., pivot plate 610 is in position 610.. Thus, by delivering appropriate signals to electric motor 3M, the unlatch motor assembly 604 can be caused to stop at its end-of-cycle position where switch 8LS is actuated, or at its unlatch position where switch 9LS is actuated.

Figure 27:
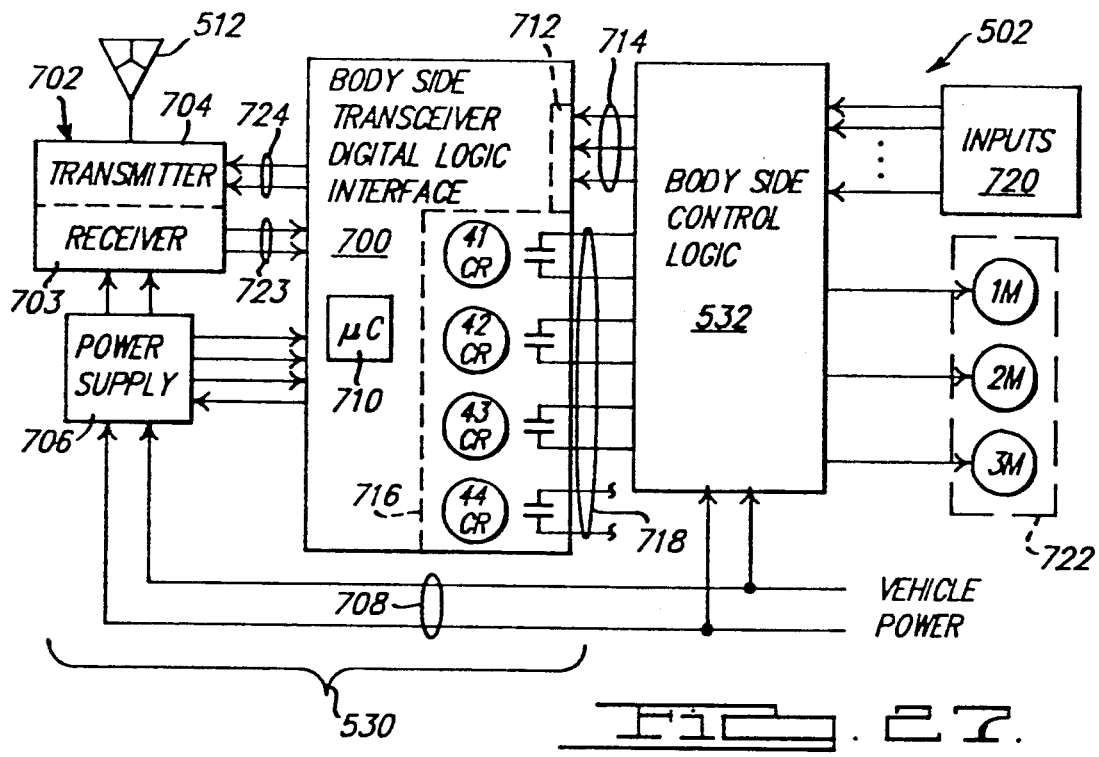
FIG. 27 is a detailed block diagram of the body side control system of FIG. 26.

FIG. 27 is a more detailed block diagram of the body side control system 502, that illustrates the various portions of transceiver system 530 and how it interfaces with the rest of the control system 502. The body side transceiver system 530 includes a transceiver digital logic interface 700, a transceiver 702 including a receiver section 703 and a transmitter section 704, a conventional regulated power supply 706 supplied with 12 volts D.C. input power from conductors 708 which are connected to the vehicle's main electrical system. The digital logic interface 700 is preferably implemented around a microcontroller 710 and includes an input buffer section 712 for conditioning signals provided over conductors 714, and an output buffer section 716 for providing output signals that are passed to the body side control logic circuitry 532 via conductors 718. As shown, the output section 716 may include four control relays labeled 41CR through 44CR. which provide relay contact outputs used by logic circuitry 532. Other inputs provided by limit switches pushbuttons and other electrical devices (if any) to the control circuitry 532 are collectively represented by block 720. Powered electrical devices, such as motors 1M and 2M, and the clutch mechanism CL associated with motor 2M (202M) as previously described, are collectively represented by block 722.

FIG. 27 shows the general flow of signals in the body side control system 502. Incoming signals received by antenna 512 pass through the receiver section 703 over conductors 723 to the digital logic interface 700, where they are decoded to obtain control information in the form of individual control signals provided in predetermined locations within each transmitted block of information, as will be explained more fully below. The integrity of the RF communications link is checked by examining the accuracy of the data using redundant encoding of the control signals and error checking techniques. Once the received control information is validated by microcontroller 710, the control information is used to set the state of the outputs in output section 716. In the presently preferred embodiment, the relay coils 41CR through 44CR are individually controlled(that is, energized or de-energized) in accordance with the state of their respective validated control signals. In this manner, the state of the relay contacts in the output section 716 can direct and/or be employed by the control circuitry 532 to produce the desired operation of the output devices in block 722.

The door side control system 506 needs to know the status of one or more inputs in block 720 and/or the status of one or more parts of the control logic in circuitry 532. This status information is conveyed over conductors 714 to the input section 712 of the digital logic interface 700. The microcontroller 710 then properly encodes this information, preferably in one or more bytes, and then sends it in appropriate format over conductors 724 to transmitter section 704 for broadcast via encoded communication signals by antenna 512.

Figure 28:
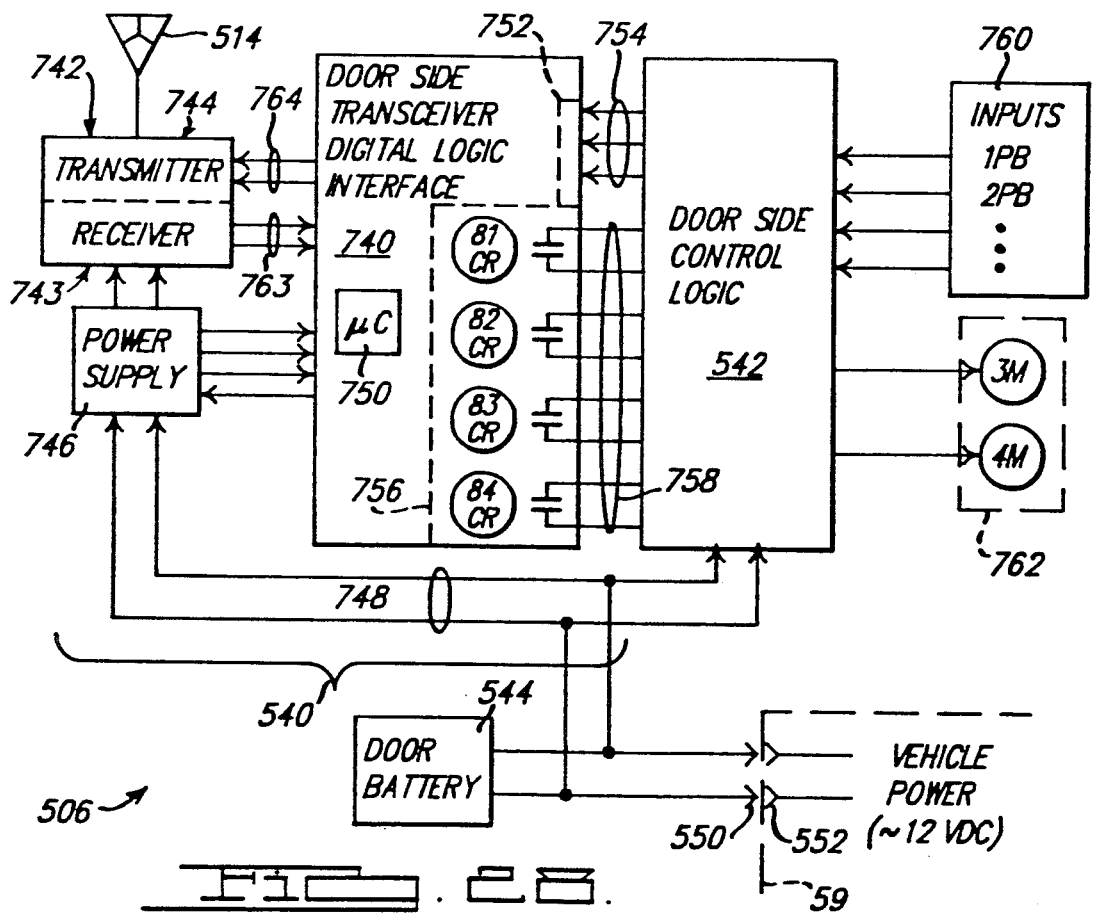
FIG. 28 is a detailed block diagram of the door side control system of FIG. 26.

FIG. 28 is a similarly detailed block diagram of the door side control system 506. FIG. 28 shows that the control system 506 is almost identical in overall organization to body side control system 502. Signals are routed in the same basic manner. Incoming communication signals picked up by antenna 514 are routed through receiver 743 and conductors 763 into the door side transceiver digital logic interface 740 for decoding and validation by microcontroller 750. The validated control signals are used to determine and set the state of control relays 81CR through 84CR in the output section 756. Contact closures of these relays are provided via conductors 758 to the door side control logic circuitry 542. The control circuitry 542 uses this information to properly power electrical devices, which may be solenoids or motors, such as motors 3M and 4M shown in block 762.

Input devices represented by block 760 provide status information to the control logic 542, which also sends appropriate information about the inputs and/or the status of one or more portions of the control logic 542 over conductors 754 to input buffer section 752 of the digital logic interface 740. The microcontroller 750 then encodes this information and ships it over conductors 764 to transmitter section 744 for broadcast via antenna 514.

FIG. 28 also shows that the door battery 544 is connected to electrical conductors 748 and electrical contacts 550 mounted on the forward side surface of door 12. FIG. 28 also shows that electrical connectors 552 mounted in the door frame 59 are tied into the 12 volt D.C. electrical system of the vehicle. As previously explained, when the door 12 is shut, electrical continuity exists between contacts 550 and 552, thus allowing the door battery 544 to be recharged. When the door is partially open, so that the contacts 550 and 552 no longer touch, the control system 506 is operated off of power stored in the battery 544.

FIGS. 27 and 28 graphically illustrate that the transceiver systems 530 and 540 are very much the same in terms of overall design. In fact, the transceiver systems 530 and 540 can be made essentially identical internally with respect to electrical hardware if desired, and only the software for the respective microcontrollers need be different. As will be seen from the software flowcharts below, even most of the routines in the software may be essentially identical in many respects.

As shown in FIGS. 27 and 28, the purpose of both transceiver systems 530 and 540 is twofold. The first purpose of each transceiver system is to receive a group (e.g., three or four) of input control signals, which are digital signals in the presently preferred embodiment (but could be analog signals if desired), and encode them for transmission to the other transceiver system. The second purpose is to receive, decode and validate signals encoded in the communication signals received by its respective antenna, validate the decoded information for accuracy, and if accurate, update the states of the outputs in the output section of the transceiver system. Those in the art will appreciate that, although relay outputs are shown in FIGS. 27 and 28, the output section could produce high or low level digital logic outputs, or even analog outputs with the use of suitable digital-to-analog converter output circuitry.

Figure 29:
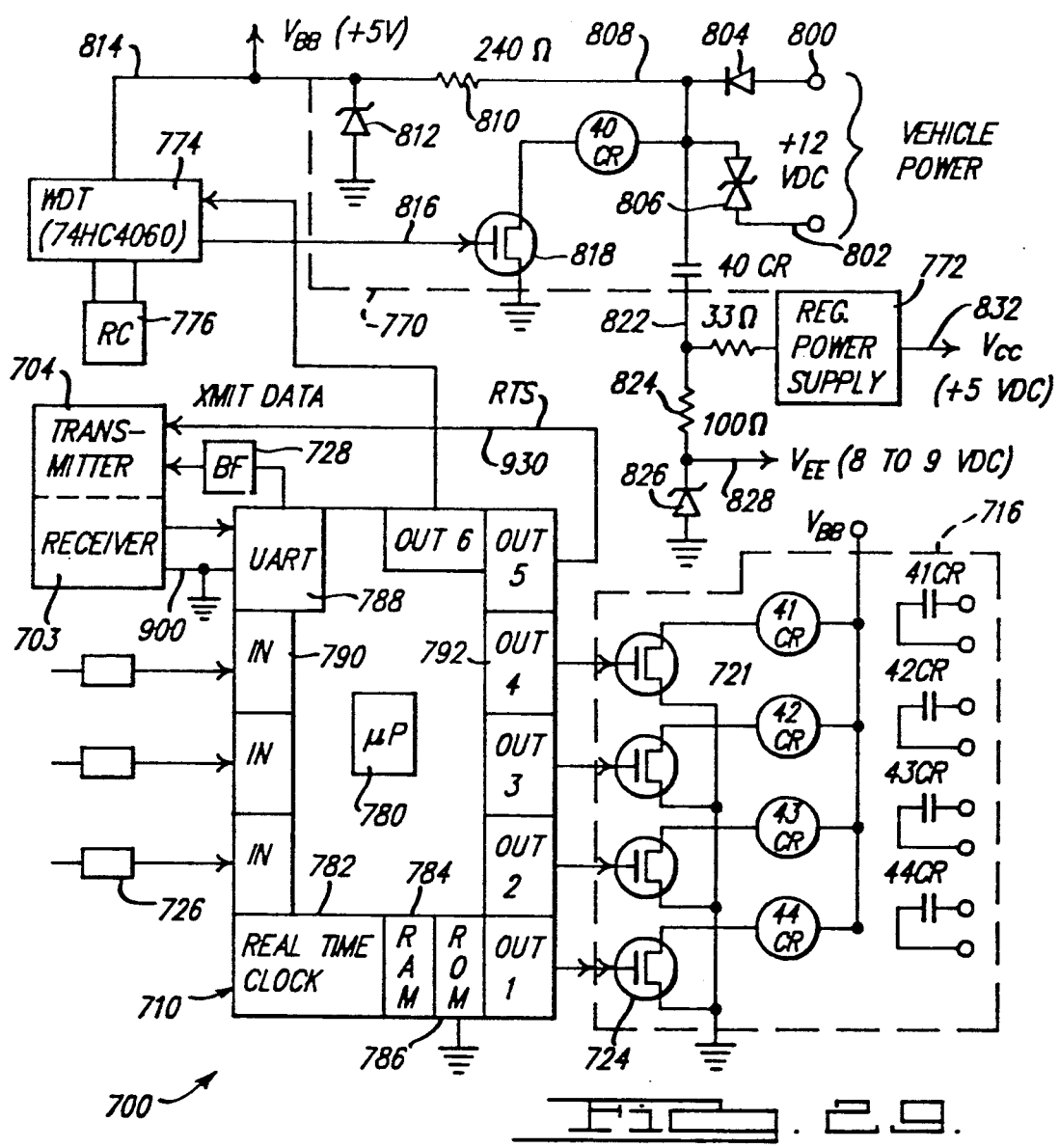
FIG. 29 is a detailed block diagram of the body side transceiver digital logic interface circuit, including real-time microcontroller, used in FIG. 27.

FIG. 29 shows a detailed block diagram for the body side transceiver control system 700. It should be appreciated that the door side transceiver system may be made essentially identical in terms of hardware, to the control system 530. The transceiver system 530 is constructed around the microcontroller 710, and also includes a supply power conditioning and monitoring section 770, a 5 volt regulated power supply 772, a watchdog timer circuit 774 with an RC network 776, an output section 716 which includes control relays 41CR through 44CR driven by power transistors 721 through 724, a group of photo-isolation circuits 726, and an output buffer circuit 728. The microcontroller 710 itself includes a microprocessor 780, a real time clock 782, random access memory 784, read only memory 786, a universal asynchronous receiver/transmitter ("UART") circuit 788, a group 790 of input ports, and a group 792 of output ports. Any suitable microcontroller or microcomputer may be used for microcontroller 710, including 4-bit, 8-bit or 16-bit processors. While the real time clock 782 and the UART 788 are advantageous to have, those in the microprocessor art will appreciate that such functions may be handled in software if desired, and thus real time clock 782 and UART 788 are not considered indispensable.

In operation, 12 volt D.C. power is received from the vehicle through input leads 800 and 802. Diode 804 protects against reverse polarity power being applied, while surge suppressor 806 protects against unwanted high voltage transients. Power is fed through resistor 810 to the zener diode 812 and watchdog timer 774, which may be the integrated circuit chip whose part number appears in FIG. 29. Once power on line 814 energizes the watchdog timer 774, output line 816 is asserted thus switching power transistor 818 from a nonconducting to a conducting state, which energizes relay coil 40CR. This in turn closes the normally open contact 40CR between wires 808 and 822, which applies power to the regulated power supply 772 and through resistor 824 to the zener diode 826 which provides an unregulated D.C. supply $V_{EE}$ on line 828 for the transceiver 702 and any auxiliary equipment which may be used, such as the current-sensing obstruction circuitry described in the aforementioned co-pending application entitled "Reversing Apparatus For Powered Vehicle Door Systems." The power supply 772 produces the regulated 5 volt D.C. supply $V_{CC}$ on line 832 which is provided to the microcontroller 710, input buffer circuit 726 and output buffer circuit 728. Thereafter, the microcontroller 710 performs conventional power-up and initialization routines and is ready for operation.

In the presently preferred embodiment of the body side and door side control systems 502 and 506, the transceiver systems 530 and 540 are largely transparent to the body side circuitry 532 and the door side control circuitry 542. This is achieved by having the transceiver systems 530 and 540 simply take the outgoing data intended to be sent to the control circuitry for the control system of the other portion of the vehicle, and essentially pass it along unchanged to that other control circuitry. For example, if a digital signal No. 1 is to be sent from the body side control circuitry 532 to the door side circuitry 542, this digital signal is passed through the transceiver systems 530 and 540, with proper encoding, transmission, reception, decoding and validation. However, the end result is that the same control signal No. 1 appears as an output of the door side transceiver system 540 very shortly after it was transmitted, assuming that transmission problems did not occur. In the exact same manner, other digital inputs to each transceiver system from its control circuitry are sent through both transceiver systems and cause a corresponding digital output to be produced by the other transceiver system. Thus, when the communications link between the transceiver systems is established, that is, operating satisfactorily, the existence of and functioning of the transceiver systems is transparent (i.e., not apparent) to the respective control circuits 532 and 542. One advantage of this approach to designing the control system 500 is that the transceiver systems may be made essentially the same, at least from a hardware point of view, which helps to reduce production costs.

Figure 30:
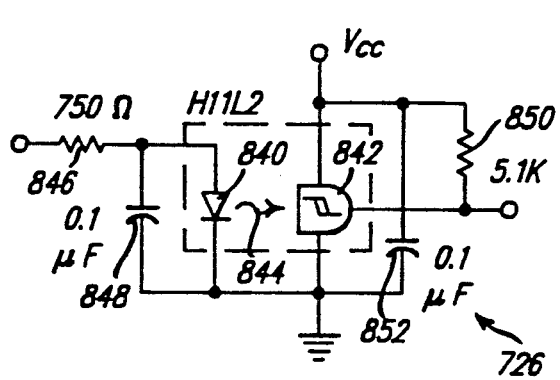
FIG. 30 is a typical photo-isolation circuit usable in the circuit of FIG. 29.

FIG. 30 shows a typical photo-isolation circuit 526 of the type used in the digital interface 700 shown in FIG. 29. The photo-isolation circuit includes a phototransistor, a Schmitt trigger circuit 842 with a photodiode input section to receive the light 844 emitted by photodiode 840. The photo-isolation circuit also includes an input resistor 846 and capacitor 848 wired as a low pass circuit for filtering purposes. The output section includes pull-up resistor 850 and filtering capacitor 852.

Figure 31:
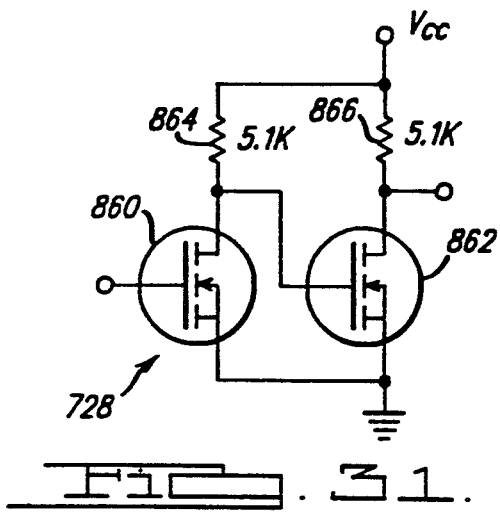
FIG. 31 is a level shifting and isolation circuit used to buffer serial data output from the microcontroller of FIG. 29.

FIG. 31 shows a presently preferred circuit for implementing the output buffer filter 728 used in FIG. 29. This buffer circuit includes two metal oxide semiconductor field effect transistors 860 and 862 connected to the supply $V_{CC}$ via pull-up resistors 864 and 866 as shown.

FIG. 32 shows a preferred circuit for RF transceiver 702 which may also be used in identical form for transceiver 742 in the body side control system 506. The transceiver 702 includes the following circuitry sections: an RF amplifier 870, a main oscillator 872, a data shaping circuit 874, a recovered signal amplifier 876, and a quench oscillator 878. This transceiver 702 is a super-regenerative detector design known to those in the communication field. This particular amplifier arrangement is preferred for the transceivers of the present invention because of its extreme simplicity and reliability, its ability to operate relatively efficiently in very low power transmission and reception situations, and the ability of various portions of the circuit to participate in transmission and reception activities, thus helping reduce its overall cost. The RF amplifier includes NPN power transistor 880 whose base is connected to the antenna 512. The main oscillator 872 includes a conventional saw filter 882 which is preferably tuned to operate at a frequency in the range of hundreds of Megahertz, with operation at 300 Megahertz to 325 Megahertz being most preferred in the present automotive vehicle applications. The saw filter 882 is connected between an inductor 884 and an NPN output transistor 886. The output of the oscillator 872 on line 888 is fed into a low pass rectifying filter consisting of capacitor 894 and diode 896, which produces a rectified data signal as its output on line 898. The rectified output signal on line 898 is fed into a bi-stable operational amplifier 902 which squares up and amplifies the data signal and outputs it on line 900. The recovered signal amplifier 876 includes a series resistor network composed of resistors 902 and 904 which provide a voltage at node 906, the positive input to the op amp 902, equal to one-half of the supply voltage $V_{EE}$, to act as a reference voltage against which to compare the raw unamplified data signal on line 898. The resistor and capacitor are sized to provide a very high open-loop gain across op amp 902 while preventing instability.

The quench oscillator 878 includes a digital inverter 918, and a LM555 timer arranged as an oscillator, and which preferably has a frequency in the range of 40 to 55 kilohertz, with 45 to 50 kilohertz being preferred. As is well known, the frequency of an LM555 timer oscillator circuit can be controlled by properly selecting values for resistor 922 and capacitor 924. One of the inputs to the quench oscillator 878 is a Request-To-Send ("RTS") signal from one of the digital outputs of the microcontroller 710 (see FIG. 29) which is delivered on conductor 930. When the transceiver 702 is to transmit information, the RTS line is allowed to go high, thus allowing the quench oscillator to operate and impress its output signal on line 932, which for convenience will hereafter be called the intermediate frequency ("IF") driving signal. Thereafter, the serial data to be transmitted is fed out of the UART 788 of microcontroller 710, through buffer circuit 728 to line 938, the second input to the quench oscillator 878. When line 938 goes high, it causes the LM555 timer/oscillator to be held in a reset set, thus forcing the output signal 932 to zero, and when the transmit data line 938 is low, the timer/oscillator 920 is allowed to operate, and the IF driving signal is output on line 932. When the IF driving signal 932 is present, it controls the operation of the main oscillator 872, by inducing oscillations at the carrier frequency of the main oscillator 872. The circuit elements of the main oscillator 872 will radiate a very low amount of this carrier frequency, as will the antenna 512. The total amount of radiated power should be less than about 100 microwatts, as measured at the other transceiver. Preferably, the total amount of transmitted power as measured anywhere along a locus of intended reception points, such as at the antenna of the second transceiver, will be less than 25 microwatts and is most preferably 15 microwatts or less. By employing such an extremely low-power signal, the present design minimizes the chances that the signals produced by the transceiver of the present invention will accidentally trigger another similarly designed transceiver in an adjacent vehicle. Also, by utilizing sufficiently low-power signals, it may be possible to minimize or even eliminate the need for governmental certification of the RF communications systems.

The operation of receiver section 703 of the transceiver 702 will now be explained. When the transceiver 702 is not transmitting information, the RTS signal on line 930 is low, thus preventing IF signal power from being applied via line 932 to the main oscillator 872. Accordingly, the main oscillator 872 will produce stable or strong oscillations, except in the event that a nearby transmitted signal tuned to or near the carrier frequency of oscillator 872 is received via antenna 512, amplified by RF amp 870 and applied to the oscillator 872 via conductor 940 connected to capacitor 881. If such a signal is received at the main oscillator 872, it will cause the tank circuit of the main oscillator to break into strong oscillations at its resonant frequency. Further, the oscillations will stop almost immediately after the received signal disappears. In this manner, the received signal on antenna 512 can produce oscillatory output on line 888 which corresponds to the transmitted signal received on antenna 512. This oscillatory output is then decoded by data shaping circuit 874 in a manner well known to those in the RF communication art. The output signal on line 898 is then amplified by recovered signal amplifier 876, which strengthens the signal considerably and turns it into a square-wave type signal with its precise waveform pattern corresponding to the imbedded signal impressed upon the carrier signal received by antenna 512. Accordingly, the output on line 900 is a serial digital waveform which can be fed directly into UART 788 of microcontroller 710.

The transceivers 702 and 742 each use the same two-byte format for a transmitting control information, e.g., as digital control signals. The UARTs of the microcontrollers 710 and 750 produce a conventional asynchronous serial bit stream transmission which has start and stop bits appended to the data being transmitted in conventional manner. Each signal transmission by the transceiver systems consists of two 8-bit bytes of information. The first byte is sometimes called the data byte and the second byte is sometimes called the check byte. Those in the art will readily appreciate that the order of the bytes being transmitted may be reversed or otherwise altered if desired, may exceed two bytes, or may only be one byte long, depending upon the specific communications protocol being used.

FIG. 33 is a graphical representation of the data byte with the bits numbered 1 through 8 from right to left. Bits 1 and 8 are not used to send control signals and, thus may each be arbitrarily set to 1 or 0 as desired. Bits 2 through 7 are used to redundantly encode the state of the three input signals, received by the input section 712, that are to be output for the other transceiver system as encoded control information impressed upon the carrier frequency of the transceivers. Bits 2 and 5 are each encoded with the state of the incoming input bit 1, which will be used as output 1 in the output section of the other transceiver system. Similarly, bits 3 and 6 are redundantly encoded with the state of input signal 2, and bits 4 and 7 are encoded with the state of input signal 3. Such redundant encoding makes it possible to check for the accuracy of the encoded data with a higher degree of certainty than would be possible without it. The data byte is sometimes referred to as byte "E".

The check byte is assembled by the microcontroller by adding, to the current data byte, the known digital address of the microcontroller which is the intended recipient of the transmitted information. The destination address is known as byte "D", while the check byte is known as byte "F". Therefore, the value of the check byte, byte F, is equal to the value of byte D plus the value of byte E. For example, if the value of byte E is a hex "37", and the destination address stored in byte D is hex "27", then the check byte F will have a value of hex "5E". In an 8-bit byte, there are 256 possible values for the destination address.

In using any given transceiver system of the present invention, the destination address of each transceiver is different. In essence this means there are 256 choices for the destination address of the first transceiver in a control system 500, and there are 255 choices for the destination address of the second transceiver in such a control system. Thus, even if three or four automotive vehicles containing the transceiver systems of the present invention were parked side by side or near each other, and somehow were able to pick up the faint communication signals from another vehicle, it is extremely unlikely that the destination address of any of the transceiver systems in the adjacent vehicles would be the same. Therefore, the signals of one vehicle would not operate the signals of the other vehicle. In this regard, it is worth noting that the antennas 512 and 514 of each vehicle are within the outer metallic skin of each vehicle. Thus, the communication signals which escape from any given vehicle are very much attenuated by the substantially closed metal shell presented by the overall vehicle body. Further, extremely low power signals, preferably 15 microwatts or less, are used to further reduce the possibility of unaccidental unintended operation of any adjacent system.

FIG. 34 is a simplified timing diagram illustrating how the transceiver systems 530 and 540 operate in a master-slave relationship. The system 530 is the master, and system 540 is the slave. The transceivers operate asynchronously, and spend a small portion of their time transmitting signals and a large portion of their time listening for transmitted signals from the other transceiver. The upper time bar 946 shows a few communication cycles of the master transceiver 530 of the presently preferred embodiment, each cycle of the master transceiver 530 lasts for 120 milliseconds and is controlled by an interrupt via the real time clock 782 of microcontroller 710. In each of its cycles, the master transceiver spends approximately 100 milliseconds listening, as shown. In operation, the master transceiver 530 first initializes itself as indicated by block 948. Next, the master transceiver 530 transmits its communications signal as shown by block 951. Thereafter it listens for approximately 100 milliseconds as shown by block 954. Once the listening period 954 is over, system 530 decodes the received signal (if any) obtained during the listening period, and acts upon this information, during the time period indicated by the DA block 956. The W block 958 represents an idle period or wait state where the master system is waiting for the interrupt to be generated by the real time clock as previously described. Thereafter, as shown in the second period 952, the entire sequence or cycle of the master 540 is repeated, beginning with transmit block 959.

The slave transceiver system 540 operates in a different manner, which will now be explained. The slave transceiver 540 will not transmit unless it first receives a bona fide transmission from the expected sender, i.e., the master system 530. The lower time bar 960 shows a cycle 962, during which time the slave 540 did not receive any communications, and therefore does not transmit, and a cycle 964 during which time it received a transmission from master transceiver 530, and therefore transmits its own information. In cycle 962, a listening period of approximately 100 milliseconds indicated by block 970 represents the time during which the slave transceiver 540 is listening. DA Block 972 represents the time during which the slave system 540 is decoding and, if appropriate, acting upon the communication signals it received. The listening periods 954 and 962 overlap. Accordingly, the master system 530 was not transmitting during the slave's listening period 970. Accordingly, the slave 540 deduces this in block 972 and does not act, that is, the slave 540 does not change its outputs and it does not send its own transmission. Nevertheless, the slave system 540 listens again in its next cycle 964 during listening period 974. During this time, shown in FIG. 34, a transmission from the master system takes place, and is decoded and acted upon by the slave system 540 in block 976. Accordingly, the slave system transmits its own communications message during the time period represented by block 978 thereafter. In cycle 980, the slave once again listens.

As illustrated by the diagram in FIG. 34, as long as the slave receives and validates a transmission from the master, it will transmit that same cycle. If communications link is up, that is working satisfactorily in both directions, the two transceiver systems will appear to be transparent to the control circuitry 532 and 542 of the overall control system 500. Because these RF communications take place at a relatively high rate of speed, that is approximately 8 times per second, the operations of the control systems 502 and 506 appear to work substantially simultaneously to the user of such systems. Further, because of the relatively high rate of control signal transmission, even two or three bad cycles where no data is transmitted should not adversely affect the performance of the overall control system 500 from the user's standpoint.

FIGS. 35 and 36 are general software flow charts illustrating the overall sequence of operation performed by the master microcontroller 710 and slave microcontroller 750 respectively. Referring to FIG. 35, the master controller 710 first powers up, initializes its variables (including setting its "consecutive bad message" counter) and deactivates all outputs as indicated in block 1000. In block 1002, it initializes its constants, and toggles the watchdog time output in order to reset the watchdog timer 774 shown in FIG. 29. As indicated at decision diamond by 1004, the controller next inquires whether the real time clock 710 has counted to a value greater than a predefined constant "H", which in the preferred embodiment is set for a value corresponding to a time period of 120 milliseconds. If the clock has not reached this value, the controller 710 loops back along path 1006 until this condition is satisfied, at which time the software control advances to block 1008. At this point, the master controller 710, under software control, builds and sends an outgoing message. At block 1010, it listens for an incoming message for a predetermined time period, such as 100 milliseconds as previously described in FIG. 34. If any message is received, path 1012 is taken to block 1014. If no message has been received during the listening period, path 1016 is taken to the "bad message received" block 1018.

At block 1014 the controller 710 attempts to validate the received message, in other words, verify that it is a bona fide and accurate message from the slave controller 750. If all error checks are met, the data is considered validated and path 1020 is taken to block 1022, where the outputs of section 716 are set. If the received message does not validate, path 1016 is taken to the block 1018. At this point, the communication cycle of the master controller 710 is complete, path 1024 is followed to block 1002, where the master communications cycle begins to repeat.

FIG. 36 for the slave controller 750 software also has a block 1000 and block 1002 which are identical in function to similarly-numbered blocks in FIG. 35. Next, block 1010 is performed. If any message whatever is detected, path 1032 is followed to block 1014 of FIG. 36. If no message is received, path 1036 is followed to the "bad message received" block 1018.

At block 1014, if the received message is validated, path 1040 is followed to the Set Outputs blocks 1022. Thereafter, the slave controller 740 builds and sends an outgoing message as indicated in block 1008 in FIG. 36. After this is performed, control passes along path 1044 back to the beginning of the slave cycle, namely block 1002.

As may be seen from the overview provided by the general software diagrams in FIGS. 35 and 36, a number of routines performed by the master and slave microcontrollers are identical, but are performed in a different order. Further, since the slave controller does not use its real time clock, it does not need a decision diamond 1004, although one could be provided if desired. Similarly, the source code for the slave could be written, if desired, to attempt to have it synchronize itself with transmissions received from the master. But, it should be apparent from the following discussion of the detailed routines within the software that this is not necessary since, over any relatively brief period of time, well under one second, one or more bona fide and validated messages should get through in both directions of communications between the transceiver systems 532 and 542.

FIGS. 37 through 41 discuss the routines which are common to the master and slave software as shown in FIGS. 35 and 36. FIG. 37 shows the sequence of operations carried out by "listen for incoming message" routine 1010. This routine begins with the clearing of the UART and input buffer within the microcontroller 710 as shown in block 1050. Next, as shown in block 1052 the listen delay time, which may be a software delay loop, starts the decision diamond 1054 to inquire as to whether the delay is over. When the answer is yes, the input data (if any) received from the UART is transferred into the microcontroller's input buffer as indicated in block 1056. Next, the input buffer is checked to determine whether it is empty, as shown by decision diamond 1058. This completes the routine shown in FIG. 37.

FIG. 38 shows the "validate received message" routine 1014, which is performed as follows. As indicated by decision diamond 1064, the processor first checks to see whether the value of the check byte which has been received equals the value of the stored destination address in byte D and the received data byte E. If not, path 1066 is followed to the message not validated block 1068. If the answer to the foregoing question is yes, three more tests are performed in succession as indicated in decision diamond blocks 1070, 1072 and 1074. Specifically, the software checks to see whether in byte E, the received data byte, bit 2 is equal to bit 5 as indicated in diamond 1070, bit 3 is equal to bit 6, as indicated in diamond 1072, and bit 4 is equal to bit 7, as indicated in diamond 1074. If the answer to any of these questions is no, the message is not validated. If the answer to all three questions is yes, the message is considered validated as indicated in block 1076 and the received values of bits 2, 3, and 4 are latched into registered locations within the processor representing the status of outputs 1 through 4. Next, the bad message count ("BMC") is set to zero as indicated in block 1078, and the "communications-on" output is asserted as indicated in block 1080. As will be seen shortly, the control logic in a slave control circuitry 542 will not allow the electrical equipment, namely the motors 3M and 4M to operate, unless communications have been successfully established, as indicated by asserting the "communications-on" output. Next, as indicated in block 1082, this constitutes a successfully decoded validated output, and internal memory within the controller is updated with these new values. This completes the routine shown in FIG. 38.

FIG. 39 shows the "set output" routine. In this routine, the status of bits 2 and 5 are checked, and the corresponding outputs are either cleared or set, depending upon the status of the bits. For example, decision diamond 1090 asks whether bits 2 and 5 are each equal to 1, if the answer is yes, the output 1 is set as indicated by block 1091, while if the answer is no, the output 1 is cleared as indicated by block 1092. In a similar manner, as indicated by decision diamond 1094 and 1097, the output numbers 2 and 3 are similarly made to conform to the status of their validated control bits.

FIG. 40 shows the internal sequence of the "build and send outgoing message" routine 1008. The first step is to set the "request-to-send" output of the microcontroller on so as to allow the quench oscillator 878 shown in FIG. 32 to run. Next, as shown in block 1104, the outgoing data byte is built by setting bits 2 and 5 equal to input one, bits 3 and 6 equal to input 2 and bits 4 and 7 equal to input 3 of the microcontroller. Next, in block 106, it builds the outgoing check byte as indicated and as previously explained. Thereafter, in block 108, it sends the data and check bytes through its UART to its transceiver for transmission. Finally, it clears the "request-to-send" output, thus turning off the quench oscillator 878, as indicated in block 1110.

FIG. 41 shows the "bad message received" routine 1018. The first step performed here is to increment the bad messages count by one, as indicated in block 1118. Next, decision block 1120 checks to see whether the value of the bad message count has exceeded the maximum allowed number of consecutive bad messages, BMAX. If the actual count has not exceeded BMAX, path 1122 is followed to the exit path 1124, since the status of the body side control system 502 is no longer certain. If the answer to decision block 1120 is yes, then the communications link can no longer be considered to be up. Accordingly, it is necessary to deactivate all outputs of the output section of the microcontroller, as indicated in block 1124. Also, if a validated message is not received in the next cycle, then the setting of BMAX equal to BMC in block 1126 ensures that during the next communication cycle, block 1124 will once again executed in the event that a validated message is not received.

FIGS. 42 through 44 show a presently preferred relay logic implementation of control circuitry 532. FIGS. 45 and 46 show a presently preferred relay logic implementation of the door side control circuitry 542.

Table 1 below lists and describes the functions of the various pushbuttons, limit switches, motors and the like used in the electrical control circuits shown in FIGS. 42-47.

TABLE 1

DESCRIPTION OF SELECTED COMPONENTS USED IN FIGS. 29 THROUGH 33

| Components | Ref. Line No. (FIG. No.) | Description |
| --- | --- | --- |
| 1LS | | [Not used in control circuits of FIGS. 29-33.] Normally closed; closes when striker pen rotates to fully extended unclamped position. |
| 2LS | Lines 108 & 123<br>FIGS. 29 & 30 | Normally closed; open when striker pin rotates into its retracted (clamped) position, indicating door is clamped. |
| 3LS | Line 120<br>FIG. 30 | Closed when the door is forward of its intermediate position, and open when the door is rearward of its intermediate position. |

TABLE 1-continued
DESCRIPTION OF SELECTED COMPONENTS USED IN FIGS. 29 THROUGH 33

| Components | Ref. Line No. (FIG. No.) | Description |
|---|---|---|
| 4LS | Lines 106 & 238 FIGS. 29 & 33 | Normally closed; opens when latch member moves to fully closed (latched) position. |
| 5LS | Lines 211 & 226 FIG. 32 | Magnetic proximity switch normally open; closes when door handle starts to be pulled open either manually or by unlatch motor 3M. |
| 6LS | Line 140 FIG. 31 | Normally closed; opens when door reaches fully open position. |
| 7LS | Line 132 FIG. 30 | Normally open; closes when an obstruction in the path of the moving door is sensed by increased torque output of traverse motor 2M. |
| 8LS | Line 205 FIG. 32 | Magnetic proximity switch, normally open, held closed by magnet when unlatch motor 3M is in its end-of-cycle position. |
| 9LS | Line 206 FIG. 32 | Magnetic proximity switch, normally open, held closed by magnet when unlatch motor 3M is in a position which unlatches door latch. |
| 10LS | Line 210 FIG. 32 | Normally closed and mounted in door; held open when door is within about one-half inch of being fully closed. |
| 11LS | Line 226 FIG. 33 | Normally open; closes when door lock is moved to its unlocked position. |
| 1PB | Line 235 FIG. 33 | Normally open; manually closed to close door from outside of vehicle. |
| 2PB | Line 236 FIG. 33 | Normally open; manually closed to close door from inside rear of van. |
| 3PB | Line 131 FIG. 30 | Normally open; manually closed by operator of vehicle to open door from the driver's console. |
| 4PB | Line 128 FIG. 30 | Normally open; manually closed by operator to close sliding door from the driver's console. |
| 1M | Line 151 FIG. 31 | Motor for moving the striker pin between its extended and retracted position to move the door from its unclamped position to its clamped position. |
| 2M (Same as 202M) | Line 154 FIG. 31 | Motor for driving the cable spool and moving the door between its fully open position and nearly closed position. |
| 3M | Line 220 FIG. 33 | Single direction motor for moving an eccentric member in a circular cycle which forces door latch momentarily in unlatched position and then returns it to latched position. |
| 4M | Line 224 FIG. 33 | Reversing motor for locking or unlocking door lock mechanism, depending upon direction the motor is run. |

Table 2 below provides a convenient cross-reference to determine which input signals are responsible for energizing the output relays of transceiver system 530, and the function or command associated with each such relay coil being energized.

Similarly, Table 3 below provides a convenient cross-reference to indicate which input signals are responsible for the energization of the control relay outputs of door side transceiver system 540.

TABLE 2
BODY SIDE TRANSCEIVER RELAY OUTPUTS

| Output No. | Relay I.D. | Contacts On Line Nos. | Function/Command When Relay Coil On | Source of Signals (Ref. Lines/FIG.) |
|---|---|---|---|---|
| 1 | 41CR | 127 (FIG. 30) | Close door request from door side | 1PB & 2PB (235, 236 - FIG. 33) |
| 2 | 42CR | 142 (FIG. 31) | Open door request from door side | 57CR (237 - FIG. 33) |
| 3 | 43CR | 106, 122 (FIGS.) 29, 30) | Door is not in primary latch position | 4LS (238 - FIG. 33) |
| 4 | 44CR | (Not Used) | Communications link is up | Microcontroller (FIG. 27) |

TABLE 3

DOOR SIDE TRANSCEIVER RELAY OUTPUTS

| Output No. | Relay I.D. | Contacts On Line Nos. | Function/Command When Relay Coil On | Source of Signals (Ref. Lines/FIG.) |
| --- | --- | --- | --- | --- |
| 1 | 81CR | 212, 227 (FIGS. 32, 33) | Unlatch door request from body side | 8CR (133 - FIG. 30) |
| 2 | 82CR | 228, 230 (FIG. 33) | Lock door request from body side | 31CR (134 - FIG. 30) |
| 3 | 83CR | 222, 232 (FIG. 33) | Unlock door request from body side | 32CR (135 - FIG. 30) |
| 4 | 84CR | 226 (FIG. 33) | Communications link is up | Microcontroller (FIG. 28) |

In the following discussion of the relay circuits, knowledge of the contents of Tables 1, 2 and 3 will be assumed.

FIGS. 42–47 are prepared in relay ladder diagram form, and have line numbers on the left side of the figures which run consecutively on each sheet. The line numbers on which the contacts of relays appear have been listed to the right of the relays that control them, and normally closed contacts are indicated by underlining in the listings. Thus, referring to FIG. 42, the relay 21CR is provided with two contacts, namely a normally open contact on line 104 and a normally closed contact on line 106. FIG. 42 represents the circuitry within the body side interface module 524 shown in FIG. 26. The operation of this relay ladder logic and the other logic within FIGS. 43–47 is explained below.

Referring now to FIG. 42, line 100 shows the vehicle battery providing +12 volt D.C. power to several components on line 101, including a circuit breaker, a two-position interior lamp on-off switch, and a four-position ignition key switch which is only closed when in the run position. Also on line 101 is a four-position transmission switch which is only closed when in the park position. When the ignition switch is in the run position, relay 21CR is on, and as long as relays 27CR and 28CR are not on, control relay 23CR will energize, thus enabling the remainder of the body side control system 502 through the normally open 23CR contact on line 114.

On line 103, a three-position, spring-return-to-center key switch on the passenger side of the vehicle is shown in series with a coil of relay 22CR. Turning the passenger side door key to the unlock position causes relay 22CR to energize, which also can enable the system through relay 23CR by virtue of the 22CR contact on line 105. It is also worth noting that the vehicle must also have the transmission switch in park if a ground path to the battery is to be provided to the coils of 23CR, 26CR, 27CR and 28CR and timer 28TR. In the event that the primary latch is not released, the door 12 is normally not open and the normally closed 24CR contact on line 112 will permit relay 28CR to energize after the 1.5 minute time delay created by solid-state RC timer 28TR, which is an on delay. Thus, unless the ignition switch stays in the run position or the passenger key lock on line 103 remains actuated, the normally closed 21CR and 22CR contacts on line 106 will permit 28CR to energize and drop power to the coil of relay 23CR, thus de-energizing the system. In other words, the timer 28TR will time out the enablement of the system about 1.5 minutes after turning the ignition key out of the run position or releasing the passenger side lock.

Relays 25CR, 26CR and 27CR form a circuit which also may cancel the enable command provided by relay 23CR under certain specified conditions. As before, if power is provided to the coil of relay 25CR and the door is unclamped, 26CR will energize. Thereafter, if the door is clamped up again, 27CR will energize, and the normally closed 27CR contact on line 104 drops out relay 23CR. By virtue of this circuit described, a user of the door system can only open and shut the door 12 once after the ignition key or passenger side door key has been opened. This helps prevent children or others from playing with the power door system after the vehicle has been turned off.

Power to the door side transceiver system 540 and control circuitry 542 is provided directly when contacts 550 are in physical contact with contacts 552, as previously explained with respect to FIG. 26. When the door is open, power is provided by the battery 544 in the door. This wiring configuration is shown in FIG. 45 at lines 201 and 202. As may be seen in FIGS. 45 and 46, the power is thus always provided to the control circuitry 542 shown in FIGS. 45 and 46. To prevent loss of power when the vehicle sits in a closed-up position for extended periods of time, such as in an airport parking lot or over a weekend in the driveway, all switches and pushbuttons are designed to be open, when the vehicle, including the sliding door 12, is closed up. In this manner, a drain is not placed upon the battery 544 or the vehicle's main battery. The electrical circuits of the powered sliding door system 500 are shown in the condition they assume when the door is in its fully closed, fully clamped condition. Starting from this condition, a full door opening, and then a full door closing cycle will be considered.

With the door in a fully closed and clamped position, the user, after causing relay 23CR to be energized, presses the pushbutton 3PB (line 131). Accordingly, control relay 8CR (line 131) energizes, as indicated in Table 3.

When the operator manually actuates the door handle 50, closing the limit switch 5LS (line 211) has the same effect as energizing relay 81CR on line 212. If the door is open already, relay 56 will be energized and relay 57CR can be energized to produce an open door command. If the vehicle is closed up, then the conditions specified in lines 226 and 227 must be satisfied. Once again, energization of relay 81CR or actuation of switch 5LS begins the process. If the communications link is up, relay 84CR will be energized, and if 11LS is actuated, indicating the door is unlocked, relay 61CR will energize, indicating that the request to open the door has been approved. This in turn energizes relay 57CR through the normally open 61CR contact (line 214). On line 237, an open door request sent back through the transceiver systems to the body side control logic to be fed to the traverse motor 2M logic to start it operating by energizing relay 42CR and closing its normally open contact (line 42) to energize relay 9CR which provides power to motor 2M on line 154 with the proper polarity to rotate the motor so as to open the door.

Simultaneously, in the door side control circuit 542, the energization of relay 61CR causes an unlatch cycle to start by turning on relay 51CR (line 203). This energizes relay 59CR which runs the unlatch motor 3M (line 220). As previously explained with respect to FIG. 25, proximity switches 5LS (line 211), 8LS (line 205) and 9LS (line 206) monitor the position and operation of the latching mechanism shown in FIG. 25. As the motor 2M rotates, 5LS actuates first, followed by 9LS energizing relay 53CR. This energizes unlatch memory relay 54CR which momentarily de-energizes 51CR and starts timer 55TR (line 209). When timer 55TR times out, coil 55CR is energized, thus re-energizing relay 59CR which causes the unlatch motor 2M to begin running again. This causes 9LS to be released and 8LS to be actuated, energizing relay 52CR which ends the unlatch cycle by dropping unlatch memory relay 54CR (lines 207 and 208), which turns off relay 55CR. In this manner, the unlatch motor 2M has been run a full cycle, pausing upon the actuation of proximity switch 9LS for the length of time delay of 55TR, in order to ensure that the latch mechanism has time to release and allow the door to unlatch. While the unlatch cycle proceeds, the relay 9CR remains energized on account of the seal contact on line 143. Thus the door opens all the way, actuating switch 6LS (line 140), dropping out relay 9CR which de-energizes the motor 2M. Note that relay 9CR cannot energize until relay 2CR energizes, indicating that the door is out of primary latch. This prevents the motor 2M from pulling against the latched door.

Closure of the door is made to happen by pressing 4PB (line 128), or actuating pushbuttons 1PB or 2PB (lines 235 and 236) on the door, which sends a close door request through the transceiver systems, thus energizing output relay 41CR and relay 5CR (line 127), which energizes 10CR under certain conditions dictated by the relay contacts and wiring on lines 144-147 of FIG. 44. The relay contacts are set up to allow the close door pushbutton to cause the door to close up until the door reaches its intermediate position, which actuates 3LS (line 120) and energizes 1CR, thus dropping out relay coil 10CR. Thereafter, the pushbuttons 1PB, 2PB and 4PB must all be released in order to energize relay 11CR. Then, the console "close door" pushbutton 4PB can be re-pressed and relay 10CR will energize through line 145, and the door will completely close. The spring-wrapped clutch is energized via relay 15CR.

The clamping and unclamping of the door is controlled by running motor 1M (line 151). The energization of relay 7CR and thus motor 1M requires the following conditions specified by the relay logic on lines 129 and 130. If the door is not out of primary latch, then the door must at least be unclamped, as indicated by relay 3CR being energized. This causes the door to automatically latch up, as provided for on line 130. If the door is out of primary latch, then a close door command (10CR energized) and door clamped position must be present.

The FIG. 43 circuit also provides for automatic opening of the door upon encountering an obstruction. This is detected by actuation of relay limit switch 7LS (line 132) anytime after relay 30CR is energized. As shown on lines 156-158, relay 30CR is energized after the on-delay time period of 30TR has elapsed anytime after energizing relay 10CR in order to close the door. Note that relay contacts 10CR provide electrical power to the reversing motor 2M from an opposite direction than relay contacts 9CR which open the door.

Electronic obstruction detection may be employed in place of switch 7LS. The aforementioned co-pending patent application entitled "Reversing Apparatus for Powered Vehicle Door Systems" discloses an electronic system which monitors changes in the current of the open/close door motor 2M and provides a relay contact output when these changes indicate that the door has been obstructed. The relay contact output of this electronic obstruction sensing system may be used directly in place of limit switch 7LS on line 132. The contacts on line 136 provide a suitable input signal for instructing the electronic sensing circuit when to check for obstructions.

The commands for locking and unlocking the door are provided from the normal 12 volt D.C. signal associated with the power lock/unlock circuitry of the vehicle. These signals actuate relays 31CR and 32CR on lines 137 and 138, causing contact closure on line 134 for a lock door request and on line 135 for an unlock door request. These requests are sent as indicated by Table 3 to the door side transceiver system 540, and cause relays 82CR and 83CR to energize. The energizing of relay 82CR causes relay 62CR to energize under certain conditions, namely the unlatch cycle must not be running. If the unlatch cycle is in progress, as indicated by the energization of one or both relays 51CR and 54CR, relay memory 64CR remembers this request to lock the door, and via relay 65CR locks the door after the unlatch cycle is over using the relay logic shown on lines 228-234. When output relay 83CR is energized (line 222), this turns on relay 60CR, which causes the motor 4M to run in the unlock direction.

Those in the art will readily be able to read the relay ladder logic contained in FIGS. 42-47 and discern the other features and operating sequences of the present invention. From the foregoing, it should be appreciated that the combined control circuitry provided by body side control module 532 and door control module 544 is well suited to operate a wireless power door system, i.e., a power door system without wires extending between the door 12 and the body portion of the vehicle. Those in the art should also appreciate that in control system 500, the control devices on the door 12 remain fully active even though the door is not in its closed position. This permits the user to actuate the internal or external door handles on the door, even while it is moving, to provide power commands to the door. Thus, the overall system 500 is believed to be a great convenience to the users of conventional sliding doors used in automotive vehicles like vans, by making opening and closing the door 12 from any position a very easy thing for the user to accomplish.

FIG. 47 is a block diagram of a simplified control system 1200 for operating a power sliding van door. The system 1200 includes a body side control system 1202 which is shown entirely above line 504 representing the demarcation between the body portion of the vehicle and the door 12, whose electrical devices are shown in door module 1206. The body side control system 1202 includes: a final closure module 1226 including the final closure motor 1M and door clamped limit switch 2LS; and a body side control module 1232 which receives as its inputs the control signals from pushbuttons and limit switches shown above line 504 in FIG. 47, and controls the operation of final closure motor 1M, traverse motor 2M and the clutch CL. The logic control circuitry 1232 is shown in relay ladder diagram form in FIGS. 48 and 49 which will be explained shortly.

The door module 1206 includes the unlatch motor 3M, the lock/unlock motor 4M and the limit switches 4LS and 11LS, all wired as shown. Electrical contact between the door side control system 1202 and the door module 1206 is made only through the two sets of contacts 550' and 552', which each preferably include four contacts or connectors each. These contacts are located in the same position as electrical contacts 550 and 552 previously discussed, and an exemplary location for same is shown in the partially cut-away view in FIG. 23, where the rear side of electrical contacts 552 and 552' may be seen on the pillar which contacts the front edge of the door 12. Thus as suggested by FIG. 47, the motors 3M and 4M can only be operated by control system 1200 when the door 12 is closed so that contacts 550 and 552 are touching. This feature still enables the user of a vehicle to have a power unlatch function and power locks on the sliding van door. Further, the wiring shown in door module 1206 permits the state of the switches 4LS and 11LS to be monitored with a minimum number of contacts 550 and 552, as will be explained further with regard to FIG. 49.

The simplified control system 1200 eliminates a number of the electrical switches which are utilized in the control system 500 shown in FIG. 26. However, the control system 1202 does have one different switch, namely a "door closed" limit switch 12LS, which may be a conventional plunger-type door switch and may be mounted in the location shown in FIG. 23. 12LS is actuated only when the door is almost closed or closed. When the door is at least partly opened (perhaps by 0.3 inches to 0.7 inches minimum), the switch 12LS is released. As before, the control switches in control system 1200 are arranged to be opened when the sliding door 12 is completely closed and latched to minimize power drain on the main battery of the vehicle during extended non-use of the vehicle.

Figure 48:
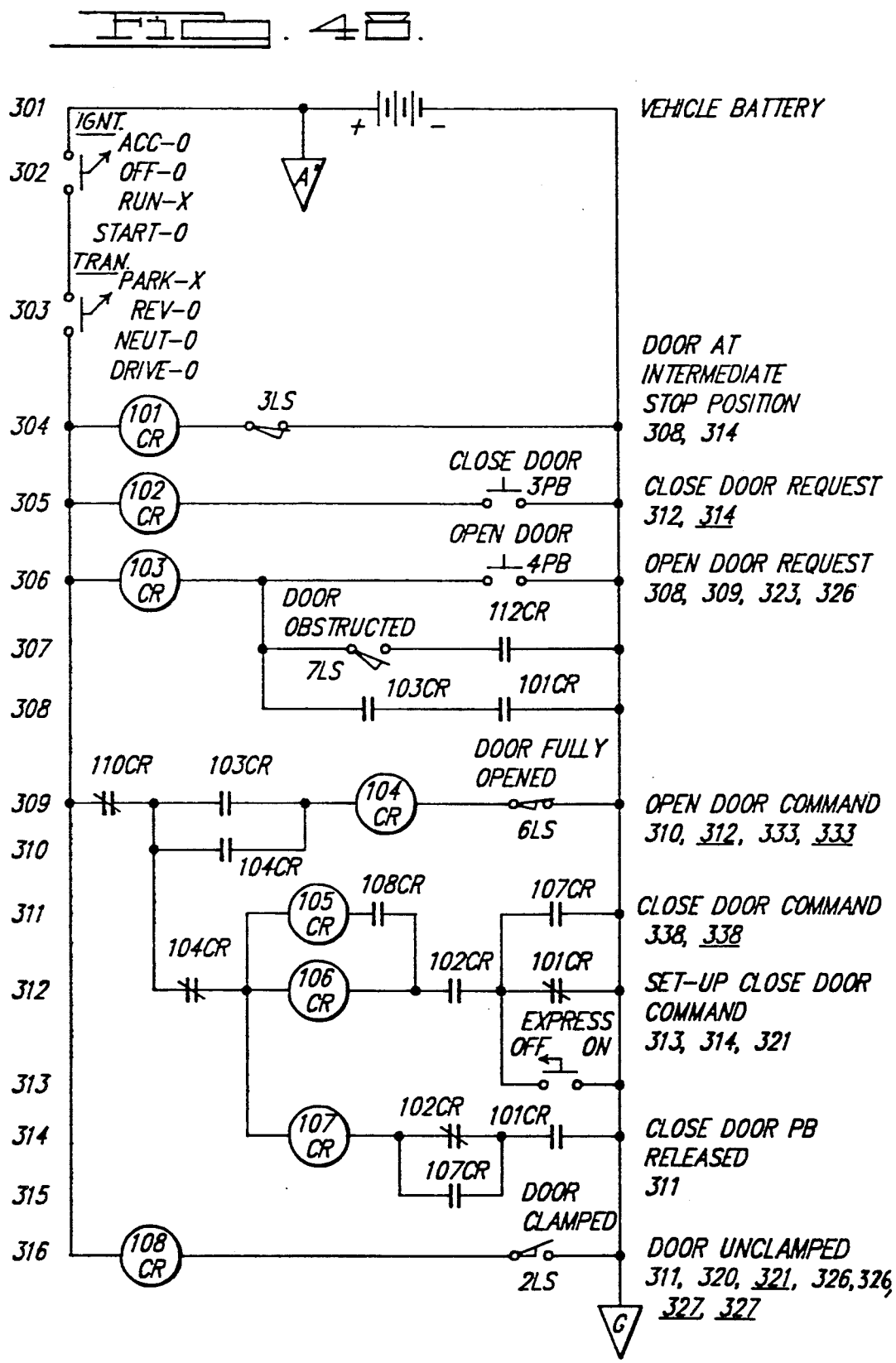
FIGS. 48 and 49 constitute a relay ladder diagram of a preferred control circuit for use in the FIG. 47 control system.
Figure 49:
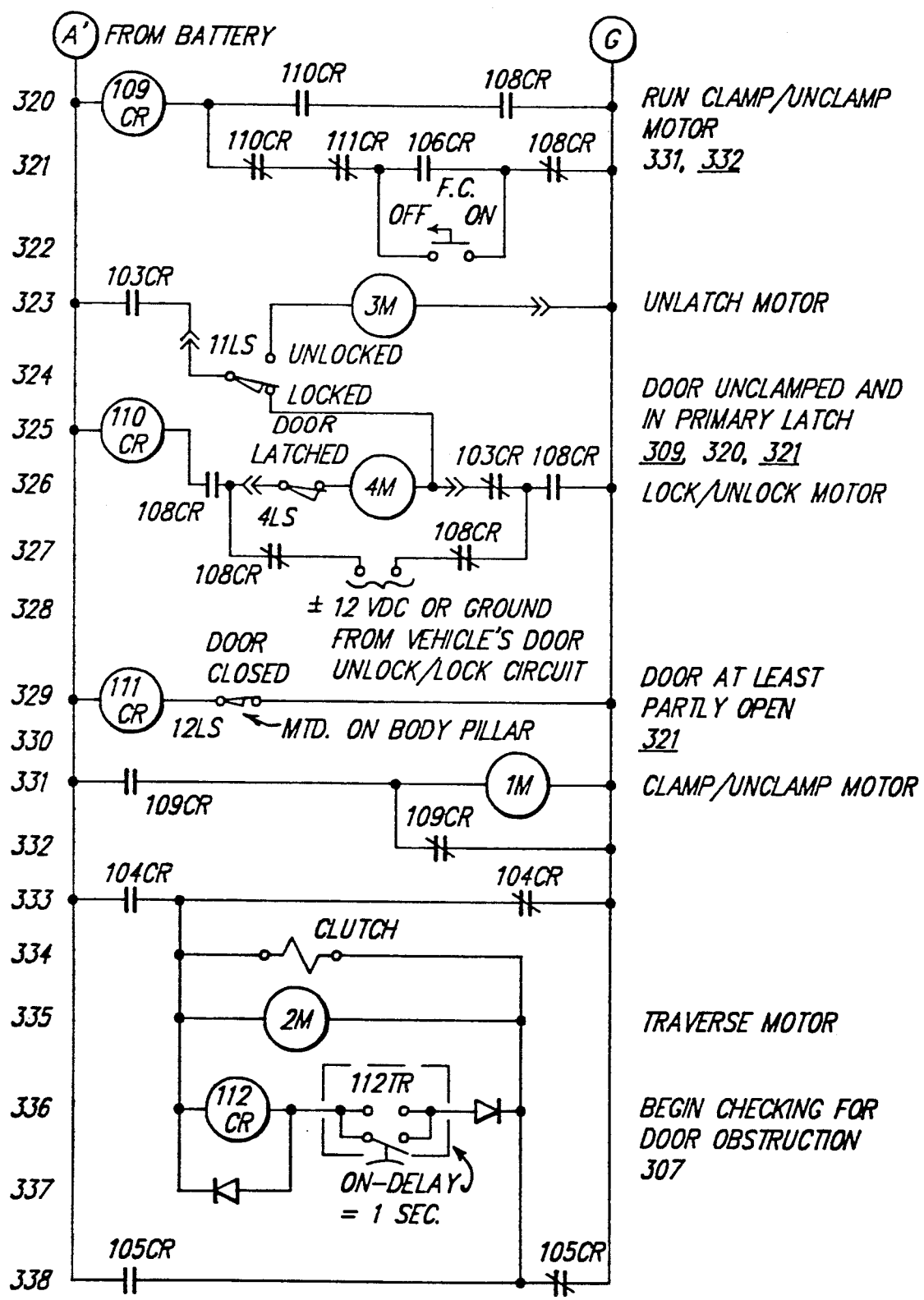

Referring now to FIGS. 48 and 49, the general operation of control circuitry 1232 will be explained. The circuitry is enabled only when the vehicle ignition is in its run position and the transmission switch is in park. An open door command may be produced by pressing pushbutton 4PB (line 306) which energizes relay 103CR, and relay 104CR as well, provided that relay 110CR is de-energized and the door is not already fully opened, as indicated by limit switch 6LS (line 309). Relay 110CR is energized only when the door is unclamped so that relay 108CR is energized and there is no open door request.

To close the door, a user may close it manually or may press button 3PB (line 305), which energizes relay 102CR and 106CR. As long as the door is unclamped, as indicated by limit switch 2LS being released (line 316), relay 108CR will be energized, thus allowing relay 105CR to energize, which turns on the traverse motor in a direction opposite its opening direction. As long as the user holds his button 3PB down, the door 12 will continue to close, until the switch 3LS is actuated, indicating the door is at intermediate position, or almost closed. This energizes relay 101CR, thus dropping out relays 105CR and 106CR.

Once the user releases button 3PB, this allows relay 107CR to energize. Thereafter, when button 3PB is pushed again, relays 105CR and 106CR are re-energized and the door 12 continues to close. At this time 12LS actuates, which de-energizes relay 111CR (see line 329), and automatically energizes 109CR to run the motor 1M which clamps up the door. This actuates 2LS, de-energizing relay 108CR, which in turn allows relay 110CR to energize (see lines 325 and 326), causing relay 109CR to drop out, thus stopping the clamp motor 1M.

The limit switch 7LS is provided in control system 1200 to detect obstructions in the path of the door during closing. Relay 112CR is energized after the on-delay of timer 112 is over, approximately one second after the door is commanded to close by energizing relay 105CR. When normally open contact 112CR on line 307 is closed, actuation of switch 7LS causes relay 103 to turn on, thus energizing relay 104CR, which takes precedence over the close door command by virtue of its normally closed contact in line 312. The "express on-off" switch shown on line 313 can be closed if a user wishes to not have the door stop at the intermediate position when closing.

In the event that an open door request from 4PB is received, and the door is locked, the control circuit 1232 provides logic on lines 323. 326 for automatic unlocking of the door by energizing lock motor 4M. This causes 11LS to actuate, which then allows the unlatch motor 3M to operate thereafter automatically.

The circuitry on lines 326 and 327 provide a path for a plus or minus 12 volt D.C. signal from the vehicle's normal power door unlock/lock circuitry to operate motor 4M. The only requirement here is that the door be clamped (relay 108CR de-energized) that the door be latched, as indicated by 4LS being actuated, and that no open door request be present (as indicated by relay 103CR).

From the foregoing description and further study of the circuitry in FIGS. 48 and 49, those skilled in the art should appreciate that control system 1200 is well suited to provide for power-assisted closing or opening of a power door from a pair of pushbuttons, such as buttons 3PB and 4PB. Those in the art will appreciate that such pushbuttons and other user switches can be located wherever desired on the body of the vehicle, and if desired, one or more buttons may be provided in parallel to one or both of the buttons 3PB and 4PB.

It should be pointed out that any of the embodiments of the present invention discussed herein can optionally be employed with or without the inventions disclosed and described in the above-mentioned copending patent applications, entitled "VARYING RADIUS HELICAL CABLE SPOOL FOR POWERED VEHICLE DOOR SYSTEM", "REVERSING APPARATUS FOR POWERED VEHICLE DOOR SYSTEMS", and/or "POWERED CLOSING ASSIST MECHANISM FOR VEHICLE DOORS OR LID MEMBERS". Such inventions of such copending applications can optionally be used either alone or together, and either in addition to, or in substitution for, various components, sub-assemblies, or sub-systems described above, as well be readily apparent to one skilled in the art.

The illustrated exemplary applications of the present invention provide improved control systems and circuitry for powered sliding door systems for automotive vehicles such as vans. The sliding door 12 is moved with low momentum by the powered sliding door operator between its fully open position and its nearly closed position. In addition, the powered sliding door operator system provides for the complete closing of the sliding door in a slow, controlled manner, and the effort required to manually open and close the sliding door is substantially reduced. Moreover, in the event that the powered sliding door operator or system is not functional, due to a vehicle accident or a system failure or the like, the powered door operator and control system of the present invention allows near-normal manual operation for opening and closing the sliding door, even though such manual closing operation may require a high momentum, "slamming" movement, as in conventional sliding door closing arrangements.

The foregoing discussion discloses and describes merely exemplary embodiments of the present invention for purposes of illustration only. One skilled in the art will readily recognize from such discussion, and from the accompanying drawings and claims, that various changes, modifications and variations can be made therein without departing from the spirit and scope of the invention as defined in the following claims.

What is claimed is:

1. A control system for a sliding power-operated member mounted to a body portion of a self-propelled motor vehicle, the control system comprising:
   first wireless communications means, mounted on the body portion of the vehicle, for transmitting, regardless of relative positioning of the sliding member and the body portion, to the sliding member a first communications signal containing information related to at least a first control signal for controlling a power locking function associated with the sliding member;
   second wireless communications means, mounted on the sliding member, for receiving, regardless of relative positioning of the sliding member and the body portion, the first communications signal and obtaining therefrom the first control signal;
   means, mounted on the sliding member, for performing the power locking function in response to the obtained first control signal;
   third wireless communications means, mounted on the sliding member, for transmitting to the body portion of the vehicle a second communications signal containing information related to at least a second control signal for controlling a power closure function associated with the sliding member;
   fourth wireless communications means, mounted on the body portion of the vehicle, for receiving the second communications signal and obtaining therefrom the second control signal; and
   means, mounted on the body portion, for performing the power closure function in response to the obtained second control signal.

2. A control system as in claim 1, wherein the sliding member is a door.

3. A control system as in claim 1, wherein the vehicle is a van, and the sliding member is a side door.

4. A control system as in claim 1, wherein:
   the first and fourth wireless communications means are formed at least in part of a common first transceiver; and
   the second and third wireless communications means are formed at least in part of a common second transceiver.

5. A control system as in claim 1, wherein the first wireless communications means includes means for generating radio frequency signals, and the first communications signal is a radio frequency signal.

6. A control system as in claim 5, wherein the radio frequency signal has a frequency of at least 100 Megahertz.

7. A control system as in claim 5, wherein the radio frequency signal has a frequency in the range of about 100 Megahertz to about 500 Megahertz.

8. A control system as in claim 5, wherein the radio frequency signal has a frequency in the range of about 250 Megahertz to about 400 Megahertz.

9. A control system as in claim 5, wherein the radio frequency signal has a frequency in the range of about 300 Megahertz to about 320 Megahertz.

10. A control system as in claim 5, wherein the radio frequency signal has a strength of less than one hundred microwatts.

11. A control system as in claim 1, wherein:
    the first wireless communications means includes means for generating amplitude modulated radio frequency communication signals, and
    the second wireless communications means includes means for decoding amplitude modulated communication signals.

12. A control system as in claim 11, wherein the average strength of the communication signal generated by the first wireless communications means is less than twenty-five microwatts as measured at the second wireless communication means.

13. A control system as in claim 1, wherein:
    the first wireless communications means includes on-off keying means for encoding digital information in an amplitude modulated radio frequency communication signal, and
    the second wireless communications means includes means for decoding amplitude modulated communication signals containing digital information which has been encoded by on-off keying into an amplitude modulated radio frequency communications signal.

14. A control system as in claim 1, wherein:
    at least one of the first and third wireless communications means include antenna means for broadcasting communications signals which includes at least part of a metal structure serving at least one purpose in the vehicle unrelated to wireless communications transmission.

15. A control system as in claim 1, wherein:
    at least one of the first and third wireless communications means includes antenna means for broadcasting communications signals which includes a length of unshielded electrical conductor placed at least about one inch from any ground plane surface.

16. A control system as in claim 1, wherein:
    the first and third wireless communications means each include antenna means for broadcasting communications signals which antenna means employ at least one length of metal cable extending between the sliding member and the body portion and used for causing relative motion between the body portion and sliding member,
    the antenna means for one of the first and third wireless communications means including a direct electrical connection to the metal cable, and the antenna means for the other one of the first and third wireless communications means being located at least in part adjacent to but not in direct electrical contact with the metal cable.

17. A control system as in claim 16, wherein the direct electrical connection to the metal cable is made via an ohmic contact.

18. A control system as in claim 16, wherein the antenna means having no direct electrical contact with the metal cable includes a length of unshielded wire placed adjacent to the metal cable.

19. A control system as in claim 18, wherein the length of unshielded wire is electrically insulated from and wrapped in a helix configuration around a portion of the metal cable.

* * * * *